United States Patent
Ryman

(10) Patent No.: US 7,831,728 B2
(45) Date of Patent: *Nov. 9, 2010

(54) METHODS AND SYSTEMS FOR REAL-TIME SEEKING DURING REAL-TIME PLAYBACK OF A PRESENTATION LAYER PROTOCOL DATA STREAM

(75) Inventor: Paul Adam Ryman, Dural (AU)

(73) Assignee: Citrix Systems, Inc., Fort Lauderdale, FL (US)

(*) Notice: Subject to any disclaimer, the term of this patent is extended or adjusted under 35 U.S.C. 154(b) by 465 days.

This patent is subject to a terminal disclaimer.

(21) Appl. No.: 11/555,615

(22) Filed: Nov. 1, 2006

(65) Prior Publication Data

US 2007/0106811 A1 May 10, 2007

Related U.S. Application Data

(63) Continuation-in-part of application No. 11/036,486, filed on Jan. 14, 2005, and a continuation-in-part of application No. 11/035,851, filed on Jan. 14, 2005.

(60) Provisional application No. 60/862,349, filed on Oct. 20, 2006.

(51) Int. Cl.
G06F 15/16 (2006.01)

(52) U.S. Cl. ............ 709/231; 709/203; 709/232; 709/225; 709/226

(58) Field of Classification Search .......... 709/209, 709/223, 187, 3, 250, 228, 202; 705/21; 700/90; 370/229
See application file for complete search history.

(56) References Cited

U.S. PATENT DOCUMENTS

| | | |
|---|---|---|
| 4,138,719 A | 2/1979 | Swanstrom et al. |
| 5,121,497 A | 6/1992 | Kerr et al. |
| 5,241,625 A | 8/1993 | Epard et al. |

(Continued)

FOREIGN PATENT DOCUMENTS

EP 495612 A2 7/1992

(Continued)

OTHER PUBLICATIONS

Communication pursuant to Article 94(3) EP Application No. 07119879.0-1525; Dated Jun. 20, 2008; 8 pages.

(Continued)

*Primary Examiner*—Nathan Flynn
*Assistant Examiner*—Aftab Nasir Khan
(74) *Attorney, Agent, or Firm*—Choate, Hall & Stewart LLP; John D. Lanza

(57) ABSTRACT

A method for real-time seeking during real-time playback of presentation layer protocol data streams includes the step of receiving, by a foreground protocol engine, a request for rendering the contents of a packet in a presentation layer protocol data stream comprising a first plurality of packets already received and a second plurality of packets yet to be received. The foreground protocol engine identifies a state-snapshot having an associated timestamp previous to that of the requested packet. The foreground protocol engine displays during transmission of the presentation layer protocol data stream from a first device to a second device, the requested packet responsive to the identified state-snapshot.

24 Claims, 27 Drawing Sheets

U.S. PATENT DOCUMENTS

| | | | |
|---|---|---|---|
| 5,307,456 A | 4/1994 | MacKay | |
| 5,313,581 A * | 5/1994 | Giokas et al. | 719/329 |
| 5,317,732 A | 5/1994 | Gerlach, Jr. et al. | |
| 5,359,712 A | 10/1994 | Cohen et al. | |
| 5,388,197 A | 2/1995 | Rayner | |
| 5,392,223 A | 2/1995 | Caci | |
| 5,392,400 A * | 2/1995 | Berkowitz et al. | 709/203 |
| 5,404,316 A | 4/1995 | Klingler et al. | |
| 5,432,932 A | 7/1995 | Chen et al. | |
| 5,461,711 A | 10/1995 | Wang et al. | |
| 5,550,965 A | 8/1996 | Gabbe et al. | |
| 5,574,845 A | 11/1996 | Benson et al. | |
| 5,577,254 A | 11/1996 | Gilbert | |
| 5,657,390 A | 8/1997 | Elgamal et al. | |
| 5,717,879 A | 2/1998 | Moran et al. | |
| 5,721,827 A | 2/1998 | Logan et al. | |
| 5,727,950 A | 3/1998 | Cook et al. | |
| 5,729,689 A | 3/1998 | Allard et al. | |
| 5,732,216 A | 3/1998 | Logan et al. | |
| 5,742,797 A | 4/1998 | Celi, Jr. et al. | |
| 5,748,499 A * | 5/1998 | Trueblood | 702/187 |
| 5,822,436 A | 10/1998 | Rhoads | |
| 5,832,119 A | 11/1998 | Rhoads | |
| 5,838,458 A | 11/1998 | Tsai | |
| 5,841,978 A | 11/1998 | Rhoads | |
| 5,862,260 A | 1/1999 | Rhoads | |
| 5,893,053 A * | 4/1999 | Trueblood | 702/187 |
| 5,907,704 A | 5/1999 | Gudmundson et al. | |
| 5,909,559 A | 6/1999 | So | |
| 5,915,001 A | 6/1999 | Uppaluru | |
| 5,923,736 A | 7/1999 | Shachar | |
| 5,983,190 A | 11/1999 | Trower, II et al. | |
| 6,003,030 A | 12/1999 | Kenner et al. | |
| 6,011,537 A | 1/2000 | Slotznick | |
| 6,022,315 A | 2/2000 | Iliff | |
| 6,111,954 A | 8/2000 | Rhoads | |
| 6,122,403 A | 9/2000 | Rhoads | |
| 6,141,699 A | 10/2000 | Luzzi et al. | |
| 6,173,316 B1 | 1/2001 | De Boor et al. | |
| 6,181,736 B1 | 1/2001 | McLaughlin et al. | |
| 6,185,625 B1 | 2/2001 | Tso et al. | |
| 6,199,076 B1 | 3/2001 | Logan et al. | |
| 6,201,948 B1 | 3/2001 | Cook et al. | |
| 6,206,829 B1 | 3/2001 | Iliff | |
| 6,219,786 B1 * | 4/2001 | Cunningham et al. | 713/152 |
| 6,237,138 B1 | 5/2001 | Hameluck et al. | |
| 6,243,375 B1 | 6/2001 | Speicher | |
| 6,256,773 B1 | 7/2001 | Bowman-Amuah | |
| 6,286,030 B1 | 9/2001 | Wenig et al. | |
| 6,286,036 B1 | 9/2001 | Rhoads | |
| 6,289,382 B1 | 9/2001 | Bowman-Amuah | |
| 6,295,340 B1 | 9/2001 | Cannon et al. | |
| 6,317,761 B1 | 11/2001 | Landsman et al. | |
| 6,317,781 B1 | 11/2001 | De Boor et al. | |
| 6,321,252 B1 | 11/2001 | Bhola et al. | |
| 6,324,573 B1 | 11/2001 | Rhoads | |
| 6,324,647 B1 | 11/2001 | Bowman-Amuah | |
| 6,332,163 B1 | 12/2001 | Bowman-Amuah | |
| 6,339,832 B1 | 1/2002 | Bowman-Amuah | |
| 6,345,239 B1 | 2/2002 | Bowman-Amuah | |
| 6,351,777 B1 | 2/2002 | Simonoff | |
| 6,356,437 B1 | 3/2002 | Mitchell et al. | |
| 6,370,573 B1 | 4/2002 | Bowman-Amuah | |
| 6,381,341 B1 | 4/2002 | Rhoads | |
| 6,400,806 B1 | 6/2002 | Uppaluru | |
| 6,400,996 B1 | 6/2002 | Hoffberg et al. | |
| 6,401,118 B1 | 6/2002 | Thomas | |
| 6,405,252 B1 | 6/2002 | Gupta et al. | |
| 6,405,364 B1 | 6/2002 | Bowman-Amuah | |
| 6,408,331 B1 | 6/2002 | Rhoads | |
| 6,421,726 B1 | 7/2002 | Kenner et al. | |
| 6,427,063 B1 | 7/2002 | Cook et al. | |
| 6,427,132 B1 | 7/2002 | Bowman-Amuah | |
| 6,434,568 B1 | 8/2002 | Bowman-Amuah | |
| 6,434,628 B1 | 8/2002 | Bowman-Amuah | |
| 6,438,231 B1 | 8/2002 | Rhoads | |
| 6,438,594 B1 | 8/2002 | Bowman-Amuah | |
| 6,442,748 B1 | 8/2002 | Bowman-Amuah | |
| 6,445,468 B1 | 9/2002 | Tsai | |
| 6,466,654 B1 | 10/2002 | Cooper et al. | |
| 6,470,381 B2 | 10/2002 | De Boor et al. | |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,482,156 B2 | 11/2002 | Iliff | |
| 6,496,850 B1 | 12/2002 | Bowman-Amuah | |
| 6,498,955 B1 | 12/2002 | McCarthy et al. | |
| 6,502,102 B1 | 12/2002 | Haswell et al. | |
| 6,502,125 B1 | 12/2002 | Kenner et al. | |
| 6,502,131 B1 | 12/2002 | Vaid et al. | |
| 6,502,213 B1 | 12/2002 | Bowman-Amuah | |
| 6,519,571 B1 | 2/2003 | Guheen et al. | |
| 6,523,027 B1 | 2/2003 | Underwood | |
| 6,526,335 B1 | 2/2003 | Treyz et al. | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,336 B1 | 3/2003 | Vock et al. | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,553,129 B1 | 4/2003 | Rhoads | |
| 6,567,533 B1 | 5/2003 | Rhoads | |
| 6,571,282 B1 | 5/2003 | Bowman-Amuah | |
| 6,573,907 B1 | 6/2003 | Madrane | |
| 6,574,672 B1 | 6/2003 | Mitchell et al. | |
| 6,578,068 B1 | 6/2003 | Bowman-Amuah | |
| 6,580,808 B2 | 6/2003 | Rhoads | |
| 6,584,569 B2 | 6/2003 | Reshef et al. | |
| 6,590,998 B2 | 7/2003 | Rhoads | |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,479 B2 | 8/2003 | Cook et al. | |
| 6,606,660 B1 | 8/2003 | Bowman-Amuah | |
| 6,606,744 B1 | 8/2003 | Mikurak | |
| 6,609,128 B1 | 8/2003 | Underwood | |
| 6,611,867 B1 | 8/2003 | Bowman-Amuah | |
| 6,615,166 B1 | 9/2003 | Guheen et al. | |
| 6,615,199 B1 | 9/2003 | Bowman-Amuah | |
| 6,615,253 B1 | 9/2003 | Bowman-Amuah | |
| 6,629,081 B1 | 9/2003 | Cornelius et al. | |
| 6,633,878 B1 | 10/2003 | Underwood | |
| 6,636,242 B2 | 10/2003 | Bowman-Amuah | |
| 6,640,145 B2 | 10/2003 | Hoffberg et al. | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,647,128 B1 | 11/2003 | Rhoads | |
| 6,647,130 B2 | 11/2003 | Rhoads | |
| 6,662,357 B1 | 12/2003 | Bowman-Amuah | |
| 6,665,706 B2 | 12/2003 | Kenner et al. | |
| 6,671,818 B1 | 12/2003 | Mikurak | |
| 6,675,204 B2 | 1/2004 | De Boor et al. | |
| 6,678,864 B1 | 1/2004 | Tsai | |
| 6,681,029 B1 | 1/2004 | Rhoads | |
| 6,697,894 B1 | 2/2004 | Mitchell et al. | |
| 6,700,990 B1 | 3/2004 | Rhoads | |
| 6,701,345 B1 | 3/2004 | Carley et al. | |
| 6,701,514 B1 | 3/2004 | Haswell et al. | |
| 6,704,873 B1 | 3/2004 | Underwood | |
| 6,711,474 B1 | 3/2004 | Treyz et al. | |
| 6,715,145 B1 | 3/2004 | Bowman-Amuah | |
| 6,718,535 B1 | 4/2004 | Underwood | |

| | | |
|---|---|---|
| 6,721,703 B2 | 4/2004 | Jackson et al. |
| 6,721,713 B1 | 4/2004 | Guheen et al. |
| 6,742,015 B1 | 5/2004 | Bowman-Amuah |
| 6,751,320 B2 | 6/2004 | Rhoads |
| 6,760,463 B2 | 7/2004 | Rhoads |
| 6,774,926 B1 | 8/2004 | Ellis et al. |
| 6,775,392 B1 | 8/2004 | Rhoads |
| 6,795,506 B1 | 9/2004 | Zhang et al. |
| 6,799,221 B1 | 9/2004 | Kenner et al. |
| 6,801,927 B1 * | 10/2004 | Smith et al. ............... 709/202 |
| 6,802,041 B1 | 10/2004 | Rehm |
| 6,813,366 B1 | 11/2004 | Rhoads |
| 6,816,904 B1 | 11/2004 | Ludwig et al. |
| 6,824,044 B1 | 11/2004 | Lapstun et al. |
| 6,842,906 B1 | 1/2005 | Bowman-Amuah |
| 6,849,045 B2 | 2/2005 | Iliff |
| 6,850,252 B1 | 2/2005 | Hoffberg |
| 6,870,921 B1 | 3/2005 | Elsey et al. |
| 6,877,043 B2 | 4/2005 | Mallory et al. |
| 6,879,701 B1 | 4/2005 | Rhoads |
| 6,880,123 B1 | 4/2005 | Landsman et al. |
| 6,885,736 B2 | 4/2005 | Uppaluru |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,907,546 B1 | 6/2005 | Haswell et al. |
| 6,914,519 B2 | 7/2005 | Beyda |
| 6,934,376 B1 | 8/2005 | McLaughlin et al. |
| 6,944,279 B2 | 9/2005 | Elsey et al. |
| 6,954,800 B2 | 10/2005 | Mallory |
| 6,957,186 B1 | 10/2005 | Guheen et al. |
| 6,968,057 B2 | 11/2005 | Rhoads |
| 6,968,364 B1 | 11/2005 | Wong et al. |
| 6,975,655 B2 | 12/2005 | Fischer et al. |
| 6,986,459 B2 | 1/2006 | Paul et al. |
| 6,988,126 B2 | 1/2006 | Wilcock et al. |
| 6,988,236 B2 | 1/2006 | Ptasinski et al. |
| 6,993,101 B2 | 1/2006 | Trachewsky et al. |
| 6,996,605 B2 | 2/2006 | Low et al. |
| 7,000,019 B2 | 2/2006 | Low et al. |
| 7,000,031 B2 | 2/2006 | Fischer et al. |
| 7,000,180 B2 | 2/2006 | Balthaser |
| 7,006,881 B1 | 2/2006 | Hoffberg et al. |
| 7,013,323 B1 | 3/2006 | Thomas et al. |
| 7,016,084 B2 | 3/2006 | Tsai |
| 7,023,979 B1 | 4/2006 | Wu et al. |
| 7,024,456 B1 | 4/2006 | Simonoff |
| 7,027,055 B2 | 4/2006 | Anderson et al. |
| 7,032,030 B1 | 4/2006 | Codignotto |
| 7,035,285 B2 | 4/2006 | Holloway et al. |
| 7,035,427 B2 | 4/2006 | Rhoads |
| 7,043,529 B1 | 5/2006 | Simonoff |
| 7,054,465 B2 | 5/2006 | Rhoads |
| 7,058,697 B2 | 6/2006 | Rhoads |
| 7,069,234 B1 | 6/2006 | Cornelius et al. |
| 7,069,332 B2 | 6/2006 | Shibata et al. |
| 7,073,126 B1 | 7/2006 | Khandekar |
| 7,073,189 B2 | 7/2006 | McElhatten et al. |
| 7,082,572 B2 | 7/2006 | Pea et al. |
| 7,089,487 B2 | 8/2006 | Tsai |
| 7,092,370 B2 | 8/2006 | Jiang et al. |
| 7,100,195 B1 | 8/2006 | Underwood |
| 7,103,197 B2 | 9/2006 | Rhoads |
| 7,113,596 B2 | 9/2006 | Rhoads |
| 7,113,614 B2 | 9/2006 | Rhoads |
| 7,116,781 B2 | 10/2006 | Rhoads |
| 7,124,101 B1 | 10/2006 | Mikurak |
| 7,124,175 B1 | 10/2006 | Wolfe et al. |
| 7,130,403 B2 | 10/2006 | Caspi et al. |
| 7,130,807 B1 | 10/2006 | Mikurak |
| 7,133,837 B2 | 11/2006 | Barnes, Jr. |
| 7,139,999 B2 | 11/2006 | Bowman-Amuah |
| 7,149,698 B2 | 12/2006 | Guheen et al. |
| 7,165,041 B1 | 1/2007 | Guheen et al. |
| 7,167,844 B1 | 1/2007 | Leong et al. |
| 7,171,016 B1 | 1/2007 | Rhoads |
| 7,171,174 B2 | 1/2007 | Ellis et al. |
| 7,174,126 B2 | 2/2007 | McElhatten et al. |
| 7,184,531 B2 | 2/2007 | Crouch |
| 7,185,283 B1 | 2/2007 | Takahashi |
| 7,225,130 B2 | 5/2007 | Roth et al. |
| 7,228,340 B2 | 6/2007 | De Boor et al. |
| 7,313,613 B1 | 12/2007 | Brooking et al. |
| 7,398,320 B1 | 7/2008 | Minakuchi et al. |
| 7,401,116 B1 | 7/2008 | Chalfin et al. |
| 7,490,166 B2 * | 2/2009 | Yang et al. ............... 709/246 |
| 2001/0019630 A1 | 9/2001 | Johnson |
| 2002/0032770 A1 | 3/2002 | Fertell et al. |
| 2002/0033844 A1 | 3/2002 | Levy et al. |
| 2002/0038388 A1 | 3/2002 | Netter |
| 2002/0048450 A1 | 4/2002 | Zetts |
| 2002/0149617 A1 | 10/2002 | Becker |
| 2003/0079224 A1 | 4/2003 | Komar et al. |
| 2003/0110266 A1 * | 6/2003 | Rollins et al. ............... 709/227 |
| 2003/0135656 A1 | 7/2003 | Schneider et al. |
| 2003/0163704 A1 | 8/2003 | Dick et al. |
| 2003/0177172 A1 | 9/2003 | Duursma et al. |
| 2003/0191799 A1 | 10/2003 | Araujo et al. |
| 2003/0226038 A1 | 12/2003 | Raanan et al. |
| 2004/0031058 A1 | 2/2004 | Reisman |
| 2004/0044521 A1 | 3/2004 | Chen et al. |
| 2004/0103438 A1 | 5/2004 | Yan et al. |
| 2004/0143602 A1 | 7/2004 | Ruiz et al. |
| 2004/0207723 A1 | 10/2004 | Davis et al. |
| 2004/0240387 A1 | 12/2004 | Nuzman et al. |
| 2004/0267820 A1 * | 12/2004 | Boss et al. ............... 707/104.1 |
| 2004/0267952 A1 | 12/2004 | He et al. |
| 2005/0080850 A1 | 4/2005 | Salesky et al. |
| 2005/0254775 A1 | 11/2005 | Hamilton et al. |
| 2006/0064716 A1 | 3/2006 | Sull et al. |
| 2006/0130124 A1 * | 6/2006 | Richardson et al. ............ 726/3 |
| 2006/0161671 A1 | 7/2006 | Ryman et al. |
| 2006/0161959 A1 * | 7/2006 | Ryman et al. ............... 725/88 |
| 2006/0274828 A1 | 12/2006 | Siemens et al. |
| 2007/0057952 A1 * | 3/2007 | Swedberg et al. ........... 345/474 |
| 2007/0106681 A1 | 5/2007 | Haot et al. |

FOREIGN PATENT DOCUMENTS

WO    WO-2006/076389 A2    7/2006

OTHER PUBLICATIONS

Communication pursuant to Article 94(3) EPC EP Application No. 07120005.9-1525; Dated Jun. 20, 2008; 9 pages.
Communication Pursuant to Article 94(3) EPC for EP Application No. 0711991.3-1525; Dated Jun. 20, 2008; 12 pages.
Communication pursuant to Article 96(2) EPC dated Oct. 24, 2007; EP Application No. 06718013.3-1525; 6 pages.
Communication pursuant to Article 96(2) EPC EP Application No. 06718012.5-1525; Dated Oct. 24, 2007; 5 pages.
Crusty, "The Un-Official XviD FAQ," Mar. 4, 2004, pp. 1-50.
Cruz, G. and Hill, R., "Capturing and Playing Multimedia Events with STREAMS", in Proceedings of ACM Multimedia '94, San Francisco, CA, Oct. 15-20, 1994, pp. 193-200.
De Alwis, B., "Screen Capturing and Playback Using VNC," http://www.cs.ubc.ca/{bsd/vncrecording.html, Oct. 31, 2004.
European Search Report EP Application No. 07119879 completed Jan. 16, 2008; 5 pages.
Extended European Search Report EP 0712005; Dated Dec. 14, 2007; 6 pages.
Extended European Search Report from EP Application No. 07119991.3-1525 completed Mar. 4, 2008; 9 pages.
International Search Report, PCT/US2006/000887, Jul. 4, 2006.
International Search Report, PCT/US2006/000888, Jul. 7, 2006.
International Search Report, PCT/US2007/081751, Oct. 29, 2008.

Krishnakumar A. S. et al., "VLSI Implementations of Communication Protocols—A Survey" IEEE Journal on Selected Areas in Communications, IEEE Service Center, Piscataway, NJ, vol. 7, No. 7, Sep. 1, 1989, pp. 1082-1090.

Lamming, M.G., "Towards a Human Memory Prosthesis", Technical Report EPC-91-116, Copyright.RTM. Rank Xerox EuroPARC, Published in Proceedings of International Workshop Lecture Notes in Computer Science '91, Dagstuhl, Berlin, Jul. 1991.

Lamming, M.G., and Newman, W.M., "Activity-based Information Retrieval Technology in Support of Personal Memory," Technical Report EPC-91-103.1, Copyright.RTM. Rank Xerox EuroPARC 1991, pp. 1-16.

Partial European Search Report completed on Dec. 14, 2007; EP Application No. EP07119991; 3 pages.

Pedersen, E.R., McCall, K., Moran, T.P., and Halasz, F.G., "Tivoli: An Electronic Whiteboard for Informal Workgroup Meetings," Interchi '93, Apr. 24-29, 1993, pp. 391-398.

Reilly, R., "Today's Linux Screen Capture Technology," Newsforge, http://software.newsforge.com/article.pl?sid=04/08/16/2128226, Aug. 17, 2004.

Rhyne, J.R., and Wolf, C.G., "Tools for Supporting the Collaborative Process," in Proceedings of the ACM Symposium on User Interface Software and Technology, Monterey, California, Nov. 15-18, 1992, pp. 161-170.

Sandklef H., "Testing Applications with Xnee," Linux Journal, vol. 2004, No. 117, 2004, pp. 1-6.

Sandklef, H., "Xnee Manual," Manual Version 1.08D, http://web.archive.org/web/20040627125613/www.gnu.org/software/xnee/www/manual/xnee.pdf, Oct. 3, 2003.

ScreenPlay User's Guide, Release 2.0, Copyright.COPYRGT. 1991-1993, RAD Technologies, Inc., Palo Alto, California, pp. 1-4, 9, 12-14, 30-37, and 44-66.

Smith, Advanced Linux Networking, Jun. 11, 2002, Addison Wesley Professional, Chapter 14-Section 4.

Stanonik, R., "Recording/Playing Both Gaze Date and Computer Interaction," http://hci.ucsd.edu/eye/gaze.txt, Nov. 30, 2000.

Stanonik, R., "Reversing the VNC Record File," http://web.archive.org/web/20060703115503/http://hci.ucsd.edu/eye/reversing.txt, Mar. 18, 2002.

Wolf, C.G., Rhyne, J.R., and Briggs, L.K., "Communication and Information Retrieval with a Pen-based Meeting Support Tool," CSCW 92 Proceedings, Nov. 1992, pp. 322-329.

Written Opinion of the International Searching Authority to PCT/US2006/000887 (Jul. 4, 2006).

Written Opinion of the International Searching Authority to PCT/US2006/000888(Jul. 7, 2006).

Zeldovich, N. et al., "Interactive Performance Measurement with VNCPlay," USENIX 2005 Annual Technical Conference. http://www.usenix.org/events/usenix05/tech/freenix/full_papers/zeldovich/zeldovich.pdf, Apr. 10, 2005.

Non Final Office Action dated Apr. 14, 2009, pertaining to U.S. Appl. No. 11/035,851, 11 pages.

Final Office Action dated Sep. 15, 2009, pertaining to U.S. Appl. No. 11/035,851, 13 pages.

Final Office Action dated Jan. 6, 2009, pertaining to U.S. Appl. No. 11/036,486, 46 pages.

Non Final Office Action dated Apr. 29, 2008, pertaining to U.S. Appl. No. 11/036,486, 20 pages.

Non Final Office Action dated Aug. 3, 2009, pertaining to U.S. Appl. No. 11/036,486, 39 pages.

Non Final Office Action dated May 26, 2009, pertaining to U.S. Appl. No. 11/036,840, 11 pages.

Final Office Action dated Jul. 7, 2009, pertaining to U.S. Appl. No. 11/036,489, 16 pages.

Non Final Office Action dated Sep. 4, 2009, pertaining to U.S. Appl. No. 11/036,489, 21 pages.

Non Final Office Action dated Dec. 10, 2008, pertaining to U.S. Appl. No. 11/036,489, 17 pages.

Non Final Office Action dated Jun. 3, 2009, pertaining to U.S. Appl. No. 11/555,611, 16 pages.

Final Office Action dated Jan. 20, 2010, pertaining to U.S. Appl. No. 11/555,611, 19 pages.

Non-Final Office Action dated Dec. 23, 2009, pertaining to U.S. Appl. No. 11/035,511, 10 pages.

Non-Final Office Action dated Jan. 4, 2010, pertaining to U.S. Appl. No. 11/035,851, 14 pages.

Final Office Action dated Mar. 16, 2010, pertaining to U.S. Appl. No. 11/036,486, 41 pages.

Final Office Action dated Apr. 14, 2010, pertaining to U.S. Appl. No. 11/036,489, 27 pages.

* cited by examiner

METHODS AND SYSTEMS FOR REAL-TIME SEEKING DURING REAL-TIME PLAYBACK OF A PRESENTATION LAYER PROTOCOL DATA STREAM

RELATED APPLICATIONS

The present application claims priority to U.S. Provisional Patent Application Ser. No. 60/862,349, entitled "Method for Recording, Real-Time Seeking, and Real-Time Playback of Presentation Layer Protocol Data," filed Oct. 20, 2006, and U.S. patent application No. Ser. 11/036,486, entitled "Method and Systems for Capture and Replay of Remote Presentation Protocol Data," filed Jan. 14, 2005, and U.S. patent application No. Ser. 11/035,851, entitled "Method and System for Real-Time Seeking During Playback of Remote Presentation Protocols," filed Jan. 14, 2005, all of which are incorporated herein by reference.

FIELD OF THE INVENTION

The present invention relates to methods and systems for providing real-time playback and, in particular, for providing real-time seeking during real-time playback of presentation layer protocol data.

BACKGROUND OF THE INVENTION

Server-side recording of a protocol data stream such as the ICA protocol manufactured by Citrix Systems, Inc., of Ft. Lauderdale, Fla, the X protocol by the X.org Foundation, the Virtual Network Computing protocol of AT&T Corp., or the RDP protocol, manufactured by Microsoft Corporation of Redmond, Washington is useful in authoring training material, providing helpdesk support, enabling tutorials, or for environments where distributing software to each client workstation is cumbersome. However, many conventional methods for recording protocol data streams suffer from drawbacks such as inefficient and lossless encoding of computer screen activity. Recording and storing files solely on the server may create issues regarding the handling of large numbers of concurrent sessions. Many conventional systems typically suffer the drawbacks of recording significantly more data than will ever be reviewed, involving complex recording processes or generating large file sizes.

Some conventional methods for recording protocol data streams are not bound to the remote presentation protocol itself. Many of these solutions involve screen scraping/capture technologies or hooking of the client graphics engine and as a result suffer the drawback of requiring a processor-intensive encoding or transcoding process for playback.

Other methods for recording user screen activity encode graphic output on the client device. Generally, these methods are limited to taking periodic discrete screen snapshots from a Windows client workstation. Microsoft provides a screen capture API as part of Windows Media Encoder SDK but this method may suffer the drawback of focusing on client device recording for the training and video presentation marketplace. Most methods require client-side software components and lack the capacity to perform server-side recording.

Additionally, remote presentation protocols are inherently stateful. In order to view a particular point in a stream of recorded presentation protocol data, playback of the stream must begin from the very beginning of stream and played back sequentially until the particular point is encountered.

Conventional techniques for accessing a recorded stream of data out of sequential order typically involve the use of keyframes and delta frames. Keyframes are typically stored within the stream itself as synchronization points so that frames may be quickly reproduced on a screen. Delta frames typically describe differences from previous frames to produce the visible video frame.

Since remote presentation protocols are typically compact due to their stateful nature, the additional storage of keyframes increases file size by several orders of magnitude. Even with modern digital video compression techniques, keyframes generally add several orders of magnitude to the storage required for a stream of recorded presentation protocol data. However, omitting keyframes results in a non-seekable protocol. A method for seekability without the overhead of oversized files caused by stored keyframes is desirable.

SUMMARY OF THE INVENTION

Methods and systems described herein provide for recording as a stream remote presentation protocols such as the ICA protocol manufactured by Citrix Systems, Inc., of Ft. Lauderdale, Fla, the X protocol by the X.org Foundation, the Virtual Network Computing protocol of AT&T Corp., or the RDP protocol, manufactured by Microsoft Corporation of Redmond, Wash., as well as enabling playback of the recorded stream at a later time. Protocols initially designed for the live display of computer screen presentation into lossless real-time screen activity capture can be recorded, without modification of the existing protocol definitions. Unlike traditional screen capture technology, recording does not need to take place on the client device or require any client-side components. Server-side recording provided by the present invention greatly simplifies deployment by allowing installation of recording software only on server machines instead of on many client devices. In an enterprise Citrix MetaFrame Presentation Server environment, for example, the ratio of client devices to server machines is regularly higher than 100 to 1. The range of supported client devices further complicates the traditional client deployment problem. Citrix currently supports clients on Windows PCs, UNIX, Linux, Java-based clients, DOS, a wide range of Windows CE and EPOC-based handheld devices and Macintosh. No platform-specific recording software or any other changes are required on any of these platforms for server-side recording to work. As remote presentation protocols are typically designed to work efficiently over relatively low speed networks by reducing bandwidth, the recording of such protocols is also inherently compact. As no transcoding to another video format ever takes place, the recording process is lightweight and the resulting stream is a true representation of what the user saw on their screen at record-time.

Additionally, methods and systems described herein make remote presentation protocols sequentially playable as a video format, and also permit random seeking/browsing without the use of stored keyframes. Seeking allows a user viewing the stream during playback to skip to any position, forward or backward, in the stream and continue playback in a responsive fashion. The methods and systems described herein make very fast seeking possible without recording or storing keyframes.

In one aspect, a method for recording and real-time playback of presentation layer protocol data includes the step of intercepting, by a recorder, a presentation layer protocol data stream comprising a plurality of packets, during transmission of the presentation layer protocol data stream from a first device to a second device, the presentation layer protocol data stream representing display data. A distributor transmits a copy of at least one packet of the presentation layer protocol data stream. A protocol engine uses information associated with the at least one copied packet to regenerate the display data represented by the at least one copied packet. The steps of intercepting the presentation layer protocol data stream and of transmitting the copy of the at least one packet repeat until the first device completes transmission of the protocol data stream to the second device.

In one embodiment, the recorder intercepts the presentation layer protocol data stream at substantially the same time as the first device transmits the presentation layer protocol data stream to the second device. In another embodiment, the recorder transmits the at least one copied packet to the distributor. In still another embodiment, the step of using information associated with the at least one copied packet to regenerate the display data represented by the at least one copied packet repeats.

In another aspect, a system for recording and real-time playback of presentation layer protocol data includes a recorder, a distributor, and a protocol engine. The recorder intercepts a presentation layer protocol data stream during transmission of the presentation layer protocol data stream from a first device to a second device, said presentation layer protocol data stream representing display data and comprising a plurality of packets. The distributor transmits a copy of at least one packet of the presentation layer protocol data stream. The protocol engine, in communication with the distributor, uses information associated with the at least one copied packet to regenerate the display data represented by the at least one packet. The recorder continues intercepting the presentation layer protocol data and the distributor continues transmitting the copy of the at least one packet of the presentation layer protocol data stream until the first device completes the transmission of the protocol data stream to the second device.

In one embodiment, the recorder further comprises a means for intercepting, by the recorder, the presentation layer protocol data stream at substantially the same time as the first device transmits the presentation layer protocol data stream to the second device. In another embodiment, the distributor further comprises a transceiver for retrieving the copy of the at least one packet and for transmitting the copy of the at least one packet to the protocol engine.

In still another aspect, a method for real-time seeking during real-time playback of presentation layer protocol data streams includes the step of receiving, by a foreground protocol engine, a request for rendering the contents of a packet in a first plurality of packets yet to be received. The foreground protocol engine identifies a state-snapshot having an associated timestamp previous to that of the requested packet. The foreground protocol engine displays, during transmission of the presentation layer protocol data stream from a first device to a second device, the requested packet responsive to the identified state-snapshot.

In even still aspect, a method and system for generating state-snapshots enable real-time seeking during real-time playback of a presentation layer protocol data stream comprising a first plurality of packets already received by a background protocol engine and a second plurality of packets yet to be received by the background protocol engine. A background protocol engine receives the first plurality of packets during transmission of the presentation layer protocol data stream from a first device to a second device. The background protocol engine generates a representation of the first plurality of packets. The background protocol engine generates at least one state-snapshot during a reading of at least one packet in the first plurality of packets. In one embodiment, the state-snapshot comprises a state of a protocol engine rendering the protocol data stream at a point in time when a recorder copied a packet from the protocol data stream into the first plurality of packets. The background protocol engine stores the generated state-snapshot. The background protocol engine modifies the generation of the display data and the at least one state-snapshot, responsive to receiving at least one packet in the second plurality of packets. A foreground protocol engine rendering the contents of the protocol data stream receives a request to seek display data represented by a content in a packet in the first plurality of packets, and renders the content representing the requested display data, using the state-snapshot. The background protocol engine updates the state-snapshot responsive to receiving at least one packet in the second plurality of packets.

In yet another aspect, a method and system for adaptive generation of state-snapshots include the step of presenting, to a user, a representation of a presentation layer protocol data stream comprising a first plurality of packets already received by a background protocol engine and a second plurality of packets yet to be received by the background protocol engine during transmission of the presentation layer protocol data stream from a first device to a second device. In one embodiment, a foreground protocol engine presents the representation of the recording of the protocol data stream to the user. A background protocol engine monitors an activity of the user during the presentation. The background protocol engine develops an activity profile responsive to the monitoring of the activity. The background protocol engine generates at least one state-snapshot, responsive to the activity profile. The background protocol engine modifies the at least one state-snapshot, responsive to receiving at least one packet in the second plurality of packets.

BRIEF DESCRIPTION OF THE DRAWINGS

These and other aspects of the invention will be readily apparent from the detailed description below and the appended drawings, which are meant to illustrate and not to limit the invention, and in which.

DETAILED DESCRIPTION OF THE INVENTION

Figure 1A:
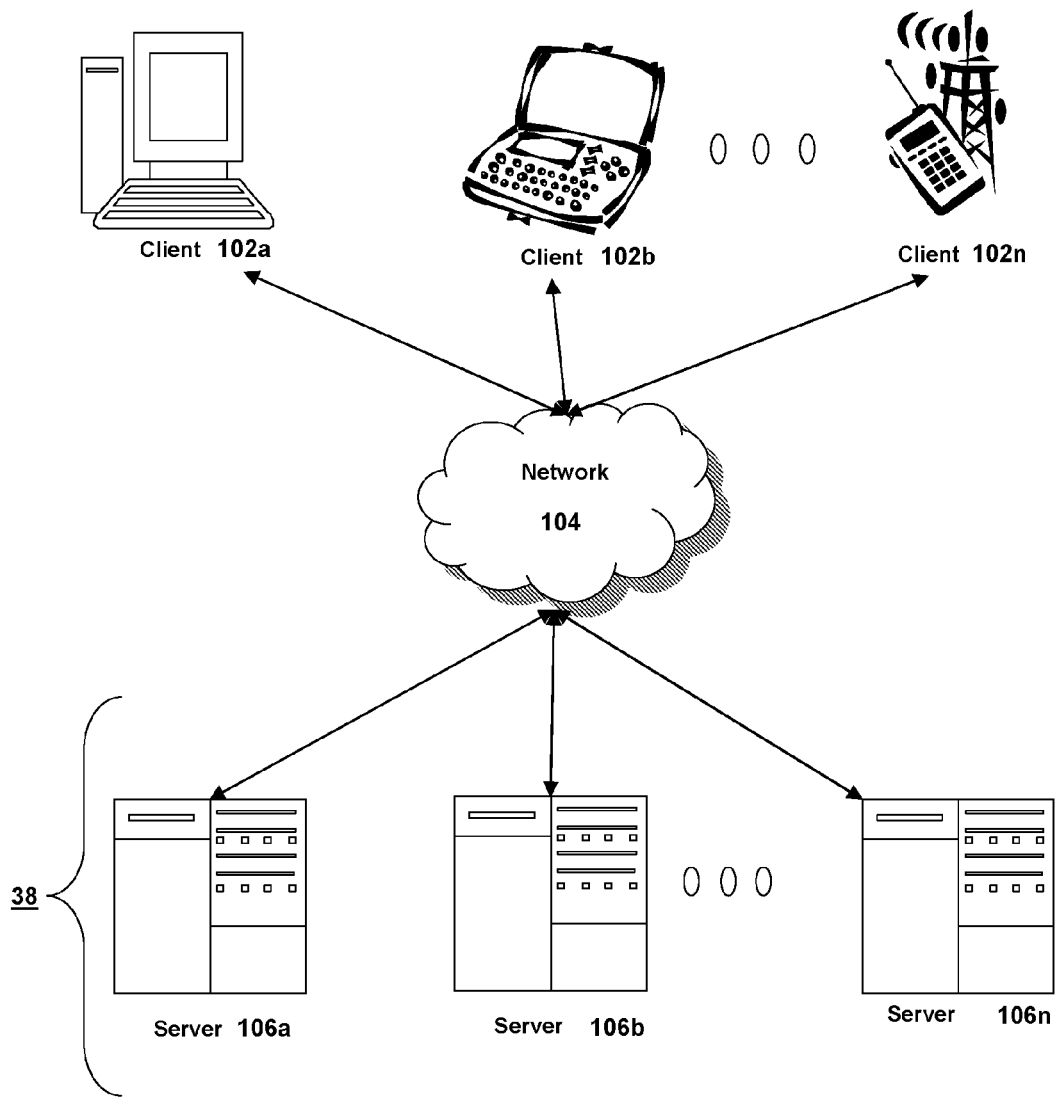
FIG. 1A is a block diagram depicting an embodiment of a network environment comprising client machines in communication with remote machines.

Methods and systems provide time-shifted playback of recorded presentation layer protocol sessions. In some embodiments, the technology builds on the methods and systems for recording and playback of presentation layer protocol sessions, which are also described herein.

Some embodiments of methods and playback of presentation layer protocol sessions provide functionality for playback after the completion of a recording and after creation of a recorded protocol data stream. In other embodiments, however, methods and systems provide functionality for playback of a protocol data stream during the recording of a protocol data stream. In one of these embodiments, the methods and systems also provide functionality for playback of a completed recording of a protocol data stream. In another of these embodiments, the methods and systems provide a range of playback controls, including, but not limited to the ability to watch a recording from the beginning, seek forward and backward, pause, fast forward, frame advance and so on.

In some embodiments, the methods and systems described herein provide for time-shifted playback (or time-shifting), a term borrowed from the video industry. Products called DVRs (Digital Video Recorders), such as the well-known TIVO brand, use time-shifting technology. These products provide consumers significant advantages over the traditional VCR; including the ability to start watching a recorded TV program before it is over. This benefit is also provided for users of the methods and systems described herein. Methods and systems for providing post-recording playback of presentation layer protocol data—functionality that was once a VCR for recorded presentation layer protocol data—may also provide playback during recording. This especially opens the system up to new use cases and new market opportunities. For embodiments in which the methods and systems are used for security purposes, the functionality greatly enhances the usability of these methods and systems as a surveillance and monitoring tool where response time to suspicious activity might be important. It is now possible to catch suspicious end users in the act of violating policies or other inappropriate use of computing or networking resources. Additionally, for embodiments in which the technology is used in a customer support scenario, the support technician now has the ability to watch exactly what the user did before they requested assistance and then instantly jump back "live" to watch what the user is about to do. This provides a significant opportunity in the support market as no existing session recording products provide this combined live and retrospective playback feature. Additional administrative benefits are provided since the methods and systems described herein have little, if any, impact on the performance, scalability, manageability or usability of the system.

In one embodiment, playing a session live may have a minute impact on an originating presentation server for the period of the time that the session is being watched live. In another embodiment, when no sessions are being played live, the performance and scalability impact on the server is the same as in embodiments providing post-recording playback solutions.

From the search list of recorded sessions, live recordings are identifiable by elements such as an animated icon, a missing end time and changing indication of a duration of a session. During playback, a graphical element, such as a seeker bar, used to display a "time-line" of the recording may continue to extend, reflecting an increasing amount of data available for playback as additional data from a session is recorded. If a user wants to watch "live", in one embodiment, they may click the right-most point on the seeker bar.

In some embodiments, for example in monitoring or surveillance scenarios, a successful implementation of the system may rely on it being difficult for recipients of a protocol data stream to detect that they are being recorded. In one of these embodiments, using methods and systems providing time-shifted playback features does not provide any new "clues" from within an active session that indicate to these recipients that their data and sessions are recorded or watched.

In other embodiments, from an administrator perspective, the features provided by these methods and systems function in ways to similar to the ways in which the post-recording playback systems and methods described herein. In one of these embodiments, there are no additional installation or configuration options. Recording policies and security features work as they do in the post-recording playback systems and methods.

Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Washington), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 may have the capacity to function as either an application server or as a master application server. In one embodiment, a server 106 may include an Active Directory. The remote machine 30 may be an application acceleration appliance. For embodiments in which the remote machine 30 is an application acceleration appliance, the remote machine 30 may provide functionality including firewall functionality, application firewall functionality, or load balancing functionality. In some embodiments, the remote machine 30 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the MICROSOFT WINDOWS Terminal Services manufactured by the Microsoft Corporation. In another embodiment, the application includes a Remote Desktop (RDP) client, developed by Microsoft Corporation of Redmond, Wash, or an X11 client, maintained by the open source X.org Foundation. In still another embodiment, the server 106 may run an application, which for example, may be an application server providing email services such as MICROSOFT EXCHANGE manufactured by the Microsoft Corporation of Redmond, Wash, a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment, the server 106 may display output to the client 102 using any thin-client or remote-display protocol, such as the Independent Computing Architecture (ICA) protocol manufactured by Citrix Systems, Inc. of Ft. Lauderdale, Florida or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VOIP) communications, such as a soft IP telephone. In further embodiments, the application comprises any application related to real-time data communications, such as applications for streaming video and/or audio.

Figure 1B:
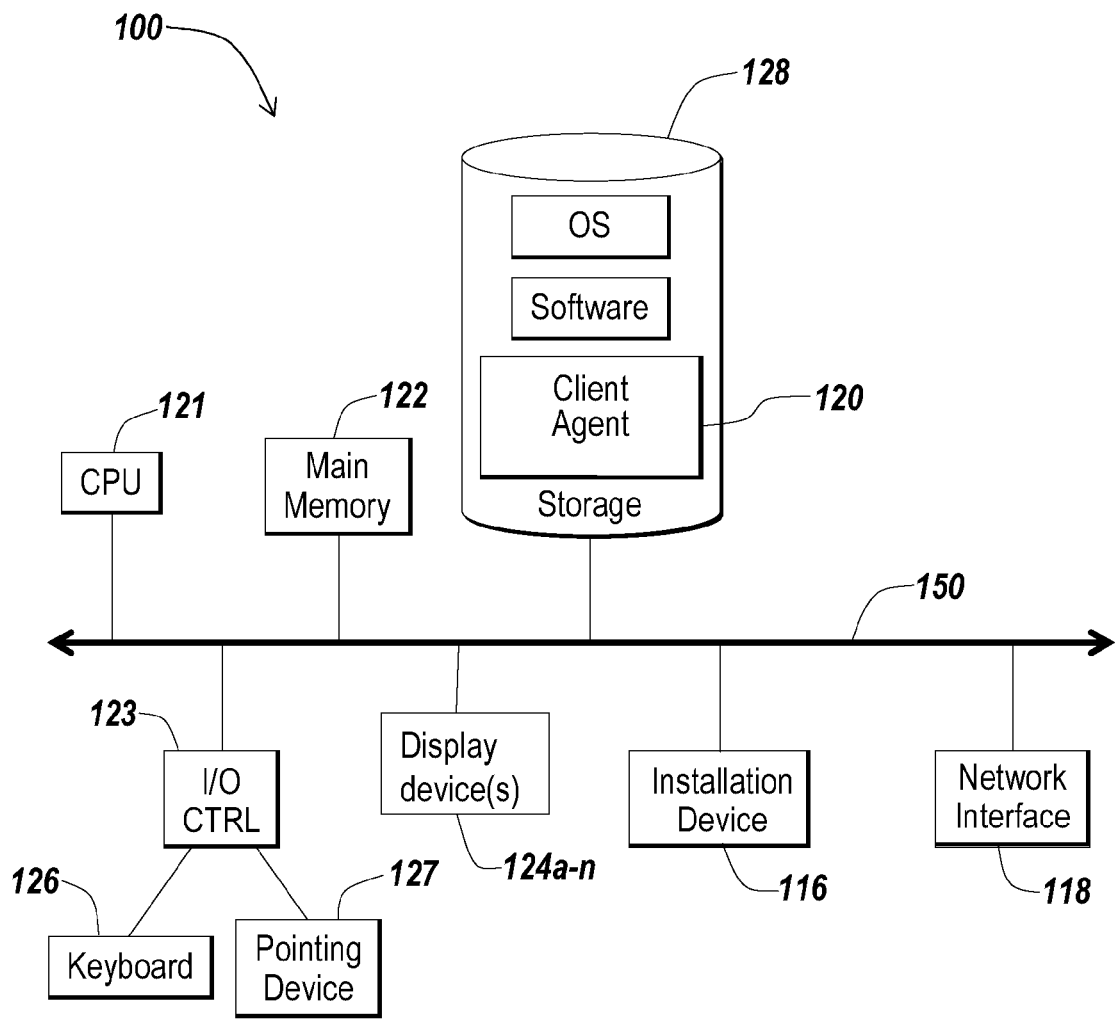
FIGS. 1B and 1C are block diagrams depicting embodiments of computers useful in connection with the methods and systems described herein.
Figure 1C:
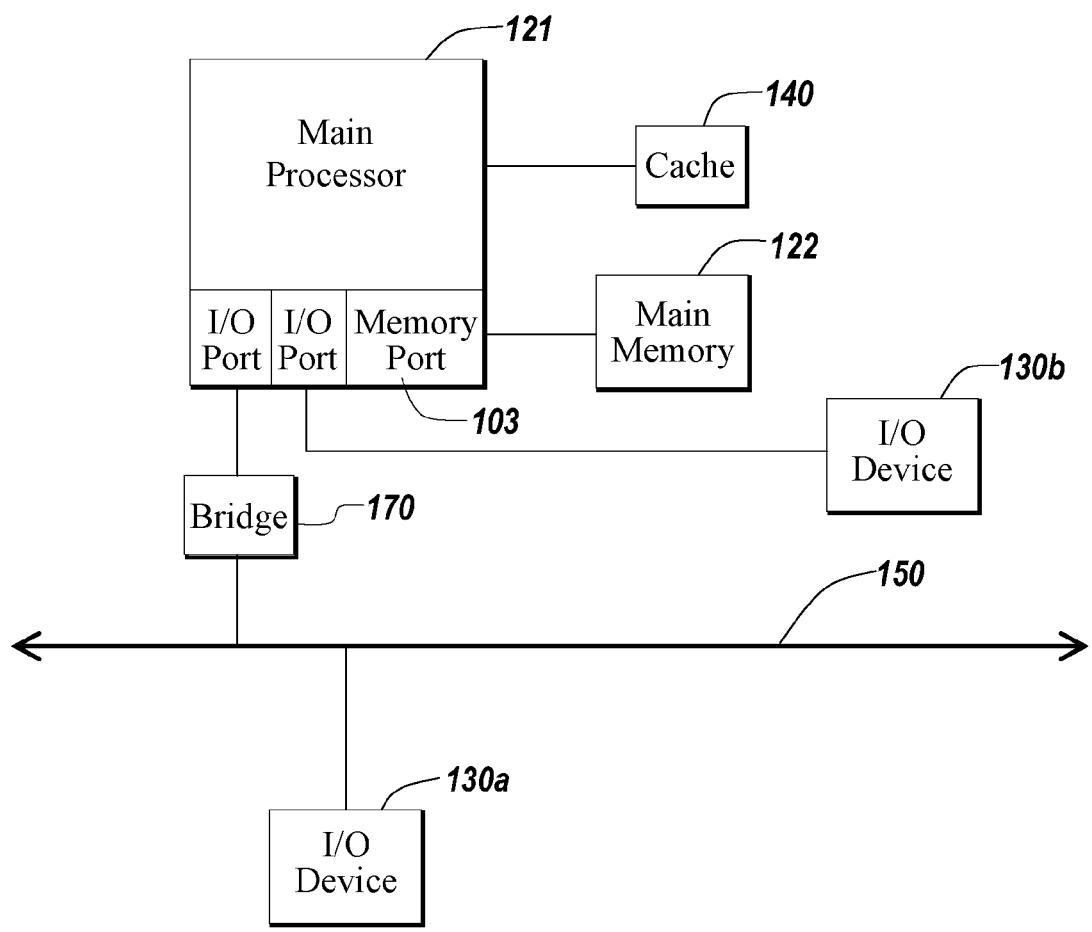

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG.1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.,; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121 , such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In some embodiments, the computing device 100 may have different processors, operating systems, and input devices consistent with the device. For example, in one embodiment the computing device 100 is a Treo 180, 270, 600, 650, 680, 700p or 700 w smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2:
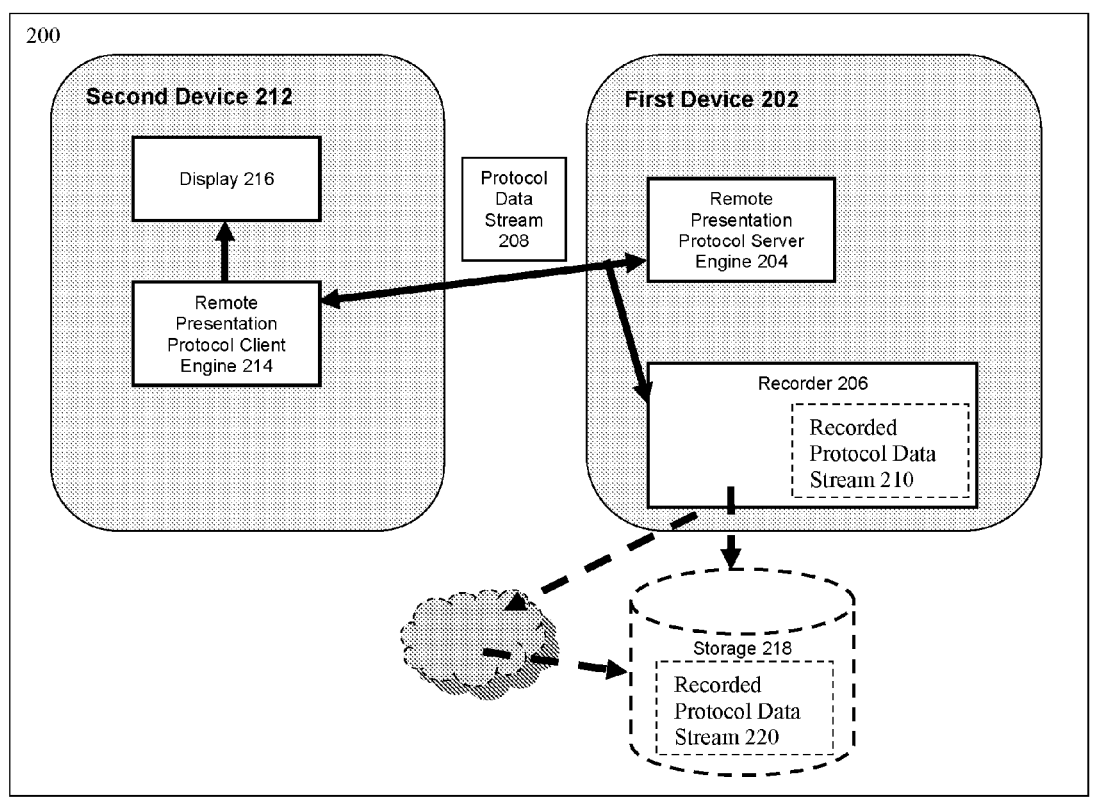
FIG. 2 is a block diagram depicting an embodiment of the network 200 in which the present invention may be performed.

Referring now to FIG. 2, a block diagram depicts an embodiment of the network 200 in which the invention may be performed, including a first device 202, a remote presentation protocol server engine 204, a recorder 206, a protocol data stream 208, a recorded protocol data stream 210, a second device 212, a remote presentation protocol client engine 214, a display 216, a storage element 218, and a recorded protocol data stream 220. In brief overview, the recorder 206 intercepts a protocol data stream 208. The recorder 206 copies at least one packet from the protocol data stream and creates a recording of the protocol data stream 210 using the at least one copied packet.

Referring now to FIG. 2 and in more detail, a first device 202 transmits a protocol data stream 208 to a second device 212. In one embodiment, the first device 202 uses a remote presentation protocol server engine 204 to transmit the protocol data stream 208 to the second device 212. In some embodiments, the second device 212 uses a remote presentation protocol client engine 214 to receive the protocol data stream 208 from the first device 202. In some embodiments, the remote presentation protocols comprise a thin-client protocol such as the ICA protocol manufactured by Citrix Systems, Inc., of Ft. Lauderdale, Fla., the X protocol by the X.org Foundation, the Virtual Network Computing protocol of AT&T Corp., or the RDP protocol, manufactured by Microsoft Corporation of Redmond, Wash.

The protocol data stream 208 comprises a plurality of packets at least some of which represent display data. In some embodiments, the protocol data stream 208 comprises information about a recorded session. In one embodiment, the protocol data stream 208 comprises metadata. In another embodiment, the protocol data stream 208 comprises information about the user in a recorded session. In still another embodiment, the protocol data stream 208 comprises information about the server generating the recorded data. In yet another embodiment, the protocol data stream 208 comprises a timestamp.

In one embodiment, the protocol data stream 208 comprises multiple channels. In this embodiment, a channel comprises a peer-to-peer connection over which data is transferred. In another embodiment, the protocol data stream 208 comprises multiple virtual channels. In this embodiment, the virtual channel is a channel wrapped in another channel. The second device 212 receives the protocol data stream 208 and, in some embodiments, uses a remote presentation protocol client engine 214 to regenerate the display data. Processing the protocol data stream 208 allows the second device 212 to present a display to a user through the display 216. The second device 212 may use the remote presentation protocol client engine 214 to process the display data. The display includes, without limitation, audio, visual, tactile, or olfactory presentations, or combinations of these.

The recorder 206 intercepts the protocol data stream 208 sent from the first device 202 to the second device 212. In one embodiment, the recorder 206 intercepts the protocol data stream 208 by intercepting one or more channels. In another embodiment, the recorder 206 intercepts the protocol data stream 208 by intercepting one or more virtual channels. In some embodiments, the recorder 206 monitors one or more virtual channels over which the first device 202 may transmit the protocol data stream 208 to the second device 212. The recorder 206 copies at least one packet from the protocol data stream. In one embodiment, the recorder 206 determines to copy a particular packet of the protocol data stream responsive to a policy. In some embodiments, the policy defines the packets the recorder 206 records based upon the type of data contained within the packet. In other embodiments, the recorder 206 determines to copy a packet of the protocol data stream based upon a determination of whether the packet contains data. In some of these embodiments, the recorder 206 does not record empty packets while in others of these embodiments, the recorder 206 does record empty packets. In some embodiments, the recorder 206 records every packet in the protocol data stream 208.

The recorder 206 creates a recorded protocol data stream 210 using the at least one copied packet. In one embodiment, the recorder 206 associates information with the at least one copied packet. In one embodiment, the recorder 206 associates a time stamp with the at least one copied packet. In another embodiment, the recorder 206 associates a data length indicator with the packet. For embodiments where the recorder 206 associates information with the at least one copied packet, for example time stamps or data length indicator, the recorder 206 may embed this information into the recorded protocol data stream 210 in addition to the packet or the recorder 206 may embed this information directly into the packet, or the recorder 206 may store the association in a location separate from the packet and the recorded protocol data stream 210.

Figure 3:
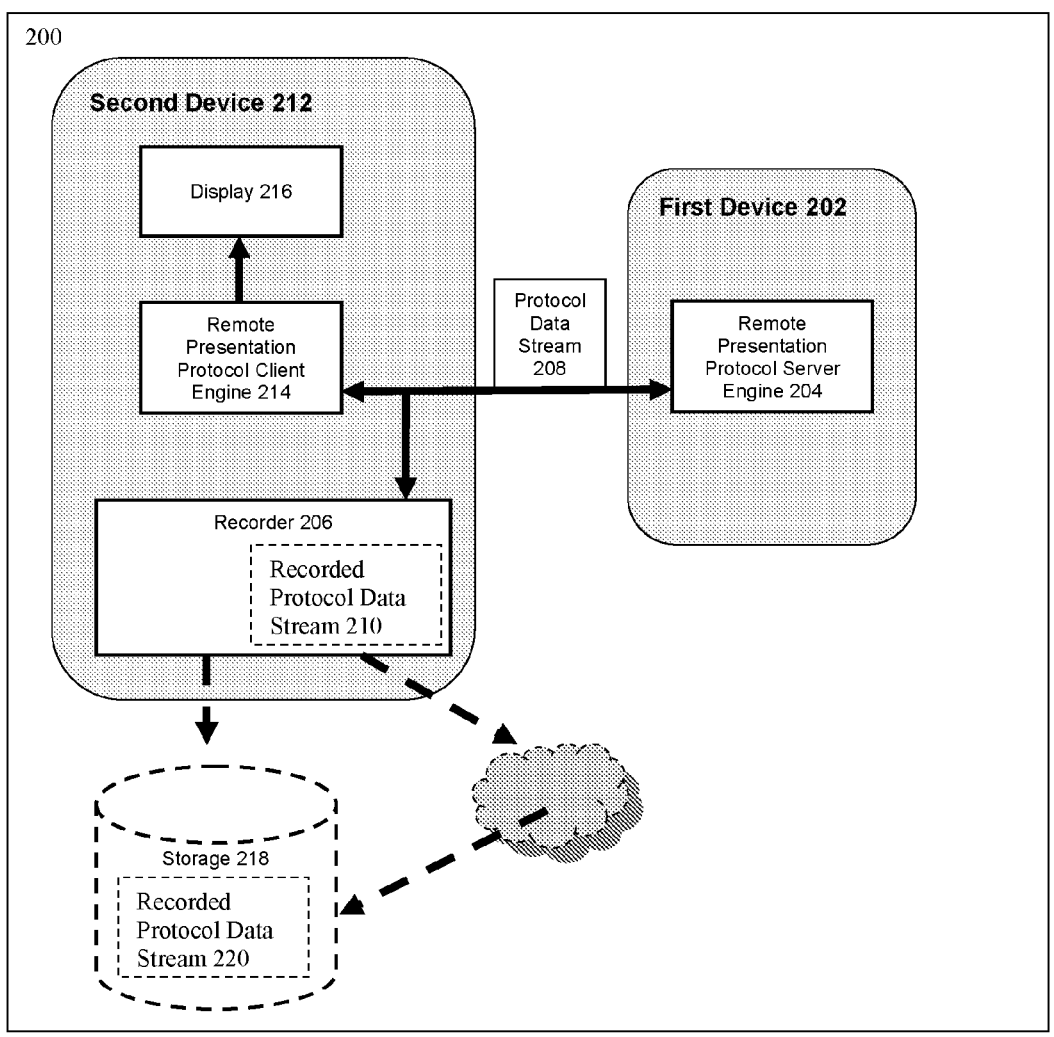
FIG. 3 and FIG. 4 are block diagrams depicting alternate embodiments of placements for a recorder on the network 200.
Figure 4:
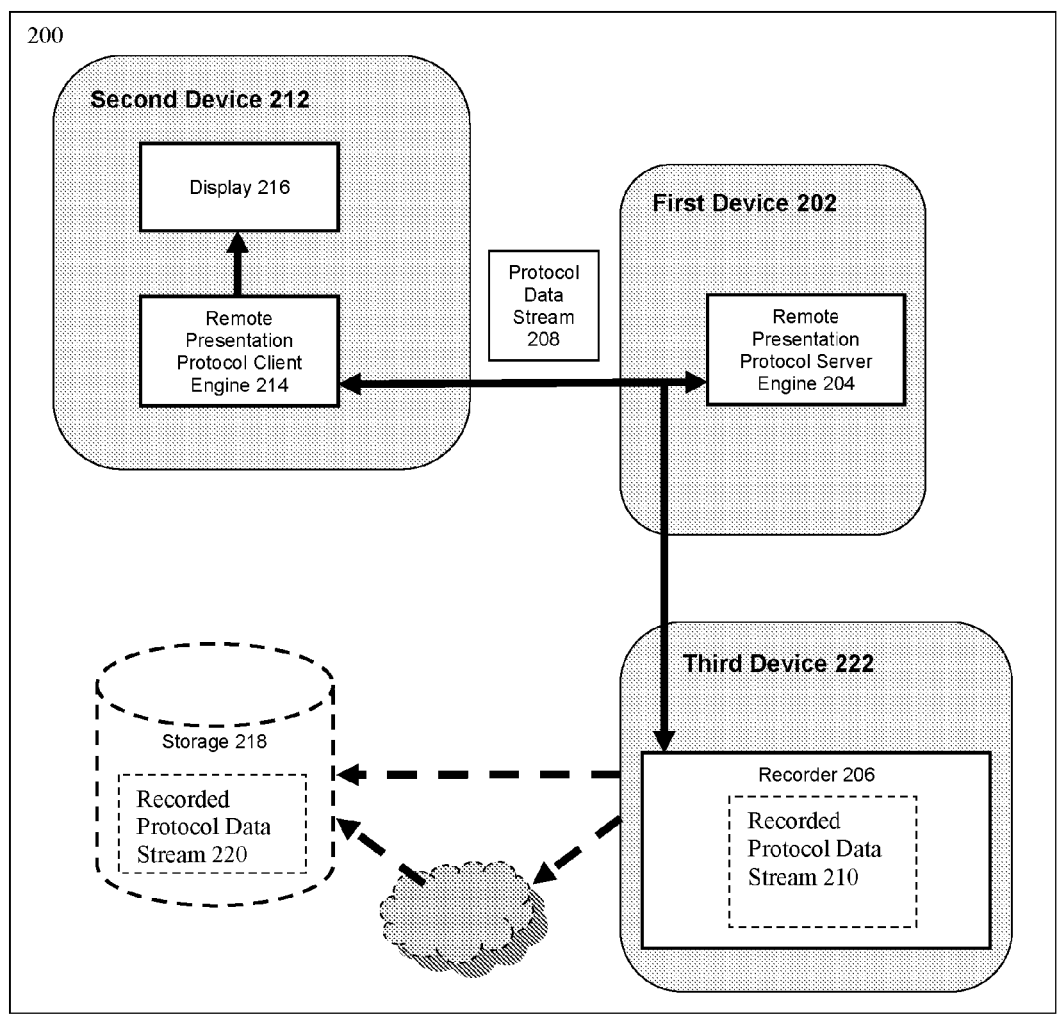

As depicted in FIG. 2, the recorder 206 may reside on the first device 202. FIG. 3 depicts an embodiment in which the recorder 206 resides on the second device, where the recorder 206 resides on the second device 212. FIG. 4 depicts an embodiment in which the recorder 206 resides on a third device. The devices on which the recorder 206 may reside include client computing systems, server computing systems, proxy server computing systems, network packet sniffing computing systems, protocol analyzer computing systems, and passthrough server computing systems.

The recorder 206 creates the recorded protocol data stream 210 using the at least one copied packet and, in some embodiments, information associated with the at least one copied packet. In some embodiments, the recorder 206 stores the recording of the protocol data stream 210 after creating it. In some of these embodiments, the recorder 206 stores the recording of the protocol data stream 210 to a storage element 218. The storage element 218 may comprise persistent storage, such as a hard drive, floppy drive, CD-RW, DVD-RW, or any other device, which maintains data state when power is removed. In other embodiments, the storage element may comprise one or more volatile memory elements, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In one embodiment the storage element comprises a network storage device. The storage element 218 may reside on the first device 202 or on a second device 212. In other embodiments, the storage element 218 resides on a third device, such as a proxy server computing device or a passthrough server computing device. In still other embodiments, the storage element 218 resides on a network and the recorder 206 accesses the storage element 218 over the network to store the recording of the protocol data stream 220. In other embodiments, the recorder 206 stores the recording of the protocol data stream on the same device on which the recorder 206 resides.

Figure 5:
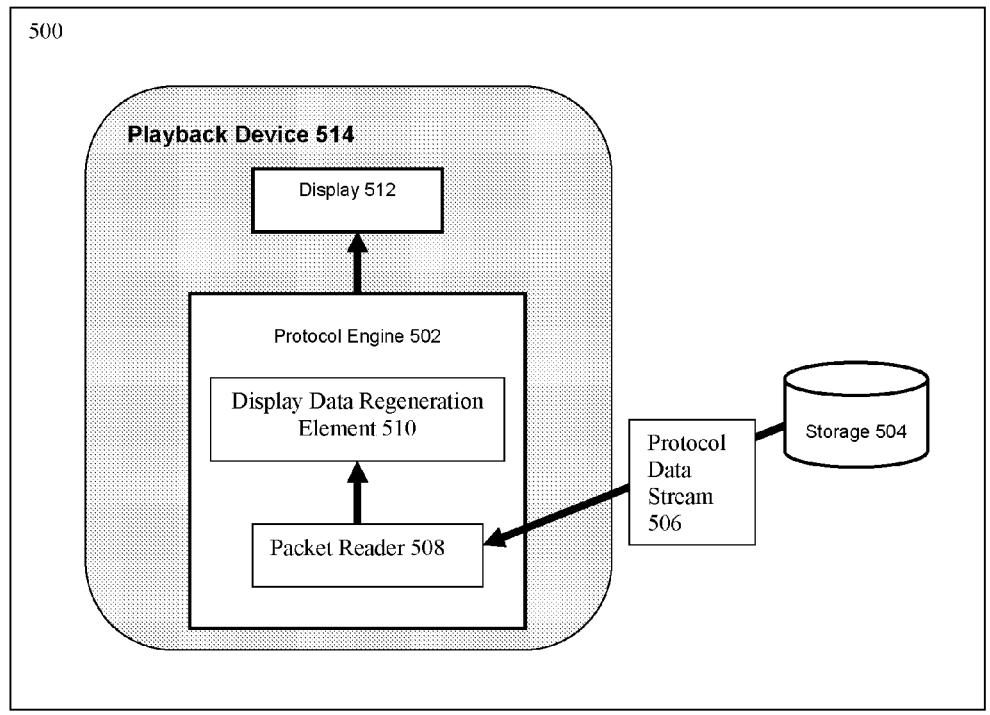
FIG. 5 is a block diagram depicting one embodiment of a system for regenerating display data represented by a protocol data stream.

Referring now to FIG. 5, a block diagram depicts a protocol engine 502 reading at least one copied packet from the recording of the protocol data stream 506 and using the information associated with the at least one copied packet to regenerate the display data represented by the protocol data stream 506. The protocol engine 502 receives the protocol data stream 506. In some embodiments, the protocol engine 502 retrieves the protocol data stream 506 from a storage element 504. In other embodiments, the protocol engine 502 retrieves the protocol data stream 506 from a recorder 206. In still other embodiments, the protocol engine 502 retrieves the protocol data stream 506 from another computing device.

In some embodiments, the protocol engine 502 comprises a packet reader 508 and a display data regeneration element 510. In these embodiments, the packet reader 508 reads at least one copied packet from the recording of the protocol data stream 506. In some embodiments, the packet reader 508 reads the at least one copied packet sequentially from the recording of the protocol data stream 506.

The protocol engine 502 processes the at least one copied packet and any information associated with the at least one copied packet. The protocol engine 502 uses, in some embodiments, a display data regeneration element 510 for the processing. The packet contains data enabling the regeneration of a perceptible display presented to a user. In some embodiments, a second device 212 processed this data, as shown in FIG. 2. In one embodiment, processing includes rendering to a buffer the contents of the at least one copied packet. In another embodiment, processing includes rendering in a perceptible manner the contents of the at least one copied packet. The regenerated display may include, without limitation, audio, visual, tactile, or olfactory presentations, or combinations of these.

In some embodiments, the protocol engine 502 resides on the first device 202. In other embodiments, the protocol engine 502 resides on the second device 212. In still other embodiments the protocol engine resides on a third device, such as a proxy server computing device or a passthrough server computing device.

Figure 7:
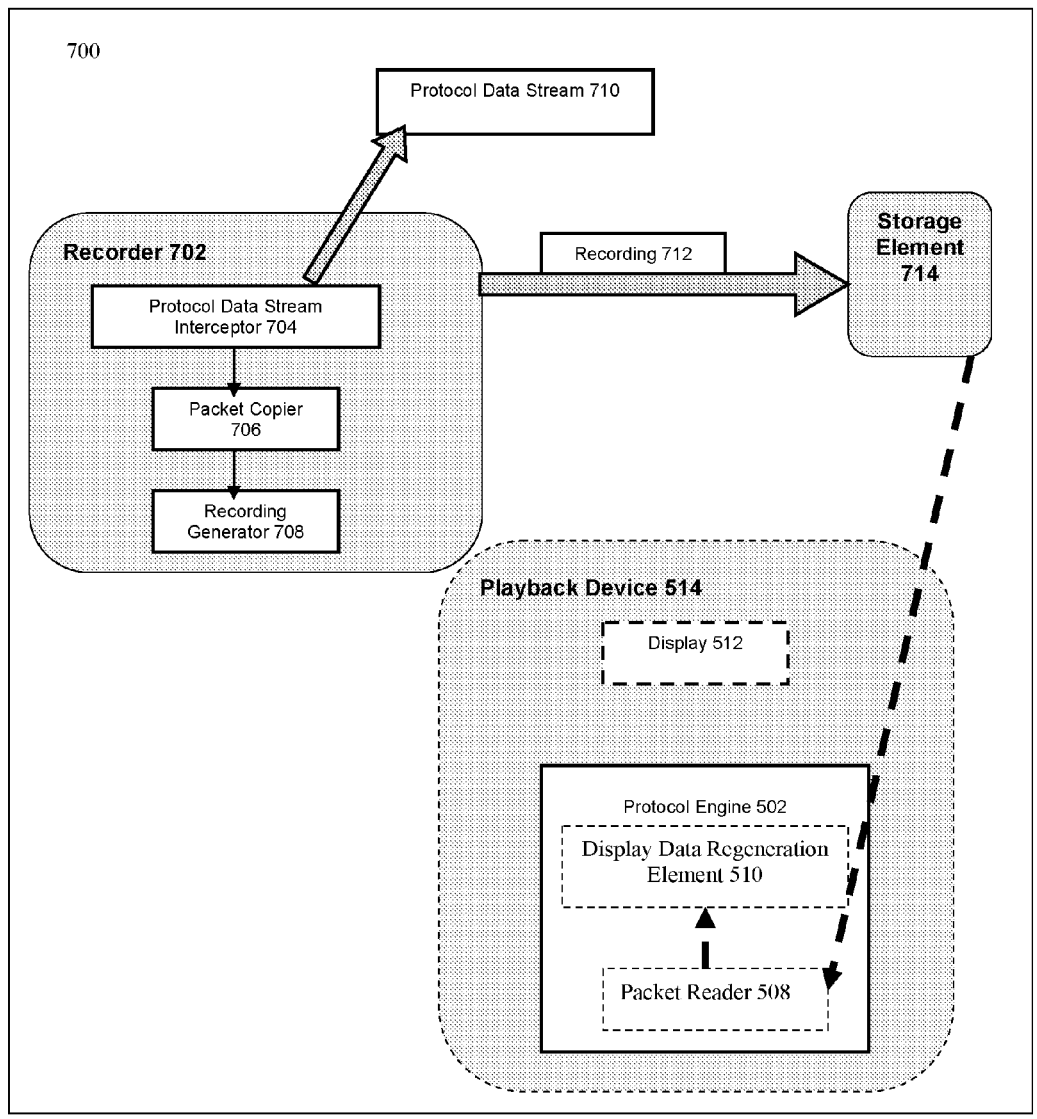
FIG. 7 is a block diagram depicting in greater detail a recorder in a system for recording display data represented by a protocol data stream.

Referring ahead now to FIG. 7, a block diagram depicts in greater detail the recorder 702, originally described as recorder 206 in FIG. 2. In brief overview, the recorder 702 records server-generated data through interception of a protocol data stream 710 and through the creation of a recording 712 of the protocol data stream 710.

The recorder 702 includes, in one embodiment, a protocol data stream interceptor 704, a packet copier 706, and a recording generator 708. In one embodiment, the recorder 702 uses the protocol data stream interceptor 704 to monitor the protocol data stream 710. In another embodiment, the recorder 702 uses the protocol data stream interceptor 702 to intercept a protocol data stream 710 comprising a plurality of packets transmitted from a first device 202 to a second device 212. The packet copier 706 copies at least one packet of the protocol data stream. The packet copier 706 determines whether or not to copy a packet in the protocol data stream. In some embodiments, the packet copier 706 makes this determination responsive to a policy. In these embodiments, the packet copier 706 may determine to copy a packet based on whether or not the packet contains any data or on the type of data contained within the packet.

In one embodiment, the recorder 702 utilizes a recording generator 708 to create a recording of the protocol data stream using the at least one copied packet. The recording generator assembles the at least one copied packet into a recording 712 of the protocol data stream 710. In some embodiments, the recording generator 708 embeds information into the recording of the protocol data stream. This information may comprise, without limitation, time references indicating when to regenerate the display data represented by the data contained within the packet, data length indicators descriptive of the data contained within the packet, or other types of information used to regenerate the display data represented by the data contained within the protocol data stream 710.

Figure 8:
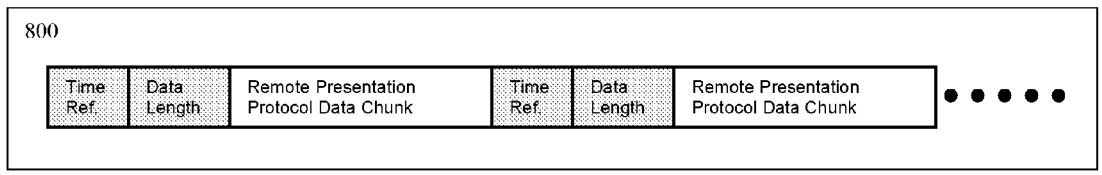
FIG. 8 depicts one embodiment of a recording of a protocol data stream.

FIG. 8 depicts one embodiment of the recording 712 of the protocol data stream 710. In the embodiment shown, the recording generator 708 has grouped at least one copied packet into remote presentation protocol data chunks. The recording generator 708 associated a time reference and a data length with each remote presentation protocol data chunk and assembled the information and the packets together into the recording 712 of the protocol data stream 710.

Referring back to FIG. 7, in one embodiment, the recorder 702 stores the completed recording 712 of the protocol data stream 710 to a storage element 714. In some embodiments, the storage element is located on a network and the recorder 702 transmits the recording 712 over a network to the storage element 714. In other embodiments, the storage element is located on a proxy server computing device. In still other embodiments, the storage element is located on a passthrough server computing device. In some embodiments, the storage element 714 resides on the same device as the recorder 702.

In one embodiment, depicted in shadow by FIG. 7, a system for recording and playback of a protocol data stream comprises the recorder 702 as well as the playback device 514 discussed in FIG. 5. The playback device 514 includes the protocol engine 502, which uses the packet reader 508 to receive and read at least one copied packet from the recording 712 of the packet data stream and uses the embedded information to regenerate the display data represented by the recording 712 of the protocol data stream. In some embodiments, the protocol engine 502 reads the packets sequentially in regenerating the display data.

In another embodiment depicted by FIG. 7, a system for recording and replaying server-generated data comprises a recorder 702, a storage element 714, and a protocol engine 502. The recorder 702 generates a recording of a protocol data stream and stores the recording 712 in the storage element 714. The recorder copies at least one packet from the protocol data stream and associates information with the at least one packet, including but not limited to a time reference or a data length indicator describing a length of data in the packet. The protocol engine 502, in communication with the storage element 714, reads at least one packet from the recording of the protocol data stream and uses information associated with the at least one packet to regenerate the display data represented by the recording 712 of the protocol data stream 710.

In one embodiment, the recorder 702, protocol engine 502, or storage element 714 may be located, together or separately on the first device 202. In other embodiments, they may be located, together or separately, on the second device 212. In still other embodiments, they may reside, together or separately, on a third device, such as a proxy server computing device, a network packet sniffer, or a passthrough server computing device. In yet other embodiments, the storage element 714 may reside on a storage area network separately from the recorder 702 and the protocol engine 502.

Figure 6:
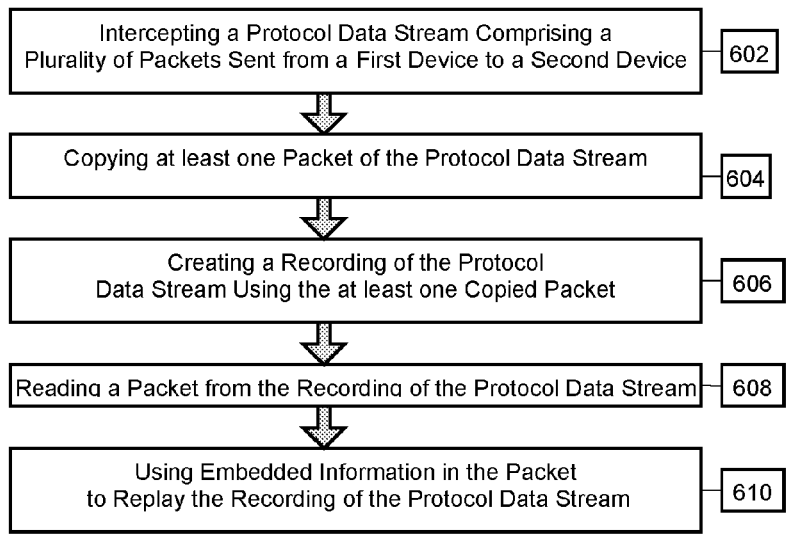
FIG. 6 is a flow diagram depicting a method for recording and replaying server-generated data.

Referring now to FIG. 6, a flow diagram summarizes a method for recording and replaying server-generated data. In brief overview, a recorder 206 intercepts a protocol data stream 208 comprising a plurality of packets transmitted from a first device 202 to a second device 212 (step 602). The recorder 206 copies at least one packet from the protocol data stream 208 (step 604) and creates a recording of the protocol data stream 210 (step 606) which a protocol engine 502 later uses in regenerating display data represented by the recorded protocol data stream 210 (steps 608, 610).

A recorder 206 intercepts a protocol data stream 208 comprising a plurality of packets, representing display data transmitted from a first device 202 to a second device 212. The recorder 206 copies at least one packet of the protocol data stream 208. The recorder 206 creates a recording of the protocol data stream using the at least one copied packet. The recorder 206, in some embodiments, associates information with the at least one copied packet. The information may comprise a time stamp or a data length indicator. In some of these embodiments, the recorder 206 embeds the information associated with the packet into the recording of the protocol data stream 210. In others of these embodiments, the recorder 206 stores the information associated with the packet in a separate protocol data stream. In still others of these embodiments, the recorder stores the information associated with the packet in a data store. A protocol engine 502 reads the at least one copied packet from the recording of the protocol data stream 210 and uses information associated with the at least one copied packet to regenerate the display data represented by the protocol data stream 210.

Figure 11:
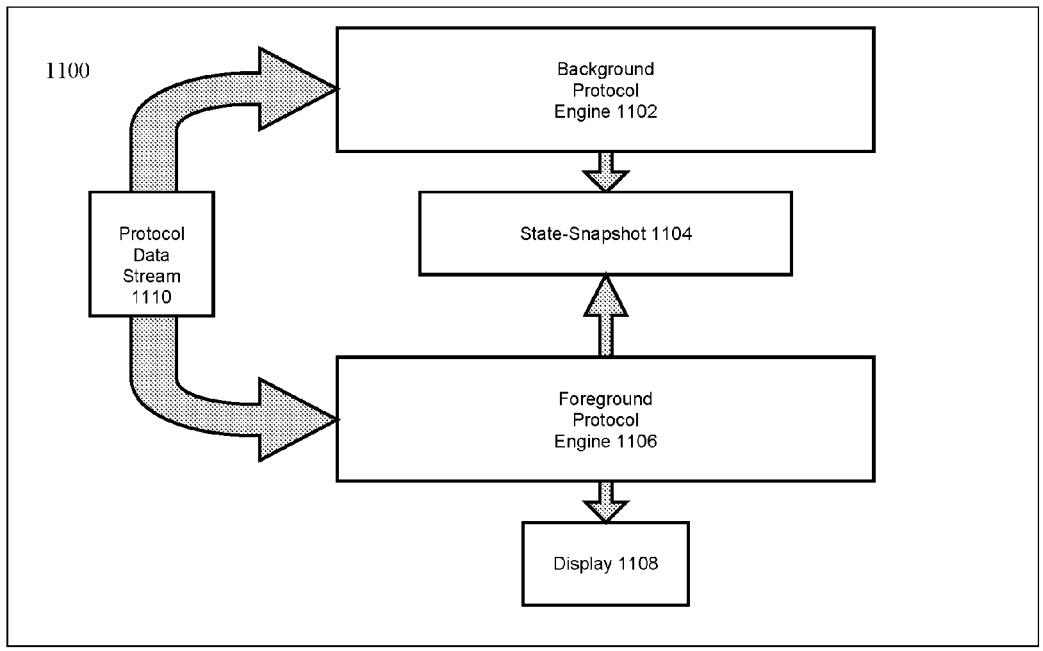
FIG. 11 is a block diagram depicting a system for real-time seeking during playback of stateful remote presentation protocols.

Referring ahead now to FIG. 11, a block diagram depicts a system for real-time seeking during playback of stateful remote presentation protocols. In brief overview, this figure depicts an embodiment of a playback device 514 (see FIG. 5 above) comprising two protocol engines 502, a background protocol engine 1102 and a foreground protocol engine 1106, as well as a state-snapshot 1104 and a display 1108. The background protocol engine 1102 receives a recording of a protocol data stream 1110 and reads the recording of the protocol data stream 1110, which comprises a plurality of packets and represents display data. In one embodiment, the playback device 514 regenerates the display data by rendering the contents of at least one packet in the protocol data stream 1110 and displaying the results using the display 1108. The results include, without limitation, perceptible audio, visual, tactile, or olfactory presentations.

Referring now to FIG. 11, and in greater detail, the background protocol engine 1102 enables a recipient of the rendered display data to seek for content in real-time during the presentation of a protocol data stream 1110. The background protocol engine 1102 generates at least one state-snapshot 1104 while reading at least one packet from the protocol data stream 1110. In one embodiment, the background protocol engine 1102 renders the contents of the at least one packet to a buffer. In this embodiment, the buffer may comprise an off-screen buffer. In this embodiment, the background protocol engine 1102 generates at least one state-snapshot 1104 as it renders the contents of the at least one packet. The background protocol engine 1102 makes the state-snapshot 1104 available to the foreground protocol engine 1106.

The state-snapshot 1104 enables regeneration of display data because it stores a state of a protocol engine rendering the protocol data stream 1110 at a point in time when a recorder 206 copied at least one packet from the protocol data stream 208 into the recording of the protocol data stream 1110. In one embodiment, the state-snapshot 1104 comprises a data structure describing a state of a screen at a point in time. In another embodiment, the state-snapshot 1104 represents all the variables, images and data components that make up the state of a protocol engine at a reference point in the protocol data stream 1110. The foreground protocol engine 1106 also receives the recording of the protocol data stream 1110 and renders the contents of the at least one packet in the protocol data stream 1110 by recreating the state of the protocol engine which originally rendered the protocol data stream 1110. In one embodiment, the foreground protocol engine 1106 uses the contents of the state-snapshot 1104 to render the contents of the at least one packet.

In one embodiment, the state-snapshot 1104 comprises a data structure. In other embodiments, the state-snapshot 1104 comprises a database. In one embodiment, the contents of the state-snapshot 1104 include display data regarding the state of a visible surface. In another embodiment, the contents of the state-snapshot 1104 include display data regarding the state of an off-screen surface. In yet another embodiment, the contents of the state-snapshot 1104 include display data regarding the state of a drawing object. In some embodiments, the contents of the state-snapshot 1104 include display data regarding the state of a color palette. In other embodiments, the contents of the state-snapshot 1104 include display data regarding the state of a cached object. In still other embodiments, the contents of the state-snapshot 1104 include display data regarding the state of a buffer.

The foreground protocol engine 1106 receives the recording of the protocol data stream 1110 and uses the state-snapshot 1104 to identify a packet containing the representation of the requested digital data and to render the packet. In some embodiments, the foreground protocol engine 1106 generates a real-time perceptible representation of the recording of the protocol data stream 1110 for presentation to a viewer using the display 1108. In some embodiments, the foreground protocol engine 1106 generates the real-time perceptible representation by rendering the contents of at least one packet in the protocol data stream 1110. The perceptible representation may include, without limitation, separately or together, audio, visual, tactile, or olfactory presentations.

In one of the embodiments in which the foreground protocol engine 1106 renders the contents of at least one packet in the protocol data stream 1110, the foreground protocol engine 1106 initiates rendering the contents of at least one packet in the protocol data stream 1110 simultaneous to the rendering by the background protocol engine 1102. However the background protocol engine 1102 renders only to a buffer and completes the rendering and the generation of the at least one state-snapshot 1104 prior to the completion of the real-time perceptible rendering initiated by the foreground protocol engine 1106, which, in one embodiment, renders to both a buffer and in a perceptible manner. In one embodiment, the background protocol engine 1102 renders the protocol data stream 1110 at a maximum possible speed regardless of any timestamps associated with the recording which would otherwise specify a time for rendering. Therefore, at least one state-snapshot 1104 is available to the foreground protocol engine 1106 during its generation of a real-time perceptible representation of the recording of the protocol data stream 1110.

In one embodiment, the foreground protocol engine 1106 renders the contents of the plurality of packets within the recording of the protocol data stream 1110 in a sequential manner. In this embodiment, the display data rendered and presented to the user presents the display in the order in which it occurred at the time the protocol data stream was recorded. The recording of the protocol data stream 1110 may include information, such as time stamps, for use by the foreground protocol engine 1106 in rendering the display data sequentially. In some embodiments, the foreground protocol engine 1106 renders the display data in real-time. When the foreground protocol engine 1106 receives a request to regenerate a particular display data represented by a particular packet in the recording of the protocol data stream 1110, the foreground protocol engine 1106 renders the requested display data using the contents of the identified state-snapshot 1104.

In some embodiments, the background protocol engine 1102 and the foreground protocol engine 1106 reside on the same device. In other embodiments, the background protocol engine 1102 and the foreground protocol engine 1106 reside on separate devices.

Figure 9:
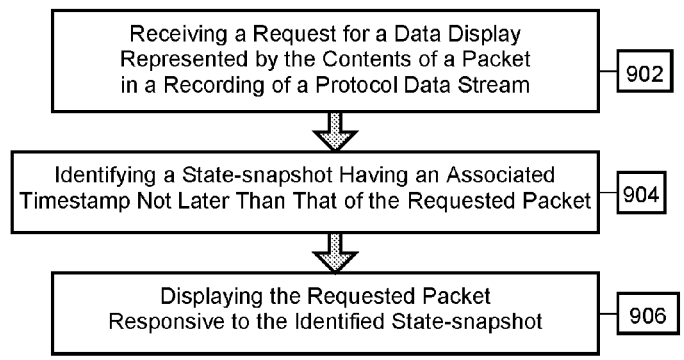
FIG. 9 is a flow diagram depicting one embodiment of the steps taken in a method for real-time seeking during playback of stateful remote presentation protocols.

Referring back now to FIG. 9, a flow diagram depicts one embodiment of the steps taken in a method for real-time seeking during playback of stateful remote presentation protocols. In brief overview, there is a request for rendering of data display represented by the contents of a packet in a recording of a protocol data stream (step 902). The contents of the appropriate packet are rendered by first identifying a state-snapshot having an associated timestamp not later than a timestamp associated with the requested packet (step 904) and rendering the requested contents responsive to the identified state-snapshot (step 906).

In one embodiment, the foreground protocol engine 1106 receives a request to render the contents of a packet in a recording of a protocol data stream 1110. The protocol data stream 1110 comprises a plurality of packets whose contents represent display data. In some embodiments, the request results when the foreground protocol engine 1106 regenerates display data by rendering the contents of a packet in a recording of a protocol data stream 1110 to a viewer using the display 1108 and the viewer wishes to seek for a particular display data.

The foreground protocol engine 1106 identifies a state-snapshot 1104 having an associated timestamp not later than a time stamp associated with the requested packet. The foreground protocol engine 1106 displays the display data represented by the contents of the requested packet responsive to the identified state-snapshot 1104. In one embodiment, the identified state-snapshot 1104 indicates the exact packet from the protocol data stream 1110 whose contents the foreground protocol engine 1106 may render to provide the user with the requested display data.

In other embodiments, the identified state-snapshot 1104 comprises a state of a protocol engine rendering the protocol data stream at a point in time when a recorder copied a packet from the protocol data stream 1110 but the display data represented by the contents of the copied packet precede the display data requested by the viewer. In some of these embodiments, there are multiple packets between the state-snapshot and the packet containing the representation of the requested display data. In some of those embodiments, the foreground protocol engine 1106 renders the contents of the intermediate packet or packets only to an off-screen buffer. The foreground protocol engine 1106 then renders the packet whose contents represent the display data both to an off-screen buffer and to the user in a perceptible manner. In one embodiment, the foreground protocol engine 1106 presents the display data represented by the contents of the intermediate packets in a perceptible manner prior to the display data represented by the contents of the requested packet.

Figure 10:
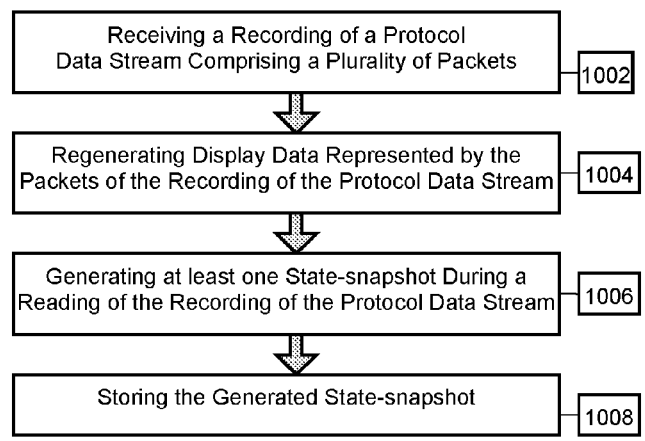
FIG. 10 is a flow diagram depicting one embodiment of the steps taken to generate state-snapshots enabling real-time seeking during playback of remote presentation protocols.

Referring now to FIG. 10, a flow diagram depicts one embodiment of the steps taken to generate state-snapshots enabling real-time seeking during playback of remote presentation protocols. In brief overview, the background protocol engine 1102 receives a recording of a protocol data stream 1110 and while regenerating display data represented by the contents of the plurality of packets within the protocol data stream 1110, generates at least one state-snapshot.

The background protocol engine 1102 receives a recording of a protocol data stream 1110 comprising a plurality of packets (step 1002). The background protocol engine 1102 generates a representation of the recording of the protocol data stream. In one embodiment, the background protocol engine 1102 generates the representation by rendering the contents of the plurality of packets to a buffer. In some embodiments, the buffer is an off-screen buffer.

In some embodiments, the foreground protocol engine 1106 also receives the recording of the protocol data stream 1110. In these embodiments, the foreground protocol engine 1106 generates a human-perceptible representation of the recording of the protocol data stream, although, as discussed above, the foreground protocol engine 1106 renders both to an off-screen buffer and in a perceptible manner (step 1004).

In one of these embodiments, the foreground protocol engine 1106 generates a human-perceptible representation of the recording of the protocol data stream 1110 by rendering the contents of the plurality of packets substantially simultaneously with the background protocol engine 1102 generating at least one state-snapshot during its reading of the recording of the protocol data stream.

After the reading of the at least one packet in the recording of the protocol data stream 1110, the background protocol engine 1102 generates at least one state-snapshot (step 1006). In one embodiment, the background protocol engine 1102 generates at least one state-snapshot during a sequential reading of the recording of the protocol data stream 1110. In another embodiment, the background protocol engine 1102 reads the at least one packet in the recording of the protocol data stream 1110 substantially simultaneously with a rendering of the contents of the packet to a buffer. In one embodiment, the background protocol engine 1102 then stores the generated state-snapshot 1104 (step 1008). In embodiments where the background protocol engine 1102 generates multiple state-snapshots periodically, the state-snapshots may act as markers throughout the recording of the protocol data stream 1110, assisting in the location of a particular point in time in the protocol data stream 1110 and of the packets that come before or after the state-snapshot 1104.

Figure 12:
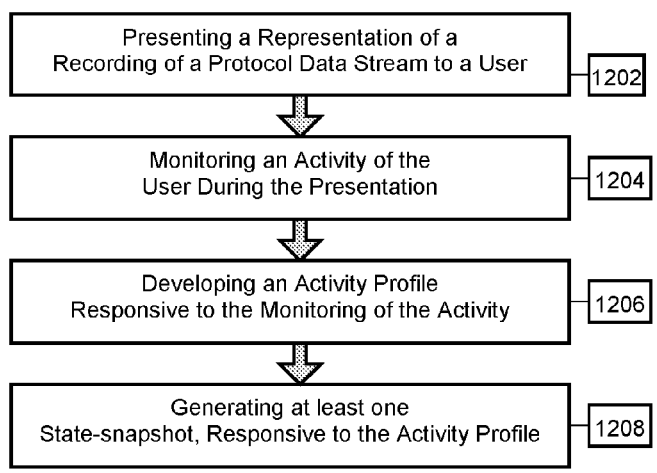
FIG. 12 is a flow diagram depicting one embodiment of steps taken for adaptive generation of state-snapshots.

Referring ahead to FIG. 12, a flow diagram depicts one embodiment of steps taken for adaptive generation of state-snapshots. In brief overview, the background protocol engine 1102 monitors an activity of a viewer and generates one or more state snapshots 1104 responsive to the level of activity of a viewer.

During a presentation of a representation of a recording of a protocol data stream 1110 to a user (step 1202), a background protocol engine 1102 monitors an activity of the user (step 1204). In one embodiment, the foreground protocol engine 1106 generates the representation of the recording of the protocol data stream 1110 and presents it to the user with the display 1108. In other embodiments, the background protocol engine 1102 generates the representation. In still other embodiments, a third device generates the representation.

The background protocol engine 1102 monitors an activity of the user during the presentation (step 1204). By monitoring the activity of the user, the background protocol engine 1102 develops an activity profile responsive to the monitoring of the activity (step 1206). The background protocol engine generates at least one state-snapshot 1104 responsive to the developed activity profile (step 1208).

In some embodiments, the background protocol engine 1102 identifies a level of activity of the user. In some embodiments, the background protocol engine 1102 identifies a period of inactivity. In other embodiments, the background protocol engine 1102 identifies an area of interest to the user in the display data. The activity profile reflects these identifications.

The background protocol engine 1102 generates at least one state-snapshot responsive to the activity profile. In some embodiments, the background protocol engine 1102 determines to extend an interval between one or more state-snapshots. In other embodiments, the background protocol engine 1102 determines to reduce an interval between one or more state-snapshots. In still other embodiments, the background protocol engine 1102 determines to remove the at least one state-snapshot, responsive to the activity profile. In still other embodiments, the background protocol engine 1102 determines to add at least one state-snapshot, responsive to the activity profile.

Figure 13:
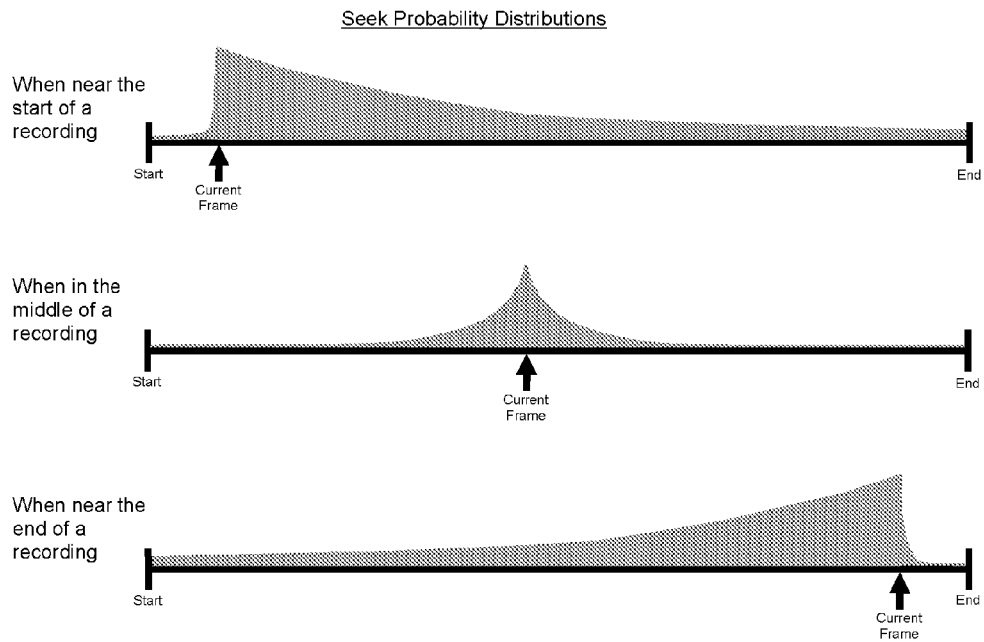
FIG. 13 is a diagram depicting three types of seek probability distributions of one embodiment.

In one embodiment, the background protocol engine 1102 identifies a predicted statistical distribution of seek probabilities. FIG. 13 is a diagram depicting three types of seek probability distributions of one embodiment. In this embodiment, the background protocol engine 1102 collects and stores data about the seek requests made by a user. In one embodiment, the data includes how regularly the user makes a seek request. In one embodiment, the data includes the range, of each seek request—the distance between the requested display data and the current display data presented to the user by rendering the contents of a packet in the recording of the protocol data stream 1110. The range may be described in units of time or relative to the length of the entire recording of the protocol data stream 1110. In one embodiment, the timestamp at which the seek request was made is recorded.

Figure 14:
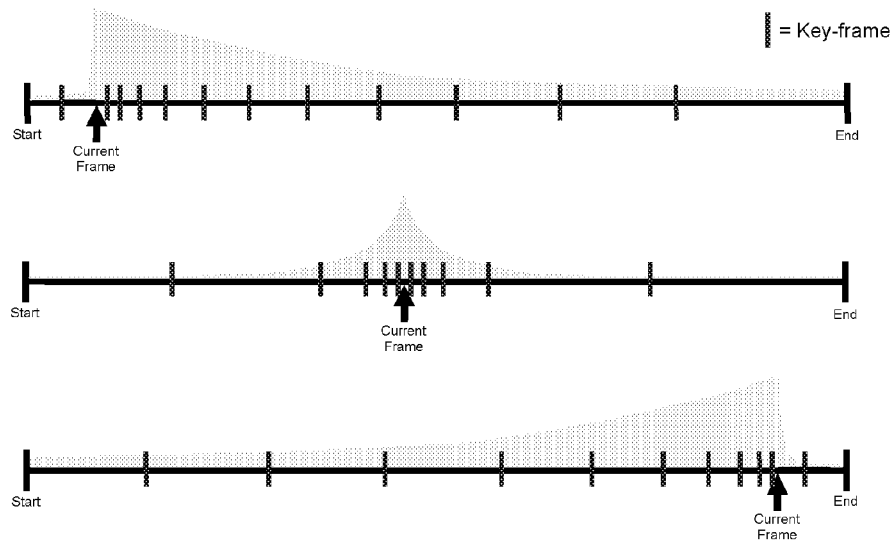
FIG. 14 is a diagram depicting one embodiment of generating state-snapshots responsive to a determined seek probability distribution.

FIG. 14 is a diagram depicting one embodiment of generating state-snapshots responsive to a determined seek probability distribution. The background protocol engine 1102 uses the collected seek request data to generate a seek probability distribution graph centered on the currently presented display data. The background protocol engine 1102 assigns each position in the stream a value indicating the estimated probability the user will request to seek to the display data associated with that position. With this data, the background protocol engine 1102 determines where to place generated state-snapshots 1104 and generates the at least one state-snapshot 1104 responsive to the statistical distribution of seek probabilities.

Figure 15:
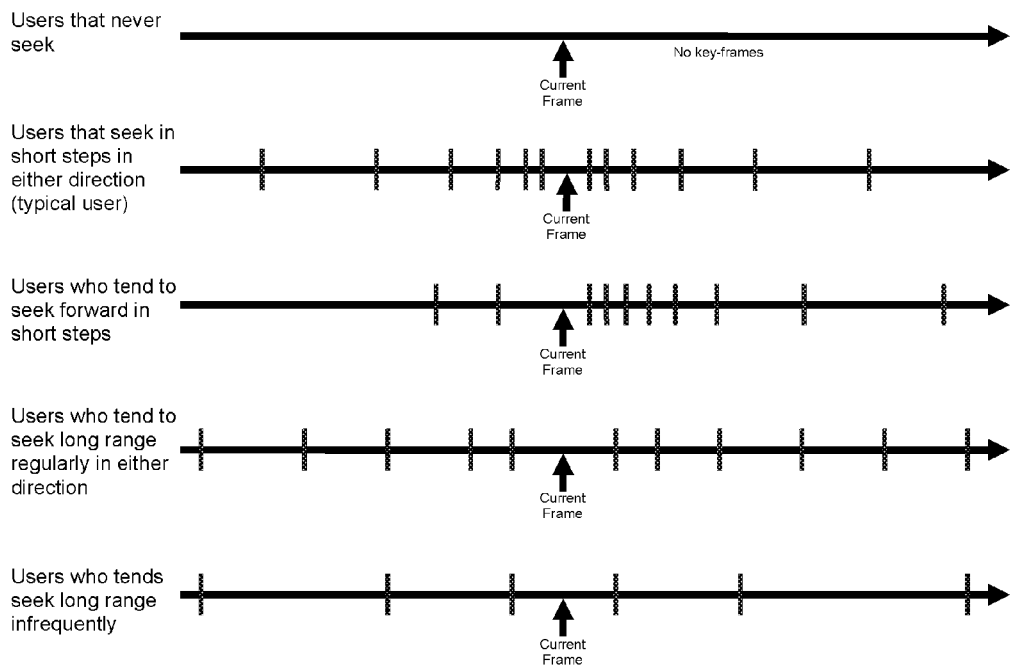
FIG. 15 depicts one embodiment of a usage pattern for a user of a presentation of a protocol data stream.

FIG. 15 depicts one embodiment of a usage pattern of the user. In one embodiment, the background protocol engine 1102 develops an activity profile for a user based upon a usage pattern of the user. The usage pattern reflects identified seek probabilities. Areas of higher seek probability will be provided with a higher state-snapshot density and areas of lower seek probability will be provided with a lower state-snapshot density. In some embodiments, the distance between any pair of state-snapshot is inversely proportional to the average seek probability between them. The background protocol engine 1102 expects the user to seek to higher probability areas, therefore the majority of seeks will be fast as the spacing between generated state-snapshots 1104 is relatively short. To ensure no individual seek request is excessively slow, in one embodiment the background protocol engine 1102 will impose an upper bound on the spacing of generated state-snapshots 1104 even when the seek probability is very low. Likewise, in another embodiment a lower bound prevents placing state-snapshots too close together in very high probability areas. In some embodiments, the amount of rendering between adjacent state-snapshots is considered when determining state-snapshot placement, to minimize latency.

For embodiments with new users or users without a distinguishable usage pattern, the background protocol engine 1102 applies a default state-snapshot generation pattern. This pattern assumes most seeking will occur close to the current frame in either direction, but long range seek performance must only be at best satisfactory. The typical user will demand high performance when jogging back-and-forth around the current frame as many small seek steps can be achieved with jog wheel input device. Seeking long range is less common and noticeable delays may be an acceptable trade-off.

If the user strays from their recognized usage pattern, the background protocol engine 1102 adjusts the state-snapshot generation pattern during live playback without the user's knowledge. The background protocol engine 1102 moves state-snapshot positions to adjust for the new usage pattern. For example, if a user that normally seeks in small steps with the mouse wheel begins seeking longer range, the background protocol engine 1102 reduces the number of state-snapshots around the current frame to free resources for adding state-snapshots within the areas at longer range.

Figure 16:
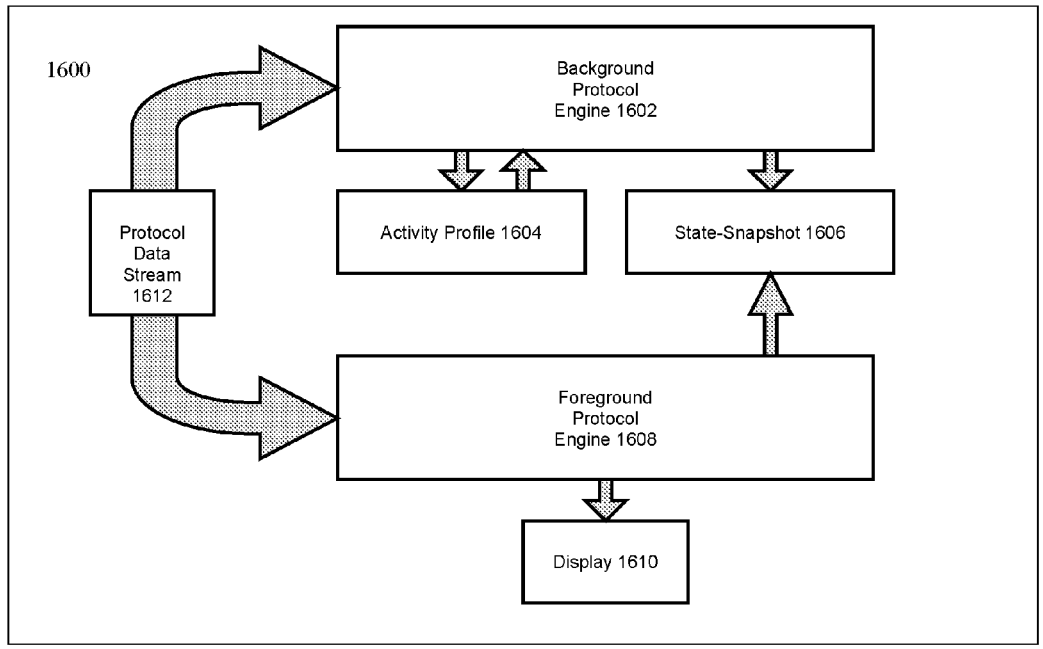
FIG. 16 is a block diagram depicting one embodiment of a system for adaptive generation of state-snapshots, including a background protocol engine, a foreground protocol engine, a protocol data stream, an activity profile, and a state-snapshot.

FIG. 16 summarizes one embodiment of the method discussed above used in a system for adaptive generation of state-snapshots, including a background protocol engine 1602, a foreground protocol engine 1608, a protocol data stream 1612, an activity profile 1604, and a state-snapshot 1606. The foreground protocol engine 1608 presents a representation of a recording of a protocol data stream to a viewer. The background protocol engine 1602 monitors an activity of the viewer during the presentation, develops an activity profile 1604 responsive to the monitoring and generates and maintains a state-snapshot 1606 responsive to the activity profile.

Figure 18:
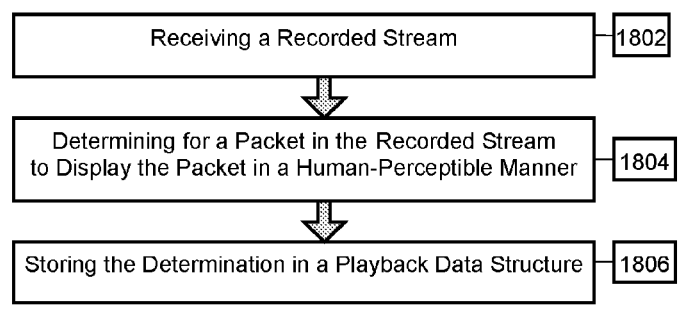
FIG. 18, a flow diagram depicts one embodiment of the steps taken to generate playback instructions for playback of a recorded computer session.

Referring ahead now to FIG. 18, a flow diagram depicts one embodiment of the steps taken to generate playback instructions for playback of a recorded computer session. In brief overview, a protocol engine, executing on a first device, receives a recorded session (step 1802). The recorded stream comprises a plurality of packets representing display data generated by an application program executed on a second device. The protocol engine determines for a packet in the recorded stream, to render the contents of the packet in a human-perceptible manner (step 1804). Then the protocol engine stores the determination in a playback data structure (step 1806).

In one embodiment, the protocol engine comprises a protocol engine 502, as described in FIG. 5 above. In other embodiments, the protocol engine comprises a background protocol engine 1102, as described in FIG. 11. In still other embodiments, the protocol engine comprises a foreground protocol engine 1106, as described in FIG. 11. In some embodiments, where the protocol engine comprises a background protocol engine 1102, the protocol engine may cease performing a functionality of a background protocol engine 1102 and begin performing a functionality of a foreground protocol engine 1106. In some embodiments, where the protocol engine comprises a foreground protocol engine 1106, the protocol engine may cease performing a functionality of a foreground protocol engine 1106 and begin performing a functionality of a background protocol engine 1102. In other embodiments, the protocol engine comprises both a protocol engine 1102 and a foreground protocol engine 1006. In some of these embodiments, the background protocol engine 1102 and the foreground protocol engine 1106 reside on the same device. In other embodiments, the background protocol engine 1102 and the foreground protocol engine 1106 reside on separate devices.

In one embodiment, the protocol engine determines for a packet in the recorded stream to display the packet in a human-perceptible manner (step 1804). The display includes, without limitation, audio, visual, tactile, or olfactory presentations, or combinations of these. In some embodiments, the protocol engine determines to display a packet responsive to the contents of the packet. In one of these embodiments, the protocol engine makes the determination responsive to an indication of an application program having input focus. In another of these embodiments, the protocol engine makes the determination responsive to an evaluation of a type of user input stored in the packet. In some of these embodiments, the protocol engine makes the determination responsive to an evaluation of a type of graphics update stored by the packet. In others of these embodiments, the protocol engine makes the determination responsive to an evaluation of a type of interaction sequence stored by the packet.

In one embodiment, the protocol engine stores the determination in a playback data structure (1806). In some embodiments, a playback data structure describes how to regenerate the display data contained within the recorded stream. In one embodiment, the instructions stored within the playback data structure control the process of rendering display data. In one embodiment, the playback data structure comprises a time for rendering the contents of a packet in the recorded stream. In this embodiment, the time contained in the playback data structure is used for rendering the contents of the packet and not a time of rendering associated with the packet in the recording, if any. In one embodiment, the playback data structure accepts user input in changing the time of rendering.

In some embodiments, the playback data structure comprises metadata that describes how to perform one or more playbacks of a recorded session. In one embodiment, the playback data structure consists of a record for each packet in the recorded stream, indicating at what relative point in time the contents of that packet should be rendered during playback. In some embodiments, the metadata also contains the offset within the file of the start of the packet.

Figure 17:
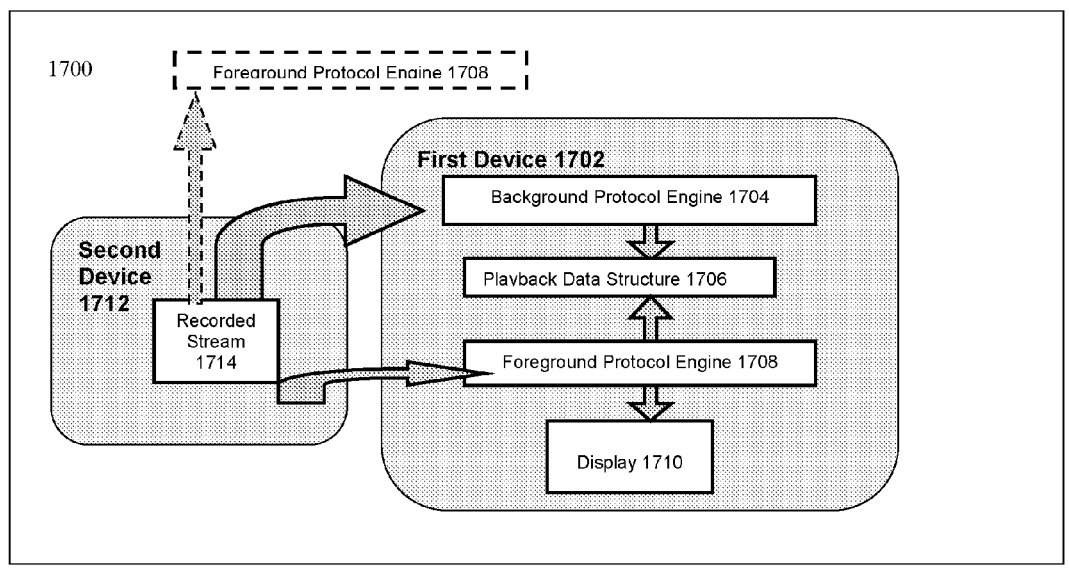
FIG. 17 is a block diagram depicting one embodiment of a system for rendering a recorded session.

Referring back to FIG. 17, a block diagram depicts one embodiment of a system for rendering a recorded session, including a first device 1702, a background protocol engine 1704, a playback data structure 1706, a foreground protocol engine 1708, a display 1710, a second device 1712, and a recorded stream 1714. The background protocol engine 1704 executes on a first device 1702 and generates a playback data structure 1706 in response to receiving a recorded stream 1714, said recorded stream 1714 representing display data generated by an application program executed on a second device 1712 or on a third device. The foreground protocol engine 1708, receives the recorded stream 1714 and renders the recorded stream 1714 responsive to the playback data structure 1706 generated by the background protocol engine 1704.

In one embodiment, the background protocol engine 1704 and the foreground protocol engine 1708 each receive the recorded stream 1714. In this embodiment, the background protocol engine 1704 generates the playback data structure substantially simultaneously with the foreground protocol engine 1708 rendering the recorded stream.

In one embodiment, the foreground protocol engine 1708 resides on the first device 1702. In another embodiment, shown in shadow in FIG. 17, the foreground protocol engine 1708 resides neither on the first device 1702 nor on the second device 1712. In still another embodiment, the foreground protocol engine 1708 resides on a third device. In some embodiments, the foreground protocol engine 1708 comprises a background protocol engine 1704. In some of these embodiments, the background protocol engine 1102 and the foreground protocol engine 1106 reside on the same device. In others of these embodiments, the background protocol engine 1102 and the foreground protocol engine 1106 reside on separate devices.

In one embodiment, the background protocol engine stores in the playback data structure at least one instruction for rendering at least one packet in the recorded stream. In another embodiment, the background protocol engine stores metadata in the playback data structure. In yet another embodiment, the background protocol engine stores in the playback data structure a record indicating a time to render at least one packet in the recorded session.

The foreground protocol engine 1708 renders at least one packet in the recorded session responsive to the playback data structure. In one embodiment, the foreground protocol engine renders at least one packet in the recorded session in a human-perceptible manner and to a buffer. In another embodiment, the foreground protocol engine renders at least one packet in the recorded session to a buffer.

Figure 19:
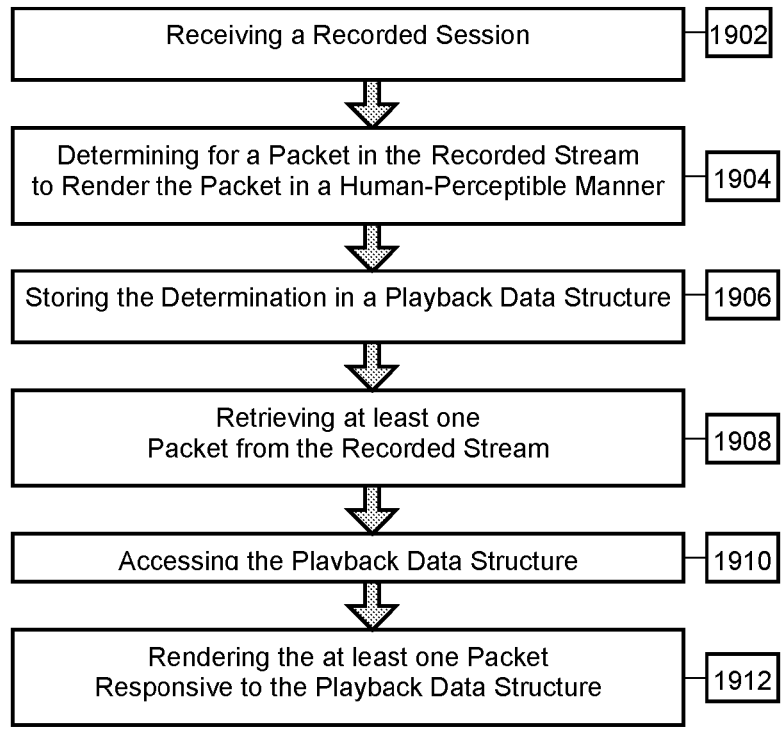
FIG. 19 is a flow diagram depicting one embodiment of the steps taken in a method for playback of a recorded computer session.

Referring ahead to FIG. 19, a flow diagram depicts one embodiment of the steps taken in a method for playback of a recorded computer session. In brief overview, a background protocol engine receives a recorded stream comprising a plurality of packets representing display data generated by an application program executing on a second device (step 1902). The background protocol engine determines for at least one packet in the recorded stream, to render the packet in a human-perceptible manner (step 1904). The background protocol engine stores the determination in a playback data structure (step 1906). A foreground protocol engine retrieves at least one packet from the recorded stream (step 1908), access the playback data structure (step 1910), and renders the at least one packet responsive to the playback data structure (step 1912).

In one embodiment, the protocol engine determines for a packet in the recorded stream to display the packet in a human-perceptible manner (step 1904). The display includes, without limitation, audio, visual, tactile, or olfactory presentations, or combinations of these. In some embodiments, the protocol engine determines to display a packet based responsive to the contents of the packet. In one of these embodiments, the protocol engine makes the determination responsive to an indication of an application program having input focus. In another of these embodiments, the protocol engine makes the determination responsive to an evaluation of a type of user input stored in the packet. In some of these embodiments, the protocol engine makes the determination responsive to an evaluation of a type of graphics update stored by the packet. In others of these embodiments, the protocol engine makes the determination responsive to an evaluation of a type of interaction sequence stored by the packet. In one embodiment, the protocol engine stores the determination in a playback data structure (1906).

In one embodiment, the foreground protocol engine receives the recorded session. In other embodiments, the foreground protocol engine retrieves the recorded session. In some of these embodiments, the foreground protocol engine retrieves the recorded session from a storage element.

In one embodiment, the foreground protocol engine retrieves at least one packet from the recorded stream (step 1908). In this embodiment, the foreground protocol engine then accesses the playback data structure (step 1910) and renders the contents of the packet responsive to the playback data structure (step 1912). In some embodiments, the playback data structure contains an instruction to render the contents of the packet in a perceptible manner. In one of these embodiments, the foreground protocol engine renders the contents of the packet on-screen. In some embodiments, the foreground protocol engine always renders the contents of the at least one packet to a buffer. In many embodiments, when the foreground protocol engine renders the contents of a packet to a buffer, it is an off-screen buffer. In one of these embodiments, the foreground protocol engine renders the contents of the packet to an off-screen buffer and also renders the contents of the packet on-screen, as directed by the playback data structure.

In other embodiments, the playback data structure comprises an instruction not to render the contents of the packet in a perceptible manner. In one of these embodiments, upon accessing the playback data structure, the foreground protocol does not render the contents of the packet in a perceptible manner but does render the contents of the packet to a buffer.

For embodiments in which the foreground protocol engine renders the contents of a packet only to an off-screen buffer, responsive to the playback data structure, the foreground protocol engine perceptibly regenerates display data differing from the recorded stream. This results, in one embodiment, in a presentation of display data shorter than the original recorded stream. In some embodiments, the rendered contents of the packets provide a streamlined regeneration of the original display data. In other embodiments, the rendered contents of the packets provide a customized version of the display data. In one embodiment, the determination to render the contents of the packet in a perceptible manner is responsive to a policy or user request. These embodiments provide users with control over the playback of the recorded session.

Figure 21:
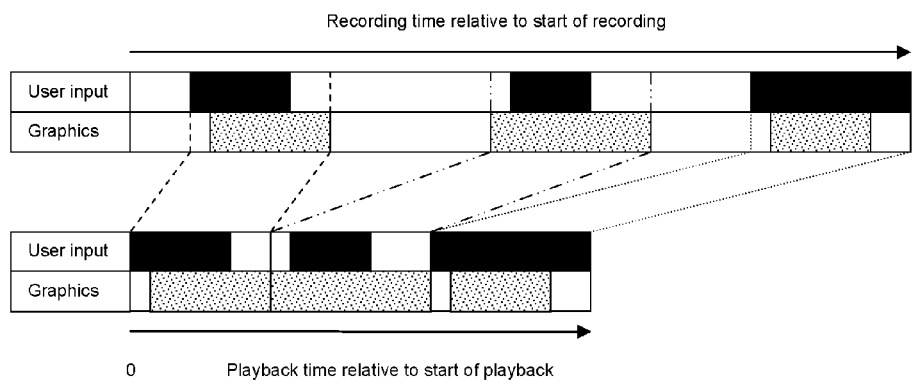
FIG. 21 depicts one embodiment of a regenerated recorded stream whose contents are rendered responsive to a playback data structure.

Referring ahead to FIG. 21, one embodiment is depicted of rendering a recorded session with perceptible intervals of time containing no activity eliminated. In this figure, black blocks represents a packet or packets containing user input and dotted blocks represents a packet or packets containing graphics commands. The time intervals represented by white blocks in both the "User input" and "Graphics" rows have no packets and hence no activity at all.

One embodiment of a method to eliminate perceptible intervals of time with no activity is as follows. A first packet in a recorded session is identified. The recorded session comprises a plurality of packets representing display data. The nearest previous packet to the first packet in the recorded session is identified as a second packet. A first time interval is determined, the time interval occurring between said first packet and said second packet. A determination is made that the first time interval exceeds a threshold. The contents of the packets in the recorded session are rendered with a second time interval between said first packet and said second packet shorter than the first time interval.

In one embodiment, a protocol engine makes the determinations. In some embodiments, the protocol engine stores the determinations in a playback data structure. In one embodiment, the same protocol engine renders the recorded session responsive to the playback data structure. In another embodiment, the protocol engine making the determinations comprises a background protocol engine and the protocol engine rendering the recorded session comprises a foreground protocol engine.

In one embodiment, when the protocol engine determines that the time interval exceeds the threshold, the protocol engine categorizes the time interval as a perceptible time interval. A time interval is perceptible if a user of the regenerated recorded session can perceive that a period of time lacking activity has elapsed. In some embodiments, a policy determines the threshold. In other embodiments, the protocol engine is hard coded with a predefined threshold. In this embodiment, the protocol engine stores an instruction in the playback data structure to render a shorter time interval between the first and second packets instead of the original time interval. In another embodiment, the protocol engine determining that the time interval exceeds the threshold also renders the contents of the recorded session. In this embodiment, the protocol engine does not store the instruction to render the shorter time interval in the playback data structure. For a time interval not categorized as perceptible, no shortened time interval is needed and the original time interval is rendered between the first and second packets.

Figure 20:
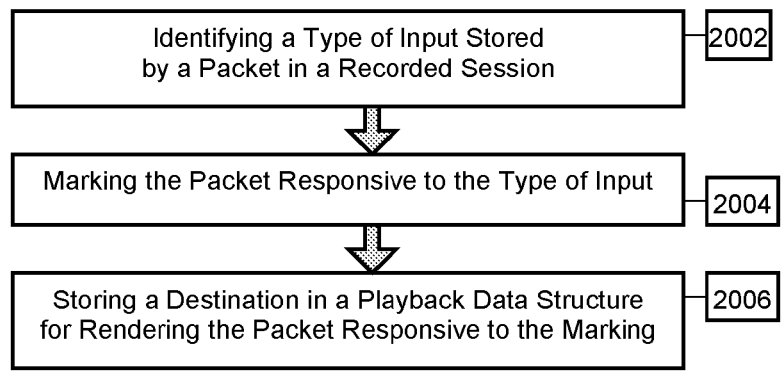
FIG. 20 is a flow diagram depicting one embodiment of the steps taken to generate playback instructions for rendering a recorded session.

Referring back to FIG. 20, a flow diagram depicts one embodiment of the steps taken to generate playback instructions for rendering a recorded session. In brief overview, a type of input stored by a packet in a recorded session is identified (step 2002) and the packet is marked responsive to the type of input (step 2004). Then a destination for rendering the contents of the packet, responsive to the marking, is stored in a playback data structure.

In one embodiment, the type of input stored by a packet determines whether or not the packet will be rendered. In one embodiment, the packet contains no content. In some embodiments, at least one packet contains no content. In these embodiments, an interval of time comprised of at least one packet containing no content is identified. In some of these embodiments, the interval of time will not be rendered.

In some embodiments, the type of input refers to input from certain types of input devices, including, without limitation, a keyboard, a mouse, a microphone, or a camera. In one embodiment the step of identifying the type of input further comprises identifying the type of input as input from an input device. In another embodiment, the step of identifying the type of input further comprises identifying the type of input as keyboard input. In other embodiments, the type of input is not related to the input device. In one of these embodiments, the type of input is identified as a command.

The packet containing the input is marked responsive to the type of input it contains (step 2004). In one embodiment, the packet is marked responsive to a policy. In this embodiment, a policy determines the types of input which result in a packet being marked. In another embodiment, no marking is required.

A destination for rendering the packet is stored in a playback data structure responsive to the marking (step 2006). In some embodiments, the destination comprises a buffer. In one embodiment, an instruction is stored in the playback data structure, directing rendering of the packet to the buffer. In one embodiment, the buffer is an off-screen buffer and when the contents of the packet are rendered to the buffer they are not perceptible to a user of the rendering. In one embodiment, an instruction is stored in the playback data structure, directing rendering of the marked packet both in a perceptible manner and to a buffer.

In one embodiment, the method eliminates perceptible intervals of time containing no meaningful activity. In this embodiment, a policy identifies a particular type of input as meaningful or as insignificant. The policy may be hard coded into a protocol engine, in some embodiments. In other embodiments, an administrator configures the policy.

Figure 22:
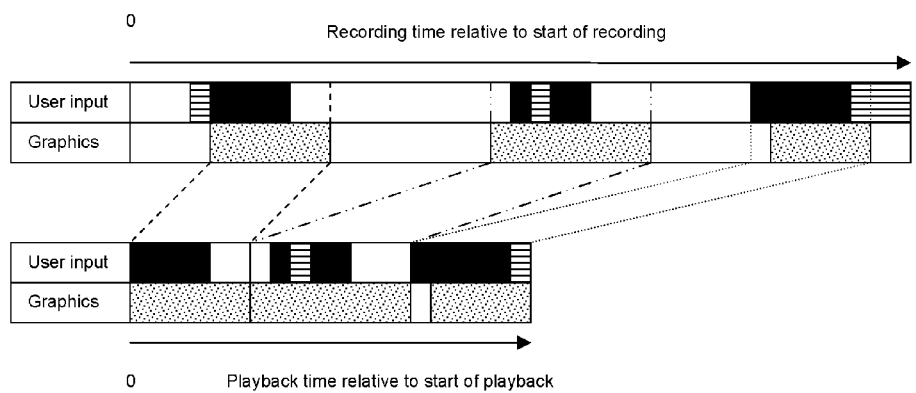
FIG. 22 depicts one embodiment of certain packets in a recording stream having content representing meaningful user activity, in this embodiment a mouse input indicating an active mouse button state.

In some embodiments, a protocol engine identifies a packet as insignificant if the packet contains no content. In some of those embodiments, the packet represents an interval of time in which the no user activity occurred to be recorded into the recorded stream 1714. In these embodiments, the protocol engine stores in a playback data structure a destination for rendering each of the plurality of packets in the recorded stream in such a way that any insignificant packet does not render in a perceptible manner. FIG. 22 depicts one embodiment of a regenerated recorded stream whose contents are rendered responsive to a playback data structure. Rendering responsive to the playback data structure, in this embodiment, allows elimination of intervals of time containing no meaningful activity (depicted by the white and striped blocks in FIG. 22), which includes intervals of time containing no activity at all. This rendering provides a more meaningful regeneration of the recorded session to a user, where a policy determines when content represents meaningful activity. In one embodiment, the content representing meaningful activity comprises types of user input.

In some embodiments, the protocol engine identifies an input type responsive to previously defined input types comprising provably insignificant time. In some embodiments, insignificant time includes an interval of time in which no packet contains any content. In other embodiments, a policy defines the input types, which constitute insignificant time. In still other embodiments, a definition of an input type comprising provably insignificant time is hard coded into the protocol engine.

In some embodiments, the contents of a packet represent user activity but a policy identified the activity as insignificant activity. In one of these embodiments, the policy defines an insignificant activity as activity deemed to be of no interest to a user of the regenerated recorded session. In another of these embodiments, meaningful packets contain contents of interest to a user of the regenerated recorded session, as determined by the policy. In one embodiment, an insignificant packet has no content representing input meaningfully interacting with an application. In another embodiment, the device transmitting application data in the protocol data stream from which the recorded stream was created transmitted no meaningful screen updates.

In one embodiment, the protocol engine determines for at least one packet in the recorded session whether the contents of the packet include types of input such as, without limitation, keyboard input, mouse input, or command messages. If the packet does contain a type of input such as keyboard input, the protocol engine marks the packet as a meaningful packet. If the packet does not contain that type of input, the protocol engine marks the packet as insignificant. In one embodiment, the packet is insignificant only if all of its contents are insignificant. In another embodiment, a packet contains more than one type of input each of which may be marked as meaningful or insignificant.

In one embodiment, when the protocol engine marks a packet as insignificant, the protocol engine determines that the contents of the packet should not render in a perceptible manner. In some embodiments, the protocol engine determines instead that the contents of the packet should render to a buffer. In one of these embodiments, the buffer is an off-screen buffer. If the packet is marked as a meaningful packet, the protocol engine determines, in one embodiment, that the contents of the packet should render in a perceptible manner. In some embodiments, a perceptible manner comprises rendering on-screen. In one embodiment, the protocol engine determines that the packet should render both in a perceptible manner and to a buffer. In this embodiment, the contents of the packet render both to an on-screen display and to an off-screen buffer. The protocol engine stores the determination in the playback data structure.

In one embodiment, depicted in FIG. 22, certain packets in the recording stream have content representing meaningful user activity, in this embodiment a mouse input indicating an active mouse button state represented by the black blocks in FIG. 22. Other packets in the recording stream have content representing mouse input indicating an inactive mouse button state, represented by the striped blocks in FIG. 22. The protocol engine identifies at least one packet containing only insignificant activity, such as a mouse input indicating an inactive mouse button state, and stores in a playback data structure a determination that the contents of the packet should not render in a perceptible manner. By making this determination, a protocol engine rendering the contents of the recorded stream responsive to the playback data structure regenerates only the display data relevant to the user of the regenerated recorded session, where a policy defines relevance or where the protocol engine comprises a definition of relevant content.

Figure 23:
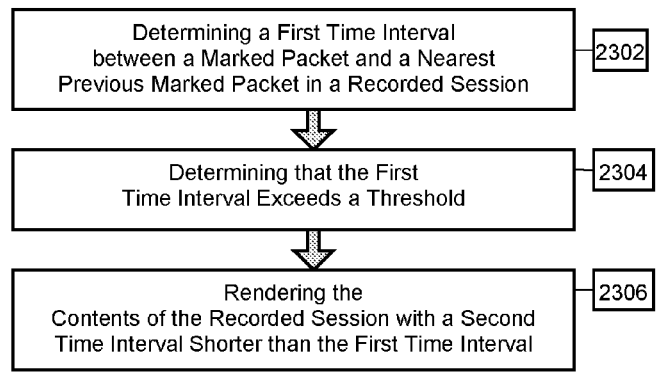
FIG. 23 is a flow diagram depicting one embodiment of the steps taken to eliminate periods with no meaningful activity in rendering a recorded session.

Referring now to FIG. 23, a flow diagram depicts one embodiment of the steps taken to eliminate periods with no meaningful activity in rendering a recorded session. A first time interval is determined, the time interval occurring between a marked packet and a nearest previous marked packet in a recorded session (step 2302). The recorded session comprises a plurality of packets representing display data. A determination is made that the first time interval exceeds a threshold (step 2304). The contents of the packets in the recorded session are rendered with a second time interval between the marked packet and the nearest previous marked packet shorter than the first time interval (step 2306).

In one embodiment, a protocol engine makes the determinations. In some embodiments, the protocol engine stores the determinations in a playback data structure. In one embodiment, the same protocol engine renders the recorded session responsive to the playback data structure. In another embodiment, the protocol engine making the determinations comprises a background protocol engine and the protocol engine rendering the recorded session comprises a foreground protocol engine.

In some embodiments, the protocol engine makes the determination of the first time interval (step 2302) and whether or not the first time interval exceeds a threshold (step 2304) after a packet has been marked as a meaningful packet responsive to the type of input contained in the packet. In one of these embodiments, the type of output contained in the packet impacts the determination to mark the packet. In one embodiment, the protocol engine determines the time interval between the packet marked as meaningful and the nearest previous meaningful packet, or the start of the recording if there are no previous meaningful packets. In another embodiment, the protocol engine renders the contents of the recorded session with a second time interval between the marked packet and a previous packet said second time interval comprising a shorter time interval than the first time interval. In another embodiment, the protocol engine renders the contents of the recorded session with a second time interval between the marked packet and a packet following the marked packet, said second time interval comprising a shorter time interval than the first time interval.

In one embodiment, when the protocol engine determines that the time interval exceeds the threshold (step 2304), the protocol engine categorizes the time interval as a perceptible time interval. A time interval is perceptible if a user of the regenerated recorded session can perceive that a period of time lacking activity has elapsed. In some embodiments, a policy determines the threshold. In other embodiments, the protocol engine is hard coded with a predefined threshold. In this embodiment, the protocol engine stores an instruction in the playback data structure to render a shorter time interval between the two meaningful packets instead of the original time interval. In another embodiment, the protocol engine determining that the time interval exceeds the threshold also renders the contents of the recorded session. In this embodiment, the protocol engine does not store the instruction to render the shorter time interval in the playback data structure. For a time interval not categorized as perceptible, no shortened time interval is needed and the original time interval is rendered between the two meaningful packets.

In some embodiments, contents of a packet in the recorded stream represent graphics updates affecting a screen region. In one embodiment, the graphics updates include, without limitation, flashing system tray icons, title bars or task bar entries, blinking text in web pages or applications, clock displays, system animations, application animations, and stock tickers and other periodically updated information displays. In some embodiments, graphics updates such as these are determined to be insignificant to a user of a regeneration of the recorded stream. In one of these embodiments, a protocol engine comprises this determination. In another of these embodiments, a policy defines at least one graphics update as insignificant. In this embodiment, an administrator generates the policy. In another embodiment, a user of the regeneration of the recorded stream generates the policy.

Figure 24:
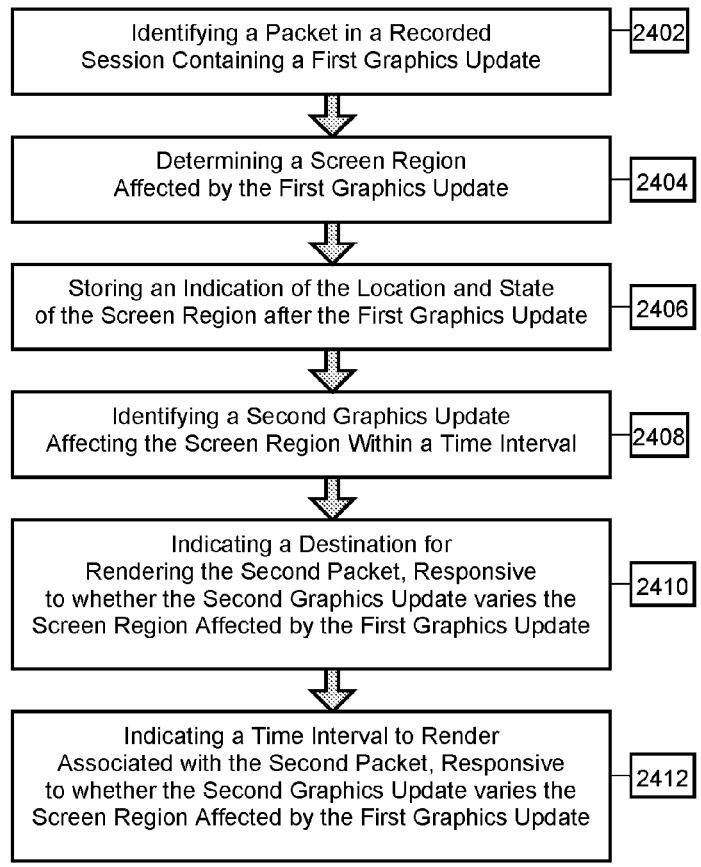
FIG. 24 is a flow diagram depicting one embodiment of the steps taken to eliminate a graphics update in rendering a recorded session.

Referring now to FIG. 24, a flow diagram depicts one embodiment of the steps taken to eliminate a graphics update in rendering a recorded session. In brief overview, a graphics update is identified (step 2402) and the screen region affected by the graphics update is determined (step 2404). An indication of the location and state of the affected screen region is stored (step 2406) and a second graphics update affecting the state of the screen region is identified (step 2408). Then a destination for rendering and a time interval for rendering are indicated, responsive to whether the second graphics update varies the region affected by the first graphics update (step 2410 and step 2412).

In one embodiment, a protocol engine performs the steps depicted by FIG. 24. In this embodiment, the protocol engine identifies a packet in a recorded session, said recorded session representing display data generated by an application program and said packet containing a first graphics update. The protocol engine determines a screen region affected by the first graphics update. In one embodiment, the graphics update affects a screen region by changing the data displayed on that portion of the screen. The protocol engine stores an indication of the state of the screen region after the first graphics update and the location of the screen region. In one embodiment, the protocol engine stores a copy of the updated screen region. In another embodiment, the protocol engine stores a hash of the updated screen region.

In one embodiment, the protocol engine identifies a second graphics update affecting the screen region within a time interval. In some embodiments, a policy determines the length of the time interval. In one of these embodiments, the policy determines a time interval approximating the upper limit of human scale cyclic periods used by applications and operating systems. In one embodiment, when a region of the screen goes through a cyclic display, at a period designed to be viewed by the user (for example, a significant fraction of a second up to several seconds), the display comprises a human scale cyclic period. In some embodiments, the protocol engine comprises a definition of the length of the time interval.

In an embodiment where the protocol engine identifies a second graphics update affecting the screen region affected by the first graphics update, the protocol engine determines whether the state of the screen region after the second graphics update varies from the state of the screen region after the first graphics update. If the screen region does not vary after the second graphics update, the second graphics update need not render in the regenerated recorded session. A screen graphics update in this embodiment need not render since the protocol engine determined that the graphics update is performing a cycle of drawing commands at human-scale speeds, making the update observable to a user of the regenerated recorded session, but the graphics update carries insignificant information for the user. In some embodiments, the graphics update affects the screen region by drawing, without limitation, a caret flashing, a flashing taskbar icon, a network activity indicator, or scrolling text. In some embodiments, a policy determines that affecting a screen region with that type of graphics update does not constitute a meaningful activity and should not render in the regeneration of the recorded session for a user. In other embodiments, the protocol engine comprises this determination.

In one embodiment, an indication of a destination for rendering the second packet containing the second graphic update affecting the screen region is stored in a playback data structure, responsive to whether the screen region varies after the second graphics update. In another embodiment, an indication of a time interval to render associated with the second packet containing the second graphic update affecting the screen region is stored in a playback data structure, responsive to whether the state of the screen region after the second graphics update varies from the state of the screen region after the first graphics update.

Figure 25:
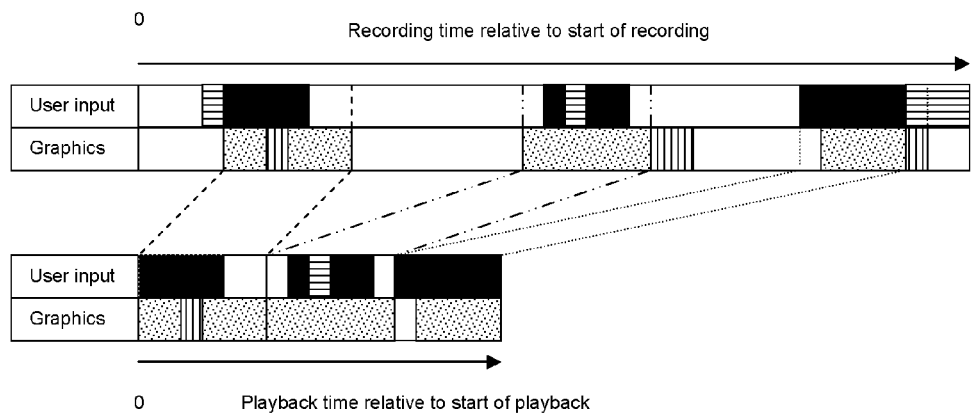
FIG. 25 depicts one embodiment of rendering a regenerated recorded session responsive to whether the state of the screen region after a second graphics update varies from the state of the screen region after a first graphics update.

FIG. 25 depicts one embodiment of rendering the regenerated recorded session responsive to indications stored in a playback data structure, responsive to whether the state of the screen region after the second graphics update varies from the state of the screen region after the first graphics update. In one embodiment, the screen region affected by the first graphics update does not vary after the second graphics update. In this embodiment, an indication is stored in a playback data structure not to render the second graphics update in a perceptible manner. In one embodiment, not perceptibly rendering the second graphics update comprises rendering the second graphics update off-screen and not on-screen. In some embodiments, not perceptibly rendering the second graphics update comprises rendering the second graphics update to an off-screen buffer. In one embodiment, not perceptibly rendering the second graphics update comprises not rendering the second graphics update. In some embodiments, a determination not to render the second graphics update perceptibly comprises rendering a perceptible indication that the graphics update is not rendered. In one of these embodiments, a user of the regenerated recorded session may request that the second graphics update render perceptibly.

FIG. 25 depicts an embodiment in which a cyclic update is detected by determining that the state of the screen region after the second graphics update does not vary from the state of the screen region after the first graphics update and determining not to render the second graphics update responsive to the detection of the cyclic update. In one embodiment where the state of the screen region affected by the second graphics update varies from the state of the screen region after the first graphics update, a determination is made to render the contents of the packet in a perceptible manner and to a buffer.

In some embodiments, the contents of a plurality of packets represent a graphics update. In one of these embodiments, a determination to render a graphics update in a perceptible manner is made responsive to the effects of more than two graphics updates on a screen region. In one embodiment, the determination of a destination for rendering a graphics update is responsive to the graphics update represented by the contents of each packet in the identified plurality of packets.

In some embodiments, contents of a packet in the recorded stream represent an interaction sequence. In one embodiment, the interaction sequence comprises, without limitation, a logon sequence, a logoff sequence, or the entering of credentials. In some embodiments, interaction sequences such as these are determined to be insignificant to a user of a regeneration of the recorded stream. In one of these embodiments, a protocol engine comprises this determination. In another of these embodiments, a policy defines at least one interaction sequence as insignificant. In this embodiment, an administrator generates the policy. In another embodiment, a user of the regeneration of the recorded stream generates the policy.

Figure 26:
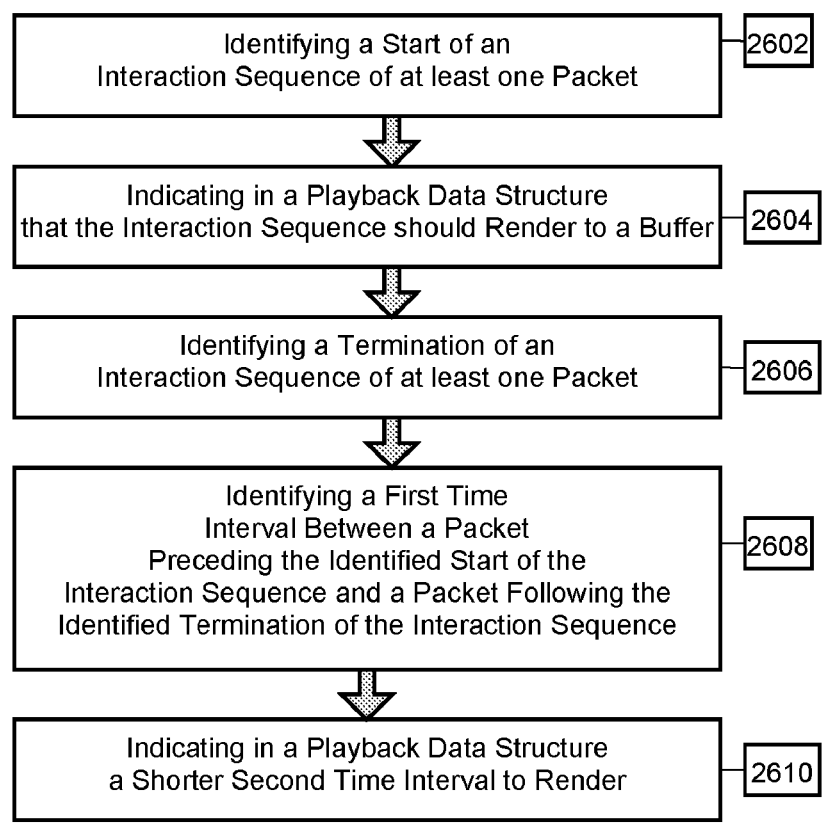
FIG. 26 is a flow diagram depicting one embodiment of the steps taken to eliminate interaction sequences in rendering a recorded session.

Referring now to FIG. 26, a flow diagram depicts one embodiment of the steps taken to eliminate interaction sequences in rendering a recorded session. A start of an interaction sequence of at least one packet is identified responsive to a policy (step 2602). In a playback data structure there is an indication that the interaction sequence should render to a buffer (step 2604). A termination of the interaction sequence of at least one packet is identified (step 2606). A first time interval between a packet preceding the identified start of the interaction sequence and a packet following the identified termination of the interaction sequence is identified (step 2608). A playback data structure contains an indication to render a second time interval shorter than the first time interval (step 2610).

In one embodiment, a protocol engine makes the identifications and indications to eliminate an interaction sequence. An identification of a start of an interaction sequence is made (step 2602). In one embodiment, the start of the interaction sequence is identified by identifying a visual marker. In one embodiment, a visual marker comprises a credentials window, displayed in the same way for all sessions. In another embodiment, a visual marker comprises a replacement of a credentials window by a blank screen and then by a desktop background. In one embodiment, a visual marker comprises the display of recognizable icons.

In some embodiments, a start of an interaction sequence is identified by determining a start time of an interaction sequence. In one of these embodiments, a component detects the start time of an event in an interaction sequence. In another of these embodiments, the component detects the start time of a logon sequence. In still others of these embodiments, the component detects the start time of a logoff sequence. In one embodiment, the identification of the start of the interaction sequence is responsive to identifying a window with an input focus.

An indication is made in a playback data structure that an interaction sequence should render in a buffer (step 2604). In this embodiment, where an identified interaction sequence should not render perceptibly, the interaction sequence is rendered to a buffer. Rendering the interaction sequence to a buffer results in the interaction sequence being imperceptible to a user of the rendering. For embodiments where a policy or user categorized the interaction sequence as insignificant, this rendering results in the elimination of an insignificant interaction sequence.

An identification of a termination of an interaction sequence is also made (step 2606). In some embodiments, the termination of the interaction sequence is identified by identifying a visual marker. In other embodiments, a termination of an interaction sequence is identified by determining a termination time of the interaction sequence. In one of these embodiments, a component detects the termination time of an event in an interaction sequence. In another of these embodiments, the component detects the termination time of a logon sequence. In still others of these embodiments, the component detects the termination time of a logoff sequence. In another embodiment, identifying the termination of the interaction sequence is responsive to identifying a window with an input focus.

In some embodiments, an interaction sequence comprises use of an application. In one of these embodiments, a policy identifies interaction sequences comprising use of an application that should not render in a perceptible manner. In one embodiment, such applications include, without limitation, word processing documents.

In one of these embodiments, a start of an interaction sequence is identified by identifying an application having input focus. When the contents of a packet represent a window having focus, a determination is made as to the application responsible for the process that created the window. In one embodiment, the contents of the packet representing a window having focus include window notification messages indicating a change in input focus. If the responsible application identifies a start of an interaction sequence which should not render perceptibly, an indication is stored in a playback data structure to render the interaction sequence to a buffer. A termination of an interaction sequence is identified by identifying the acquisition of focus by a window owned by a process not associated with the application of the interaction sequence.

In one embodiment, a first time interval is associated with the interaction sequence. Perceptibly rendering the time interval associated with the interaction sequence in an embodiment where the interaction sequence itself does not render results in a period of time perceptible to a user of the rendering in which no display data renders and the user waits through the time interval before a rendering of the contents of a packet after the interaction sequence. One embodiment eliminates the time interval associated with the interaction sequence by rendering a shorter time interval in place of the original time interval. In this embodiment, a first time interval between a packet preceding the identified start of the interaction sequence and a packet following the identified termination of the interaction sequence is identified (step 2608). A playback data structure contains an indication to render a second time interval shorter than the first time interval (step 2610).

In some embodiments, a protocol engine renders the contents of a packet in a recorded session, providing to a user a regeneration of the recorded session. In some of these embodiments, the protocol engine automatically varies the time intervals between rendering the contents of at least one packet, resulting in context-sensitive time-warped playback. In these embodiments, rendering approximates the ability of the user to comprehend the display data presented to the user. In one embodiment, the time intervals between rendering contents of packets increase when the protocol engine determines the display data represented by the contents of the packets to have an increased level of complexity or importance, as defined by a policy. In another embodiment, the time intervals between rendering contents of packets decrease when the protocol engine determines the display data represented by the contents of the packets to have a decreased level of complexity or importance, as defined by a policy. In these embodiments, the protocol engine approximates the ability of the user to comprehend the display data and renders the contents either more slowly to give the user time to comprehend the rendering or renders the contents faster when a user requires less comprehension time.

Figure 27:
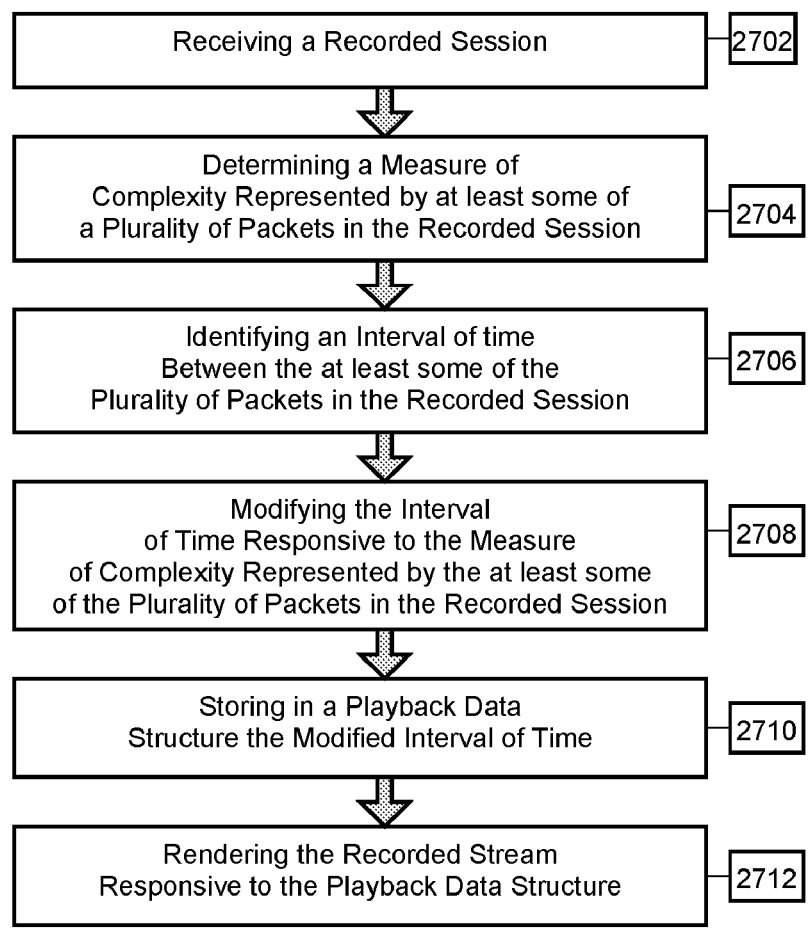
FIG. 27 is a flow diagram depicting one embodiment of the steps taken in automatic time-warped playback in rendering a recorded computer session.

Referring now to FIG. 27, a flow diagram depicts one embodiment of the steps taken in automatic time-warped playback in rendering a recorded computer session. A protocol engine receives a recorded session (step 2702), the recorded session comprising a plurality of packets and representing display data, and the protocol engine determining a measure of complexity represented by at least some of the plurality of packets in the recorded session (step 2704). The protocol engine identifies an interval of time between the at least some of the plurality of packets in the recorded session (step 2706) and modifies the interval of time responsive to the measure of complexity represented by the at least some of the plurality of packets in the recorded session (step 2708). The protocol engine stores in a playback data structure the modified interval of time (step 2710) and the recorded data stream is rendered responsive to the playback data structure (step 2712).

In some embodiments, the protocol engine determining the measure of complexity, identifying the interval of time, modifying the interval of time and storing the modification is a background protocol engine. In one of these embodiments, the background protocol engine also renders the recorded stream. In another of these embodiments, a foreground protocol engine renders the recorded stream responsive to the playback data structure. In some embodiments, the background protocol engine and the foreground protocol engine reside on the same device. In other embodiments, the background protocol engine and the foreground protocol engine reside on separate devices.

In some embodiments, the protocol engine determines a measure of complexity represented by at least some of a plurality of packets in the recorded session (step 2704). In some of these embodiments, the protocol engine determines the measure of complexity by identifying likely sequences of typing in keyboard input. In one embodiment, the protocol engine inspects at least one type of key involved to identify likely sequences of typing in keyboard input. In another embodiment, the protocol engine inspects a sequence of at least one glyph rendered to complete a heuristic approximation of likely sequences of typing in keyboard input.

In some of these embodiments, the protocol engine stores classifications of keys determined by characteristics of the key. Key characteristics include, without limitation printable or non-printable characters, white space, navigation keys, or function keys, and include combinations of characteristics. In one embodiment, a protocol engine determines that sections of input comprising printable characters and occasional navigation keys constitute normal typing, while sections with mostly non-visible keys do not constitute normal typing. In one embodiment, the protocol engine determines a measure of complexity responsive to the amount of white space identified. In this embodiment, the protocol engine comprises a definition of word processing indicating that a white space key appears on average approximately every 5-8 characters in typical typing patterns.

In one embodiment, the protocol engine uses the appearance of non-printable characters to determine the measure of complexity. In another embodiment, the protocol engine accesses the keystroke sequences to identify sequences of non-white space printable characters appearing close together in time. In this embodiment, the protocol engine comprises the capacity to compare the keystroke sequences to a dictionary to identify valid words and determine a measure of complexity relating to an ability of a user to comprehend valid words versus invalid words.

In another embodiment, the protocol engine determines that the contents of the packet contain commands to render glyphs. In this embodiment, the protocol engine uses the glyphs to determine whether the display data represents a user activity of typing. In this embodiment, if a glyph rendering rate approximates the keyboard input rate with a small delay, it is likely that keystrokes are directly resulting in glyphs, thus making it quite likely the user is typing. In one embodiment, the protocol engine correlates the keys entered with the glyphs produced. In another embodiment, the protocol engine determines the spatial sequence (left-to-right, right-to-left, etc.) of the rendered glyphs to determine that a user is typing. In one embodiment, the protocol engine makes the determination of the measure of complexity responsive to the result of analyzing the contents of the plurality of packets and identifying patterns and activities represented by the contents.

In other embodiments, the protocol engine makes the determination of the measure of complexity responsive to an identification of a type of mouse input. In one embodiment, the protocol engine determines that a mouse input representing a click of the mouse causes actions that may need a slower rendering rate to comprehend, especially if the clicks follow a sequence of typing. In another embodiment, the protocol engine determines that mouse input that does not represent a clicking of a mouse does not affect the ability of a user to comprehend display data, and thus does not affect the measure of complexity.

In other embodiments, the protocol engine makes the determination of the measure of complexity responsive to identifying a heuristic approximation of complexity of a graphics update. In one embodiment, the protocol engine identifies a heuristic approximation of complexity of a graphics update based upon, without limitation, the size of region(s) being updated, the size of the area of the region changed by the graphics commands, a historical frequency of updates to individual regions, cyclic graphics commands, number of graphics commands, frequency of graphics commands, time interval between adjacent packets whose contents contain graphics command, or the type of graphics update. In an embodiment where the protocol engine identifies a low measure of complexity for the graphics update, the protocol engine determines a low measure of complexity represented by the packets containing the graphics updates. In an embodiment where the protocol engine identifies a high measure of complexity for the graphics update, the protocol engine determines a high measure of complexity represented by the packets containing the graphics updates.

In one embodiment, the protocol engine identifies an interval of time between the at least some of the plurality of packets in the recorded session (step 2706). In this embodiment, the protocol engine modifies the interval of time responsive to the determined measure of complexity (step 2708). In an embodiment where at least some of the plurality of packets in the recorded session have content representing display data associated with a high measure of complexity, the protocol engine increases the interval of time between the packets to allow the user of the rendering increased time to comprehend the rendered display data. In another embodiment where at least some of the plurality of packets in the recorded session have content representing display data associated with a low measure of complexity, the protocol engine decreases the interval of time between the packets to reflect decreased amount of time the user requires to comprehend the rendered display data. In one embodiment, a user requires a different amount of time between the rendered contents of packets than the amount rendered by the protocol engine. In this embodiment, the user modifies the interval of time to reflect the amount of time the user requires to comprehend the rendered display data. In some embodiments, the protocol engine also identifies a time interval between the at least some of the plurality of packets and other packets in the plurality of packets, modifying the interval of time identified between those sets of packets.

In some embodiments, the protocol engine identifies a first marker associated with a packet in the recorded session. In one embodiment, the packet comprises the marker. In another embodiment, the recorded session comprises the marker.

In one embodiment, a user of the rendering of the display data defines the marker. In another embodiment, the protocol engine defines the marker. In embodiments where the protocol engine identifies a marker, the protocol engine modifies the interval of time responsive to the first marker. In one embodiment, the protocol engine increases the interval of time providing the user of the rendering of the display data additional time for comprehending the contents of the packet associated with the first marker. In other embodiments, the protocol engine identifies a second marker in a second packet. In this embodiment, the protocol engine modifies the interval of time responsive to the distance between the first marker and the second marker. In this embodiment, the protocol engine provides increased time for comprehension of display data represented by contents of packets marked and decreased time for comprehension of data represented by contents of unmarked packets. In one embodiment, a user defines markers for display data of interest to the user and the protocol engine renders additional time for the display data of interest to the user and decreases time of rendering for display data not of interest to the user, as determined by the markers.

In one embodiment, the protocol engine identifies a first marker in the at least some of the plurality of packets in the recorded session, said marker indicating an initial packet in the at least some of the plurality of packets in the recorded session. The protocol engine modifies the interval of time responsive to the first marker. The protocol engine identifies a second marker in a second packet in the at least some of the plurality of packets in the recorded session, said second marker indicating a final packet in the at least some of the plurality of packets in the recorded session and modifying the interval of time responsive to the interval of time between the first marker and the second marker.

In one embodiment, the protocol engine stores the modified interval of time in a playback data structure (step 2710) and the recorded stream is rendered responsive to the contents of the playback data structure (step 2712). In one embodiment, the protocol engine also renders the recorded stream responsive to the playback data structure instructions regarding modified time intervals. In another embodiment, a separate foreground protocol engine renders the recorded stream.

In some embodiments, a determination is made that recorded interaction with an application requires increased time for rendering, to provide a user of the rendering increased time for comprehension of the rendered display data. In some of these embodiments, the determination is made that the application requiring increased time comprises a more important application than an application not requiring the increased time. In one of these embodiments, the user makes the determination. In another of these embodiments, a policy makes the determination. In still another of these embodiments, the protocol engine comprises a definition of applications that require increased time.

Figure 28:
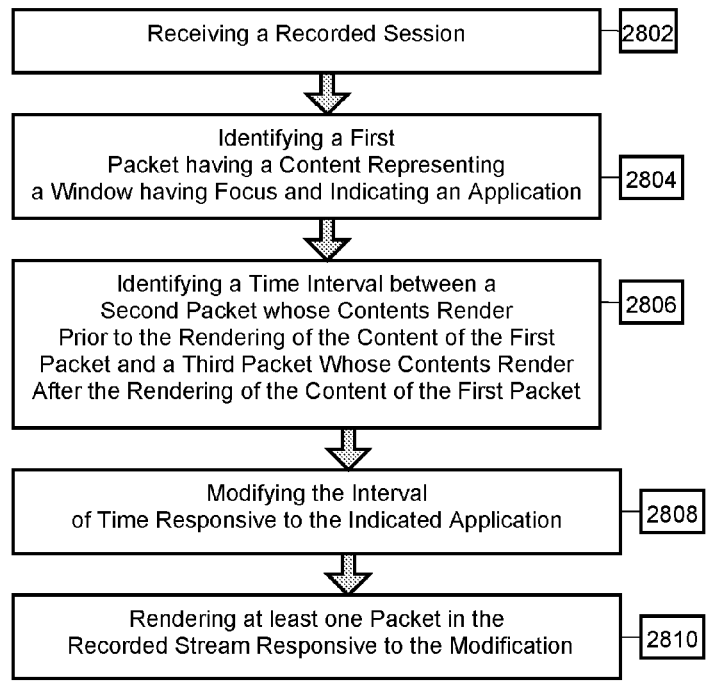
FIG. 28 is a flow diagram depicting one embodiment of the steps taken for automatic time-warped playback responsive to an identified application in rendering a recorded computer session.

Referring now to FIG. 28, a flow diagram depicts one embodiment of the steps taken for automatic time-warped playback responsive to an identified application in rendering a recorded computer session. A recorded session comprising a plurality of packets and representing display data is received (step 2802). A first packet having a content representing a window having focus is identified, said window indicating an application (step 2804). A time interval is identified between a second packet whose contents render prior to the rendering of the content of the first packet and a third packet whose contents render after the rendering of the content of the first packet (step 2806). The identified time interval is modified responsive to the indicated application (step 2808). At least one packet in the recorded stream is rendered responsive to the modification (step 2810).

In one embodiment, a protocol engine receives the recorded session (step 2802). In this embodiment, the protocol engine also identifies a first packet having a content representing a window having focus is identified, said window indicating an application (step 2804). In one embodiment, the contents of the packet representing a window having focus include window notification messages indicating a change in input focus. In one embodiment, a time interval is identified between a second packet whose contents render prior to the rendering of the content of the first packet and a third packet whose contents render after the rendering of the content of the first packet (step 2806). In this embodiment, the protocol engine identifies a packet whose contents render prior to the rendering of content representing an application window having focus, a packet whose contents represent the application window having focus, and a packet whose contents represent the application window no longer having focus.

In some embodiments, the protocol engine modifies the time interval preceding the application having focus. In other embodiments, the protocol engine modifies the time interval following the application having focus. In one embodiment, the protocol engine then determines the interval of time in which the application window has focus and modifies that time interval responsive to the type of application. In one embodiment, the protocol engine increases the identified time interval. In this embodiment, the protocol engine provides the user of the rendering an increased amount of time to review the application. In another embodiment, the protocol engine decreases the identified time interval. In this embodiment, the protocol engine provides the user of the rendering a decreased amount of time to review the application, reflecting the decreased amount of interest in the application.

In one embodiment, the protocol engine renders at least one packet in the recorded stream responsive to the modification. In one embodiment, the protocol engine renders the contents of the at least one packet in the recorded stream to a buffer. In one embodiment, rendering to a buffer does not render the contents of the packet in a perceptible manner. In another embodiment, the protocol engine renders the contents of the at least one packet in the recorded stream to a buffer and in a perceptible manner. In some embodiments, the protocol engine indicates the modified time interval in a playback data structure and a separate protocol engine renders the recorded session responsive to the information stored in the playback data structure.

Figure 29:
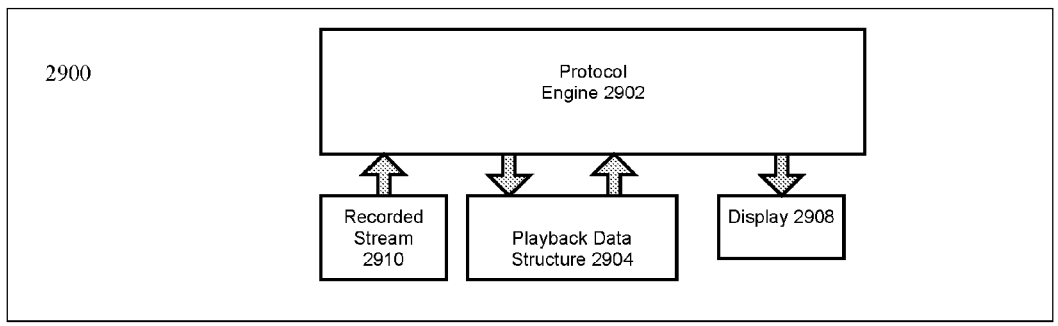
FIG. 29 is a block diagram depicting one embodiment of a system for automatic time-warped playback in rendering a recorded computer session.

Referring now to FIG. 29, a block diagram depicts one embodiment of a system for automatic time-warped playback in rendering a recorded computer session, including a protocol engine 2902, a recorded stream 2910, a playback data structure 2904, and a display 2908. In brief overview, the protocol engine 2902 generates a playback data structure 2904 in response to receiving a recorded stream 2910, said recorded stream 2910 comprising a plurality of packets, and said protocol engine 2902 rendering at least one packet in the recorded stream responsive to the generated playback data structure 2904.

In one embodiment, the protocol engine 2902 comprises a background protocol engine and a foreground protocol engine. In this embodiment, the background protocol engine receives the recorded stream 2910 and generates the playback data structure 2904. In this embodiment, the foreground protocol engine receives the recorded stream 2910 and renders at least one packet in the recorded stream responsive to the generated playback data structure 2904. In one embodiment, the background protocol engine and the foreground protocol engine reside on the same device. In another embodiment, the background protocol engine resides on a first device and the foreground protocol engine resides on a second device.

In another embodiment, the system comprises a single protocol engine 2902 generating the playback data structure 2904 and rendering at least one packet in the recorded stream responsive to the generated playback data structure 2904.

In one embodiment, the protocol engine 2902 stores in the playback data structure at least one instruction for rendering the recorded session. In one embodiment, the instruction comprises a modification of an identified time interval for rendering the contents of a packet in the recorded session. In another embodiment, the protocol engine stores metadata in the playback data structure. In this embodiment, the metadata comprises higher order instructions for rendering the contents of the packet.

In one embodiment, the protocol engine renders the contents of at least one packet in the recorded session responsive to contents of a playback data structure. In one embodiment, the protocol engine renders the at least one packet in the recorded session in a perceptible manner and to a buffer. In another embodiment, the protocol engine renders the at least one packet in the recorded session to a buffer.

In some embodiments, the rendered contents of the packets provide a streamlined regeneration of the original display data. In other embodiments, the rendered contents of the packets provide a customized version of the display data. In one embodiment, the determination to render the contents of the packet in a perceptible manner is responsive to a policy or user request. These embodiments provide users with control over the rendering of the recorded session.

Figure 30A:
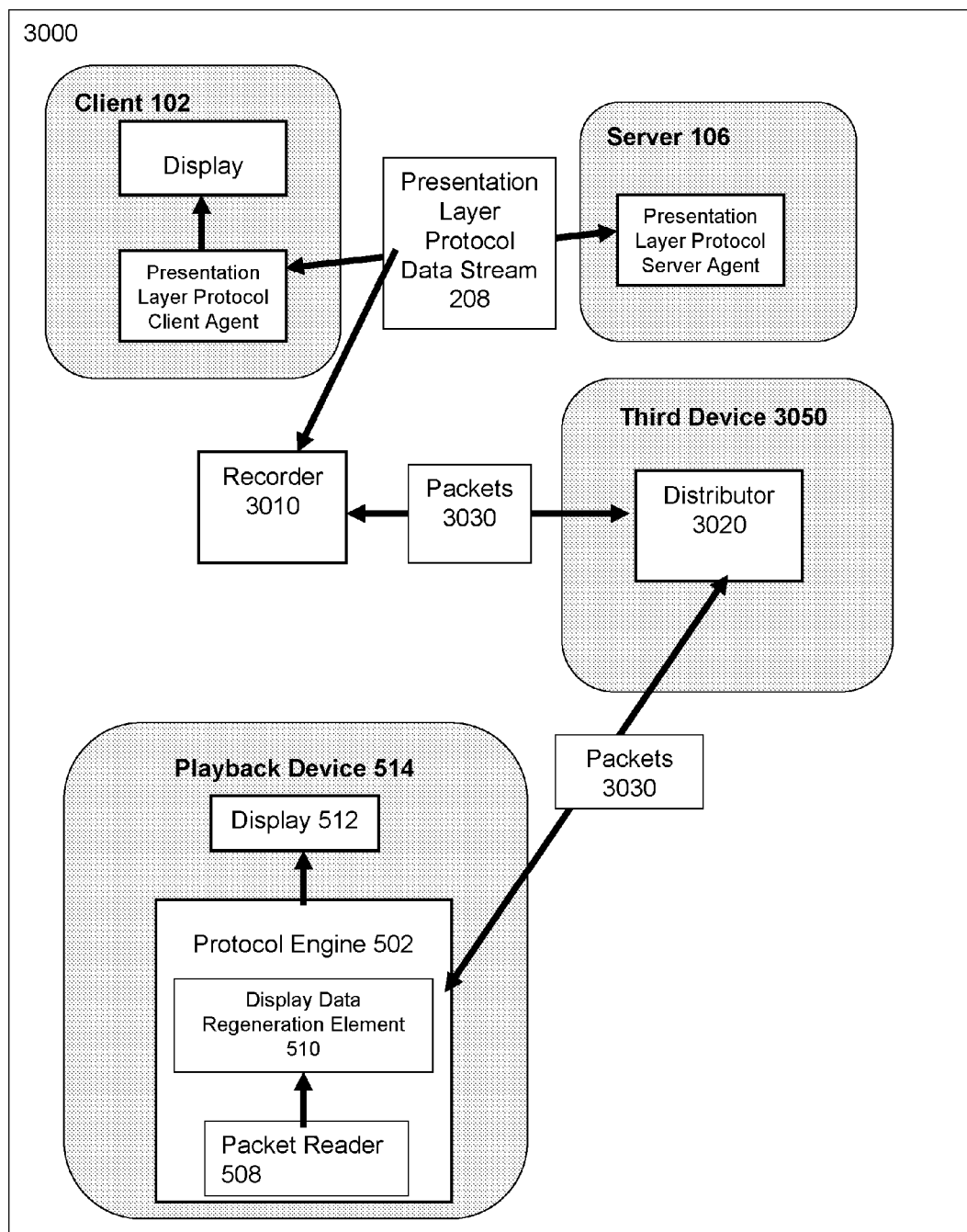
FIG. 30A is a block diagram depicting one embodiment of a system for recording and real-time playback of a presentation protocol layer data stream.

Referring now to FIG. 30A, a block diagram depicts one embodiment of a system for recording and real-time playback of presentation layer protocol data. In brief overview, the system includes a recorder 3010, a distributor 3020, and a protocol engine 502. The recorder 3010 intercepts a presentation layer protocol data stream 208 comprising a plurality of packets, during transmission of the presentation layer protocol data stream 208 from a first device 106 to a second device 102, the presentation layer protocol data stream 208 representing display data. The distributor 3020 transmits a copy of at least one packet of the presentation layer protocol data stream 208. The protocol engine 502 uses the information associated with the at least one copied packet to regenerate the display data represented by the at least one copied packet. The recorder 3010 continues intercepting the presentation layer protocol data stream and the distributor continues transmitting copies of packets from the presentation layer protocol data stream until the first device completes transmission of the protocol data stream to the second device.

Referring now to FIG. 30A, and in greater detail, in one embodiment, the recorder 3010 extracts data from a presentation layer protocol stack and buffers the data temporarily. In another embodiment, the third device 3050 records data to disk and catalogs the data. In still another embodiment, the playback device 514 displays session recordings, both complete and incomplete, to a user.

The recorder 3010 intercepts a presentation layer protocol data stream 208 comprising a plurality of packets, during transmission of the presentation layer protocol data stream 208 from a first device 106 to a second device 102, the presentation layer protocol data stream 208 representing display data. In one embodiment, the first device 106 is a server 106, such as an application server. In another embodiment, the second device 102 is a client 102. In still another embodiment, the first device 106 transmits the presentation layer protocol data stream 208 as described above in connection with FIG. 2. In yet another embodiment, the presentation layer protocol data stream 208 is a protocol data stream 208 as described above in connection with FIG. 2. In a further embodiment, the recorder 3010 is a recorder 206 as described above in connection with FIG. 2. In some embodiments, the presentation layer protocol data stream 208 comprises one or more virtual channels. In one of these embodiments, the recorder 3010 intercepts a virtual channel.

In one embodiment, the recorder 3010 resides on the first device 106. In another embodiment, the recorder 3010 resides on the second device 102. In still another embodiment, the recorder 3010 resides on a third device 3050. In yet another embodiment, the recorder 3010 resides on a proxy server.

In one embodiment, the recorder 3010 is located on a passthrough server. In another embodiment, the recorder 3010 is located on a network packet sniffer. In still another embodiment, the recorder 3010 is located on a network appliance, application gateway, application acceleration appliance or other appliance. In some embodiments, the recorder 3010 resides on the same device as the distributor 3020.

In some embodiments of the recorder 206 described in connection with FIG. 2, the recorder intercepted the protocol data stream 208 and created a recorded protocol data stream 210 using copied packets. In one embodiment, the recorder comprises a means for copying at least one packet from the presentation layer protocol data stream. In another embodiment, the recorder comprises a means for intercepting a virtual channel. In still another embodiment, the recorder comprises a means for intercepting the presentation layer protocol data stream at substantially the same time as the first device transmits the presentation layer protocol data stream to the second device. In yet another embodiment, the recorder comprises a buffer for storing the at least one packet. In some embodiments, the recorder comprises a recording generator for creating a recording of the presentation layer protocol data stream, or of a portion of the presentation layer protocol data stream.

In other embodiments, as depicted in FIG. 30A, the recorder 3010 intercepts a presentation layer protocol data stream 208 and copies packets from the presentation layer protocol data stream 208 during the transmission of additional packets in the presentation layer protocol data stream 208 from the server 106 to the client 102. In one of these embodiments, the recorder 3010 intercepts the presentation layer protocol data stream 208 at substantially the same time as the server 106 transmits the presentation layer protocol data stream 208 to the server 102. In another of these embodiments, the recorder 3010 receives an indication of a request for real-time playback of a presentation layer protocol data stream 208. In still another of these embodiments, the recorder 3010 copies a packet from the presentation layer protocol data stream 208 and forwards the packet before completing interception of the presentation layer protocol data stream 208, responsive to the received indication of the request for real-time playback. In yet another of these embodiments, the recorder 3010 does not delay the transmission of an intercepted packet until the completion of the recording of the presentation layer protocol data stream 208.

In one embodiment, the recorder 3010 further comprises a means for storing a copy of at least one packet of the presentation layer protocol data stream 208 in a storage device. In some embodiments, the recorder 3010 transmits copied, intercepted packets to the distributor 3020 while continuing to intercept subsequent packets from the presentation layer protocol data stream 208.

In some embodiments, the recorder 3010 determines whether to copy a packet as described above in connection with FIG. 2. In other embodiments, upon completion of the transmission of the presentation layer protocol data stream 208 from the server 106 to the client 102, the recorder 3010 generates a recording of the presentation layer protocol data stream 208 as described above in connection with FIG. 2.

The distributor 3020 transmits a copy of at least one packet of the presentation layer protocol data stream 208. In one embodiment, the distributor further comprises a transceiver for retrieving a copy of the at least one packet. In another embodiment, the distributor further comprises a transceiver for transmitting a copy of the at least one packet to the protocol engine.

Figure 30B:
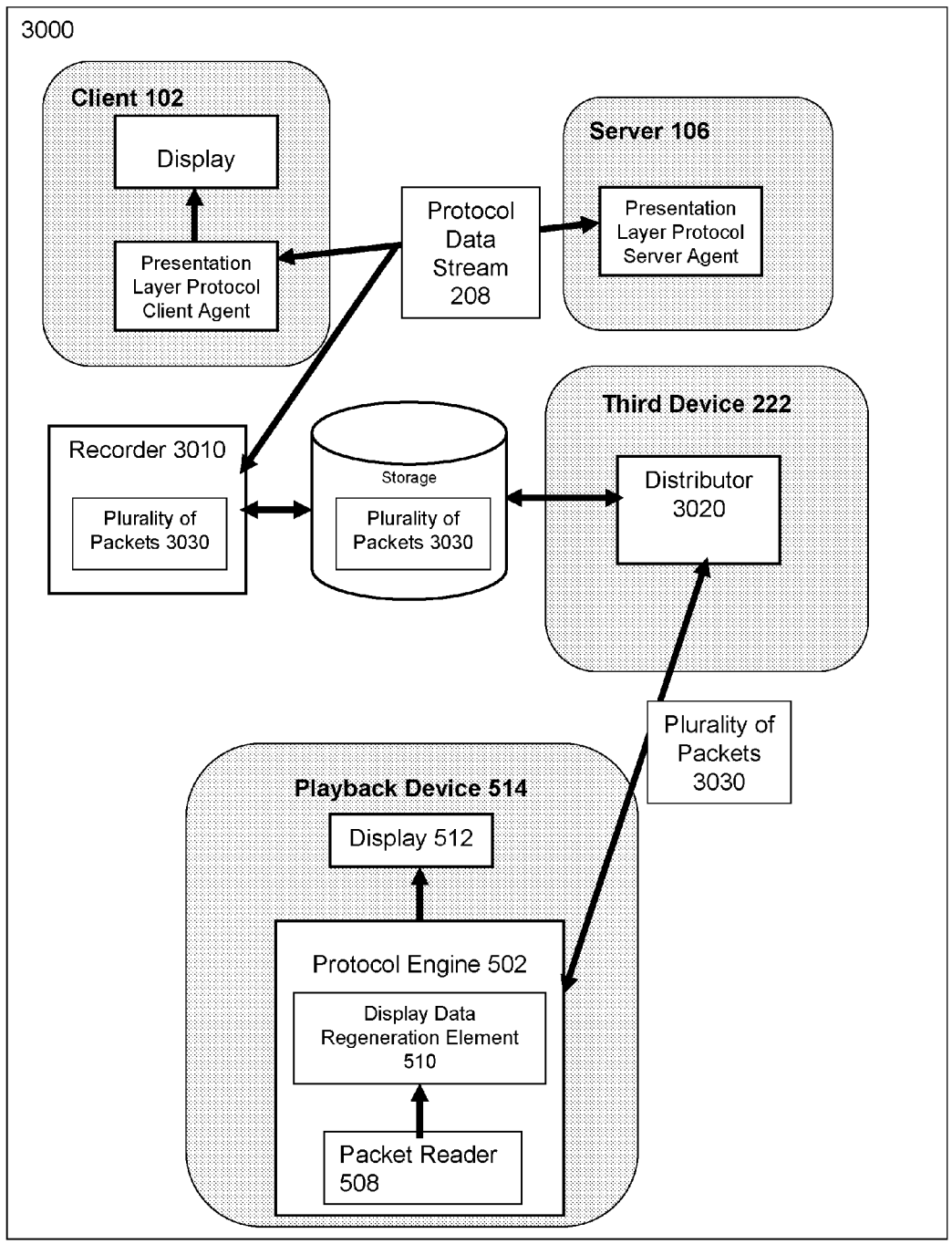
FIGS. 30B, 30C and 30D are a block diagrams depicting alternate embodiments of a system for recording and real-time playback of a presentation protocol layer data stream.

Referring now to FIG. 30B, a block diagram depicts one embodiment in which the recorder 3010 stores a plurality of packets 3030 on a storage device 218. In this embodiment, the distributor 3020 retrieves the plurality of packets 3030 from the storage device 218 and forwards the plurality of packets 3030 to a protocol engine 502 on the playback device 514.

Figure 30C:
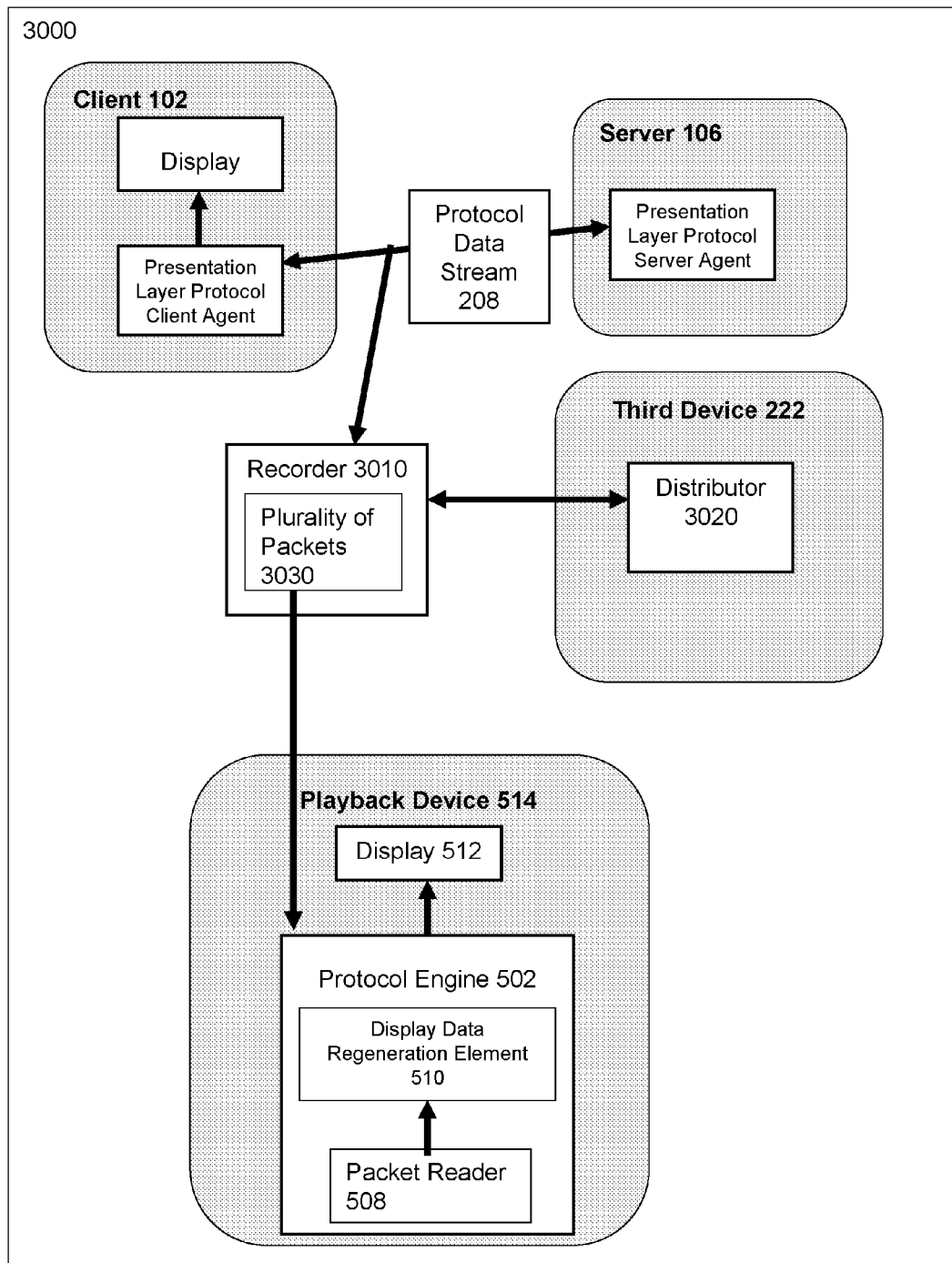

Referring now to FIG. 30C, a block diagram depicts one embodiment in which the recorder 3010, in communication with the distributor 3020, transmits the plurality of packets 3030 to the protocol engine 502. In some embodiments, the recorder 3010 receives an indication from the distributor 3020 of a request for real-time playback of a presentation layer protocol data stream. In one of these embodiments, the recorder 3010 forwards the plurality of packets 3030 directly to the protocol engine 502, responsive to the received indication of the request for real-time playback.

Figure 30D:
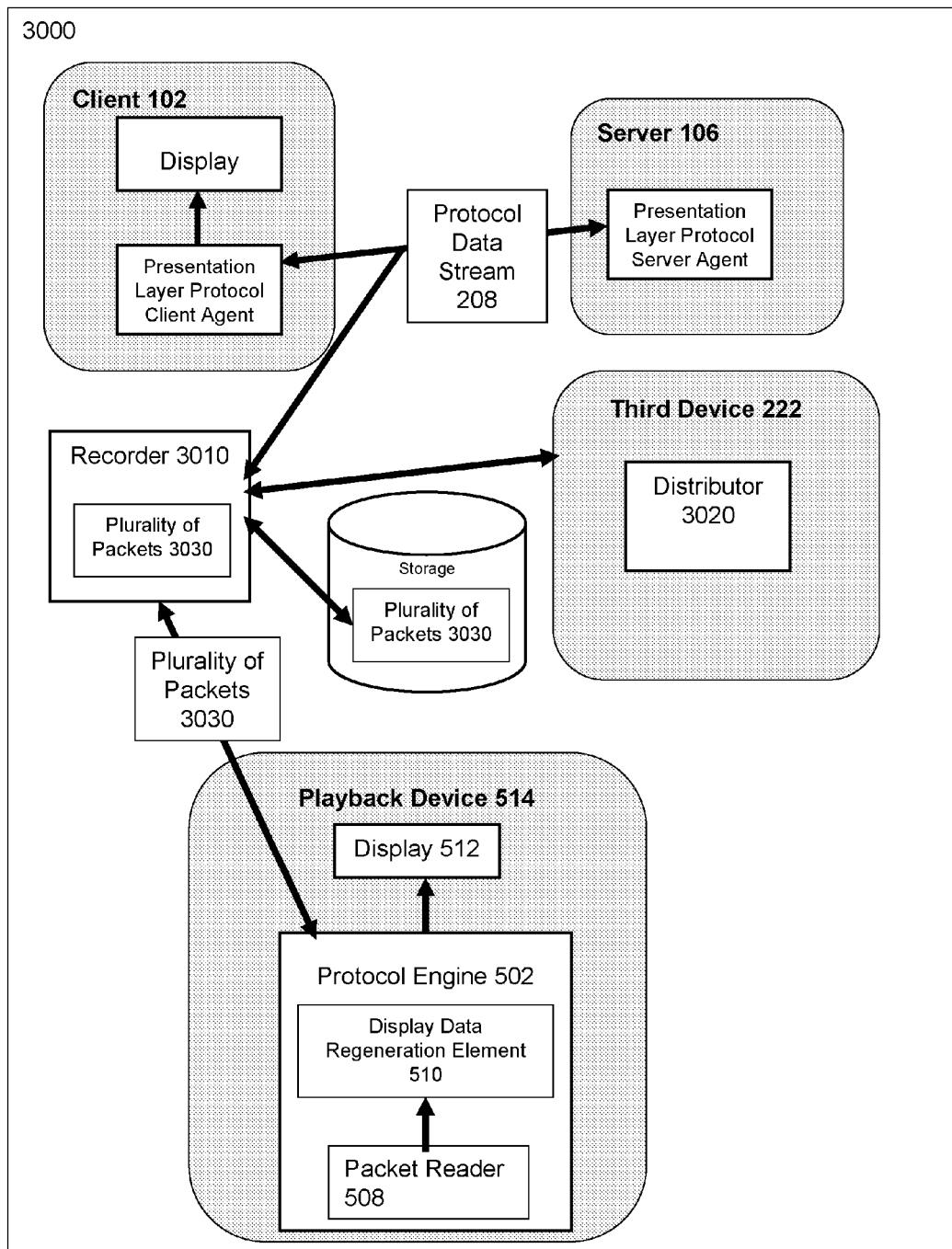

Referring now to FIG. 30D, a block diagram depicts one embodiment in which the recorder 3010 stores a plurality of packets 3030 on a storage device 218. In this embodiment, the recorder 3010 retrieves the plurality of packets 3030 from the storage device 218 and forwards the plurality of packets 3030 to a protocol engine 502 on the playback device 514.

Referring back to FIG. 30A, and in one embodiment, the distributor 3020 resides on the first device 106. In another embodiment, the distributor 3020 resides on the second device 102. In still another embodiment, the distributor 3020 resides on a third device 3050. In yet another embodiment, the distributor 3020 resides on a proxy server.

In one embodiment, the distributor 3020 is part of a remote presentation protocol server engine 204, as described above in connection with FIG. 2. In another embodiment, the distributor 3020 resides on a recording server, such as a third device 3050. In still another embodiment, the distributor 3020 is in communication with the recorder 3010.

In one embodiment, the distributor 3020 is located on a passthrough server. In another embodiment, the distributor 3020 is located on a network packet sniffer. In still another embodiment, the distributor 3020 is located on a network appliance, application gateway, application acceleration appliance or other appliance. In some embodiments, the distributor 3020 resides on the same device as the recorder 3010.

In some embodiments, the system includes a third device 3050. In one of these embodiments, the third device 3050 is referred to as a log server. In another of these embodiments, the distributor 3020 resides on the log server. In still another of these embodiments, the log server stores pluralities of packets copied from intercepted presentation layer protocol data streams and recordings of presentation layer protocol data streams. In yet another of these embodiments, the log server provides functionality for coordinating the distribution of pluralities of packets copied from intercepted presentation layer protocol data streams and of recordings of presentation layer protocol data streams from the recorder 3010 to a playback device.

In some embodiments, the system includes a playback device 514, which provides the functionality of the playback device 514 described above in connection with FIG. 5. In other embodiments, the playback device 514 and the protocol engine 502 provide the functionality described above in connection with FIG. 5, and, in addition to regenerating display data from completed recordings of presentation layer protocol data streams, also provide the ability to regenerate display data associated with a plurality of packets and portions of incomplete presentation layer protocol data streams.

In some embodiments, the distributor 3020 is in communication with the playback device 514. In one of these embodiments, the distributor 3020 provides a catalog of presentation layer protocol data streams. In another of these embodiments, the distributor 3020 provides an enumeration of presentation layer protocol data streams available for viewing by the playback device 514. In still another of these embodiments, the distributor 3020 provides searching functionality, allowing the playback device 514 to search for particular presentation layer protocol data streams. In yet another of these embodiments, the distributor 3020 transmits a recorded presentation layer protocol data stream to the playback device 514.

In one embodiment, a playback device 514 requests an enumeration of presentation layer protocol data streams available for displaying to a user of the playback device 514. In another embodiment, the playback device 514 transmits the request to a distributor 3020. In still another embodiment, the playback device 514 transmits the request to a recording server, such as the third device 3050. In yet another embodiment, the playback device 514 comprises a protocol engine 502.

In one embodiment, the distributor 3020 consults a catalog of available presentation layer protocol data streams. In another embodiment, the distributor 3020 generates an enumeration of available presentation layer protocol data streams responsive to the received request. In still another embodiment, the distributor 3020 transmits an enumeration of available presentation layer protocol data streams to the playback device 514.

In some embodiments, the enumeration identifies completely recorded presentation layer protocol data streams. In other embodiments, the enumeration identifies presentation layer protocol data streams for which the recorder 3010 has not completed the recording process. For example, the recorder 3010 may not have completed the process of adding packets to the presentation layer protocol data stream at the time that the identification of the presentation layer protocol data stream is provided to the playback device 514. In one of these embodiments, the recorder 3010 may add additional packets to the plurality of copied packets of the presentation layer protocol data stream after the playback device 514 accesses a packet already copied into the presentation layer protocol data stream. In still other embodiments, upon receiving the enumeration, the playback device 514 requests an enumerated presentation layer protocol data stream that is still in the process of being recorded.

In one embodiment, the recorder 3010 intercepts a presentation layer protocol data stream comprising a plurality of packets. In another embodiment, the distributor 3020 transmits a copy of at least one intercepted packet from the presentation layer protocol data stream to the playback device 514. In still another embodiment, a protocol engine 502 on the playback device 514 uses information associated with the at least one copied packet to regenerate the display data represented by the presentation layer protocol data stream. In yet another embodiment, the recorder 3010 intercepts a second packet and the distributor 3020 transmits a copy of the second packet to the playback device 514. In a further embodiment, the playback device 514 uses information associated with the second copied packet to regenerate additional display data represented by the protocol data stream. In some embodiments, the steps of intercepting packets and transmitting copies of the intercepted packets for display by the playback device 514 continues until the playback device 514 receives all of the packets in the presentation layer protocol data stream.

In one embodiment, the third device 3050 writes many simultaneous presentation layer protocol session recordings to disk simultaneously, updates a catalogue database and serves files out for playback. In another embodiment, the recorder 3010 resides on the third device 3050. In still another embodiment, the third device 3050 receives copied packets from presentation layer protocol data streams that the recorder 3010 forwards to the third device 3050. In some embodiments, the third device 3050 is referred to as a "log server" or a "recording server".

In one embodiment, to support simultaneous recording and playback of any particular session file, the file format must support being played without being complete. In some embodiments, an incomplete file, possibly incomplete due to loss of data or because the session is still in progress, is always capable of being played. In one of these embodiments, however, the file does not contain a digital signature. In another of these embodiments, a digital signature is calculated by the third device 3050 when the recording is complete. In still another of these embodiments, the file format is modified to support the use of the empty packet described below. In yet another embodiment, no file format modifications occur.

In one embodiment, the third device 3050 provides the ability to locate a file, based on data held in the catalogue database. In one embodiment, a database entry for each recording in the catalogue database is updated three times in order: when the file is created, when the session metadata becomes known (such as when the end user has successfully logged on) and when the recording ends.

In one embodiment, a file is created when a presentation layer protocol data stream starts. In another embodiment, a file is created when a privileged third-party, such as an administrator, requests the initiation of a recording. In some embodiments, when a first file containing a first portion of a recording of a presentation layer protocol data stream exceeds a threshold, the first file closes and a second file is created, the second file containing a second portion of the recording of the presentation layer protocol data stream. In one of these embodiments, when the first file exceeds a size limit, the first file exceeds the threshold. In another of these embodiments, when the first file stores a portion of a recording exceeding a limit on a length of time of the recording, the first file exceeds the threshold. In still another of these embodiments, the process of closing a first file that stores a first portion of a recording and that exceeds a threshold and creating a second file to store a second portion of the recording is referred to as "rollover." In yet another of these embodiments, the underlying session being recorded continues unaffected and no recorded data is lost in the transition of files.

In some embodiments, a recording ends when a user whose session is being recorded disconnects. In other embodiments, a recording ends during the process of rollover. In still other embodiments, a recording ends when a privileged third-party, such as an administrator, requests the termination of a recording.

In some embodiments, only database records that have had all three updates may be searched; the file has to be complete to be searched. In other embodiments, methods and systems allow searching of records that have less than all updates. In one of these embodiments, only the first two updates are required for a record to be searchable. This means the file is available for search and download early in the session recording when the metadata becomes known. In some of these embodiments, a recording is searchable when a file is created. In others of these embodiments, however, a determination is made that a file is not available before metadata is identified because the information about the recording only has value for a logged-on session.

In one embodiment, the third device 3050 tracks all live session recordings sent to playback devices 514, and continues to stream data to playback devices 514 as more data becomes available. In another embodiment, the third device 3050 provides a tracking functionality that also supports the "poll" message for informing the presentation servers of live players as discussed below.

In some embodiments, functionality for transmitting a packet in a presentation layer protocol data stream prior to the completion of a process for adding packets to a recording of the presentation layer protocol data stream enables a user of the playback device 514 to view display data represented by the packet during the recording of a presentation layer protocol data stream. In one of these embodiments, this functionality enables a user to watch the display data live, while it is being created and recorded. In another of these embodiments, there may be a delay between the time of interception of a packet and a time of regeneration of display data represented by the packet. In still another of these embodiments, the delay is imperceptible to the viewer of the regenerated display data.

In some embodiments, the transmission of intercepted packets prior to the completion of a transmission of the original presentation layer protocol data stream 208 enables a playback device to display the packets as they are generated. In one of these embodiments, this provides a viewer of regenerated intercepted packets with real-time viewing of the presentation layer protocol data stream. In another of these embodiments, a plurality of intercepted packets may be buffered prior to transmission. However, in some of these embodiments, although the plurality of packets is buffered, they are still transmitted to a playback device prior to the complete transmission of a presentation layer protocol data stream, providing the impression of real-time, or near-real-time playback.

The protocol engine 502 uses the information associated with the at least one copied packet to regenerate the display data represented by the at least one copied packet. The recorder 3010 continues intercepting the presentation layer protocol data stream and the distributor continues transmitting copies of packets from the presentation layer protocol data stream until the first device completes transmission of the protocol data stream to the second device.

Figure 31:
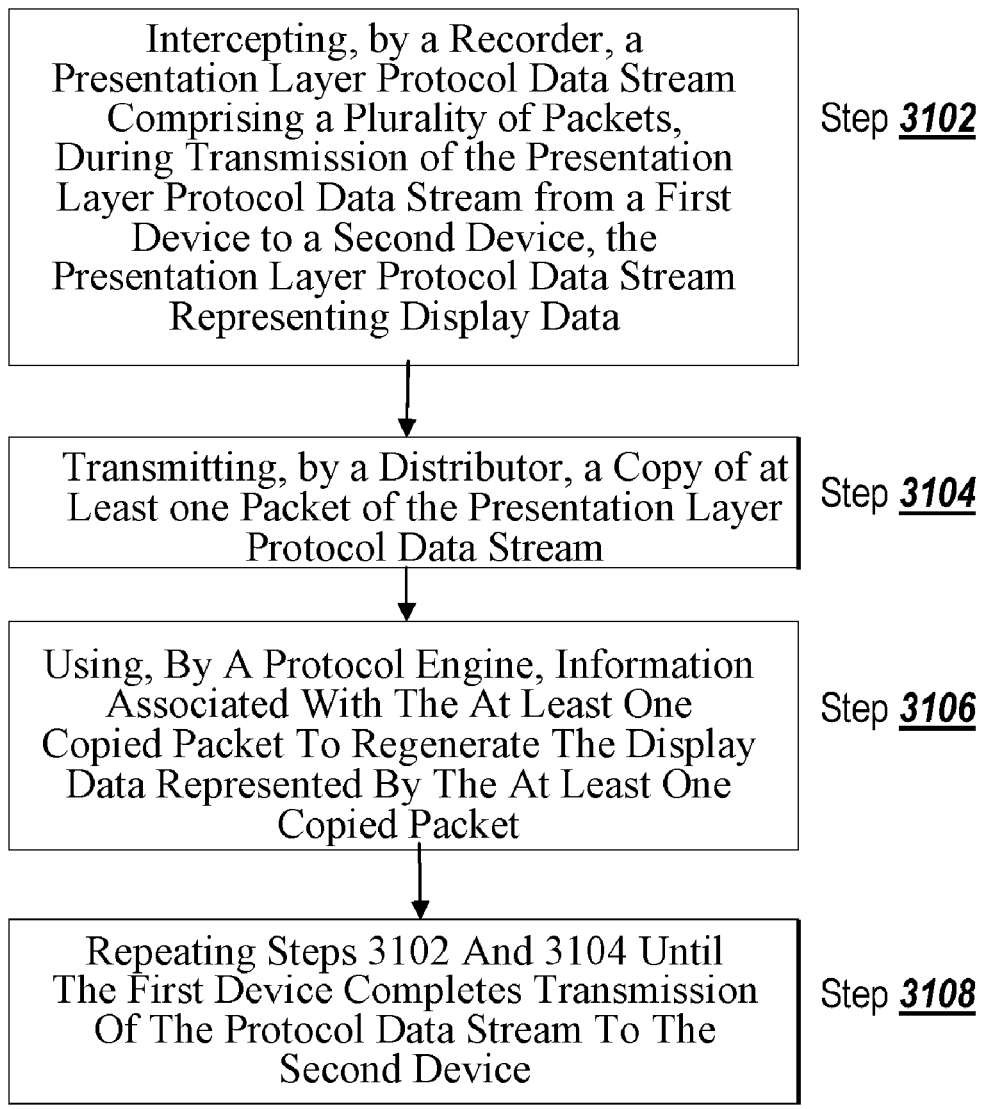
FIG. 31 is a flow diagram depicting one embodiment of the steps taken in a method for recording and real-time playback of a presentation protocol layer data stream.

Referring now to FIG. 31, a flow diagram depicts one embodiment of the steps taken in a method for recording and real-time playback of presentation layer protocol data streams. In brief overview, a recorder intercepts a presentation layer protocol data stream comprising a plurality of packets, during transmission of the presentation layer protocol data stream from a first device to a second device, the presentation layer protocol data stream representing display data (step 3102). A distributor transmits a copy of at least one packet of the presentation layer protocol data stream (step 3104). A protocol engine uses information associated with the at least one copied packet to regenerate the display data represented by the at least one copied packet (step 3106). The steps of intercepting the presentation layer protocol data stream and of transmitting a copy of at least one packet of the presentation layer protocol data stream repeat until the first device completes transmission of the protocol data stream to the second device (step 3108).

Referring now to FIG. 31, and in greater detail, a recorder intercepts a presentation layer protocol data stream comprising a plurality of packets, during transmission of the presentation layer protocol data stream from a first device to a second device, the presentation layer protocol data stream representing display data (step 3102). In one embodiment, the recorder 3010 intercepts the presentation layer protocol data stream at substantially the same time as the first device transmits the presentation layer protocol data stream to the second device. In another embodiment, the recorder intercepts a virtual channel.

In some embodiments, the recorder 3010 determines whether to copy a packet as described above in connection with FIG. 2. In other embodiments, upon completion of the transmission of the presentation layer protocol data stream 208 from the server 106 to the client 102, the recorder 3010 generates a recording of the presentation layer protocol data stream 208 as described above in connection with FIG. 2. In one of these embodiments the recorder 3010 stores a recording of the presentation layer protocol data stream. In still other embodiments, the recorder 3010 associates information with copied packets or embeds information into the copied portions of the presentation layer protocol data stream as described above in connection with FIG. 2.

In one embodiment, a recorder 3010 associated with, or residing on, a third device 3050 may capture various data transmitted over virtual channels and presentation layer packets (including optimization and acceleration metadata and mouse and keyboard packets) from the presentation layer stack in kernel mode. To reduce the computing and network overhead of sending many small messages to the third device 3050, in some embodiments the recorder 3010 may buffer the data locally for each session. When the recorder 3010 captures sufficient data to form a large enough message, or when a timeout period expired (in the order of minutes), the recorder 3010 may forward the data to a storage component. The approach provides the system with excellent utilization of resources.

Although some embodiments provide the type of buffering described above, for the reasons described above, in one embodiment, methods and systems supporting live or time-shifted playback needs to forward data to a playback device 514 immediately. If the data is held back for a length of time exceeding a threshold, the playback experience will suffer, as the stream is not continuous or up-to-date. Data may arrive at the playback device 514 at irregular and infrequent intervals. Some of the data received might be in the order of minutes old.

In some embodiments, a system removes the buffering functionality for all recording sessions. However, for sessions that are not watched live or time-shifted, this approach may decrease performance and scalability and may be considerably more wasteful of resources, such as the utilization of available network bandwidth.

In other embodiments, buffering functionality is provided for playback of previously recorded sessions and not for sessions that are actually being viewed live. In one of these embodiments, when a playback device 514 starts playback of a live session, the recorder 3010 receives a notification of this event and switches off the buffering mechanism accordingly. In another of these embodiments, when playback is complete, the recording of a subsequent session at the presentation server will be returned to normal buffering mode. This approach means scalability is only affected for the time the player is actually playing a recording. The impact will also only be on the presentation server hosting the session; other servers in the farm are not affected.

To further protect scalability, in still other embodiments, streaming of live sessions data may be slightly throttled. Instead of sending all received data immediately, the data is buffered, but only for a very short period of time. In one of these embodiments, the time is predetermined. In another of these embodiments, the buffering time period is less than one second. In still another of these embodiments, 500 milliseconds is selected, resulting in only transmission of only two network messages per second.

In one embodiment, methods and systems described herein address a problem created by the asynchronous nature of a presentation layer protocol data session, and idle time within a session. In another embodiment, when a session is idle, no data is streamed from a server 106 to a client 102, and therefore no data is intercepted, recorded, or forwarded for playback. In still another embodiment, without a regular stream of data, the playback device 514 cannot determine if it can extend its timeline to reflect that this time has past. One problem created by concluding that time has passed with no activity and reflecting that in an indication to a viewer of the data stream arises when session activity data for a time in the past arrives. That is, the playback device 514 receives no data, concludes that no activity occurred, indicates to the viewer that no activity occurred, and then displays data reflecting that activity did actually occur at a point in time in the past after indicating that no activity occurred at that time. Essentially, the playback device 514 has wrongly assumed that "nothing" has happened and has progressed the current player frame too far. This may lead to a viewer of the recorded session missing activity that occurred in the past or in confusion for the viewer of the recorded session.

In one embodiment, the playback device 514 determines that session data has arrived for a point in time in the past, indicating this to a viewer, and forces the viewer to return to the point in time when the session activity occurred. In some embodiments, this solution creates additional problems, including usability issues if the section of the recording is lengthy, or if the type of session activity is not significant to the viewer.

In another embodiment, a packet is transmitted to the playback device 514 indicating that at a particular point in time, no session activity occurred and there is no session data to transmit to the playback device 514. In still another embodiment, a packet type referred to as an "empty packet" is created and transmitted to the playback device 514. In yet another embodiment, the empty packet holds a time stamp like all other packets but contains no payload. If a session being recorded has had no presentation layer protocol data received within its buffering time period (for example, a 500 millisecond interval mentioned earlier), the recorder 3010 will inject an empty packet into the stream. In some embodiments, as with the data buffering approach, empty packets will only be injected for as long as time-shifted playback is active.

In these embodiments, the playback device 514 now receives a steady stream of empty packets and can safely extend its time line and allow playback into "known" idle periods.

In some of these embodiments, the transmission of empty packets results in additional overhead, such as a slight increase in the recorded file size or some resource usage even when the session is idle. However, in one of these embodiments, an empty packet is between 4 and 6 bytes in length (typically 5 bytes) and only two are sent per second. Assuming 5 byte packets, this equates to an extra 36 KB per hour per session. In some embodiments, due to the infrequency of live playback and compared to the typical overall data rate of 2 MB per hour per session, this extra overhead may be deemed insignificant.

In one embodiment, a recorder 3010 executes on a presentation server to intercept and record presentation layer protocol data. In another embodiment, the recorder 3010 receives an indication that user has requested time-shifted playback of a session the recorder 3010 is currently recording. In still another embodiment, the receipt of the indication indicates to the recorder 3010 that it should use functionality required to provide time-shifting. For example, the recorder 3010 may buffer packets for transmission until it receives a notification of a live viewing, and then, upon receipt of the indication, switch to a mode where it decreases the amount of time for which it buffers the packet. In another example, the recorder 3010 does not use the empty packets described above until it receives an indication that a user has requested time-shifted session playback.

In some embodiments, various methods are available for notifying the recorder 3010 that a playback device 514 is playing a session for a viewer while the recorder 3010 records the session. In terms of supporting the notification of live playback sessions, it may be considered inappropriate to open new network ports on each server on which a recording component resides to support this requirement. Instead of the third device 3050 (which is aware of all sessions being played live) notifying each presentation server directly, in some embodiments, the methods and systems implement a reverse poll mechanism. Each presentation server will "poll" the third device 3050 at uniform intervals for the list of sessions currently being played live. In some of these embodiments, this mechanism is preferred to others even though polling may have a greater overhead or be less responsive than asynchronous notification.

Polling requires no listening ports on the presentation server, but does raise the issue of how frequently to poll. In some embodiments, short intervals are used to ensure that the live session's buffering can be switched promptly although the interval may affect scalability. In other embodiments, long intervals have low resource impact but can lead to a lag in switching buffering modes. In still other embodiments, a predetermined time interval is selected by an administrator. In yet other embodiments, a polling interval of 10 seconds provides compromise between a short interval and a long interval. In one of these embodiments, the impact of a polling interval is rarely perceptible since most recorded sessions already have existing data available for download and immediately playback. In one of these embodiments, having existing data available for immediate playback gives the user time to orientate themselves with what they are watching. In another of these embodiments, the polling interval has passed by the time the user has completed a viewing of the available data and requests more recently recorded content. In still another of these embodiments, where a user completes a viewing of available content prior to the completion of a polling interval, a short polling interval may be set, so that a user need wait only a few seconds. For example, in an embodiment with a polling interval is set to ten seconds, the user only need wait a maximum of 10 seconds (average 5 seconds) if they want to view the most recent few minutes of recording.

As an example, a system having 1000 presentation servers all actively recording equates to a single third device 3050 having to process 100 poll messages per second. In such an embodiment, considering the small message size and low impact of processing each poll message, this is feasible from a system scalability perspective. In one embodiment, the processing of each poll message does not involve any I/O, complex computations, thread context switches or inter-process communication. In another embodiment, increasing the poll interval via configuration is also possible if required.

In some embodiments, the inclusion of the "poll" message has multiple purposes. In one of these embodiments, the poll message is also used as a "keep-alive" message for the third device 3050. In another of these embodiments, the third device 3050 is now capable of tracking which presentation servers are actively recording and how many sessions are currently being recorded.

A distributor transmits a copy of at least one packet of the presentation layer protocol data stream (step 3104). In one embodiment, the recorder stores a copy of the at least one packet of the presentation layer protocol data stream 208. In another embodiment, the recorder 3010 transmits at least one copied packet to the distributor 3020. In still another embodiment, the recorder 3010 stores the copy of the at least one packet in a buffer. In yet another embodiment, the recorder 3010 transmits a plurality of packets stored in the buffer to the distributor.

In one embodiment, the distributor 3020 retrieves the copy of the at least one packet of the presentation layer protocol data stream from a storage device. In another embodiment, the distributor 3020 retrieves the packet from a storage device, such as a storage 218 described above in connection with FIG. 2. In still another embodiment, the distributor receives the copy of the at least one packet from the recorder 3010.

A protocol engine uses information associated with the at least one copied packet to regenerate the display data represented by the at least one copied packet (step 3106). In one embodiment, the at least one copied packet is used upon receipt by the protocol engine of the at least one copied packet. In another embodiment, the at least one packet is used upon receiving by the protocol engine a request to regenerate the display data represented by the at least one copied packet.

The steps of intercepting the presentation layer protocol data stream and of transmitting a copy of at least one packet of the presentation layer protocol data stream repeat until the first device completes transmission of the protocol data stream to the second device (step 3108). In one embodiment, the step of using information associated with the at least one packet repeats until the protocol engine has regenerated display data represented by each received copied packets. In other embodiments, the protocol engine only regenerates display data for packets which a user has explicitly requested. In still other embodiments, the protocol engine starts and stops a regeneration of the display data upon receiving an indication of a request to start or to stop the regeneration.

In some embodiments, it is important to ensure that the end user is incapable of detecting that their session is being recorded or viewed live. In one embodiment, methods and systems providing time-shifted playback features prevent any additional opportunities for detecting recording of a presentation layer protocol data stream.

In one embodiment, playback of a presentation layer protocol session does not affect the running of a presentation layer protocol state machine. The stream of presentation layer protocol data that the end user receives is the same under live playback. This also implies there will be no visual and otherwise perceptible artifacts in their recording.

In another embodiment, where the end user does not have administrator rights on a server that is hosting their presentation session, no process or system object accessible indicates to the end user that they are being viewed live (or even being recorded). In still another embodiment, the end user is also restricted from issuing his or her own "poll" message to the third device 3050 for finding list of live playback sessions. Even for local administrator users, this would be difficult as the session IDs returned from this poll message are not terminal session identifiers. In one embodiment, this comprises security by obfuscation because mapping these internal session identifiers to terminal session identifiers would require specialized skills.

In other embodiments, another method of detection includes observing periods of performance degradation. In one of these embodiments, however, even for a physical machine dedicated to a single user, this would difficult to perceive as the impact is so light. On a shared application server, this would be impossible. In these embodiments, the end user is denied access to viewing performance counters or similar performance related data.

In summary, in some embodiments, methods and systems for time-shifted playback ensure that the only feasible means for an end user with normal user privileges to detect live playback is to perform a social engineering attack.

In one embodiment, a playback device 514 transmits a search request to a third device 3050. In another embodiment, the playback device 514 component searches an enumeration of sessions available for displaying to a viewer. In some embodiments, the enumeration includes only sessions where completed recordings of the sessions are available. In other embodiments, the enumeration includes only sessions where incomplete recordings of the sessions are available. In still other embodiments, the enumeration includes both sessions that are completely recorded and sessions that are incompletely recorded. In one of these embodiments, the playback device 514 includes functionality for distinguishing "live" recordings from "completed" recordings and makes this distinction apparent to the user in the search result list control. In another of these embodiments, as "live" recordings may become "complete", the playback device 514 may periodically query the third device 3050 for a status update of each live session listed. In still another embodiment, the search list remains in a refreshed state without user intervention.

In one embodiment, a user of a playback device 514 may select a stream of recorded data for viewing. In another embodiment, if the stream of recorded data contains data associated with a session which the recorder 3010 is still recording packets from the presentation layer protocol data stream, a channel is created and left open for receiving additional recorded data as it becomes available from the recorder 3010. In still another embodiment, as data is received by the third device 3050 it will be forwarded to the playback device 514 for processing via the channel. In yet another embodiment, if the recorder 3010 completes recording a session complete while the session is being played live, the playback device 514 will close the channel and playback will continue uninterrupted.

In some embodiments, security-related concerns may arise from functionality providing live playback. For example, in some embodiments, live session files cannot be encrypted to preserve digital rights management (DRM) and there is no digital signature verification. To mitigate the DRM problem, in some of these embodiments, the playback device 514 will attempt to process live recordings from private memory only. In one of these embodiments, live recordings are not written to a local file cache and attempts are made to prevent data from being paged or otherwise written to a persistent storage device. In another of these embodiments, loss of data in transit is less of a concern when traffic between a playback device 514 and a third device 3050 is SSL/TLS encrypted using strong encryption keys. To mitigate digital signature problems in others of these embodiments, a warning message will be displayed to the user before playback commences that the source and contents of the file cannot be verified. If users wish to obtain this statement of authenticity, they can re-download the session recording when it is complete. In many embodiments, this provides a reasonable compromise as digital signatures provide legal or forensic value to the recordings.

In one embodiment, when a player window is active, a seeker bar time-line will be extended when new data is received and this new content will be immediately available for viewing. In some embodiments, playback device 514 features remain available, including a background processing engine that generates key-frames for fast seeking. Functionality for seeking around a live recording is provided.

Figure 32:
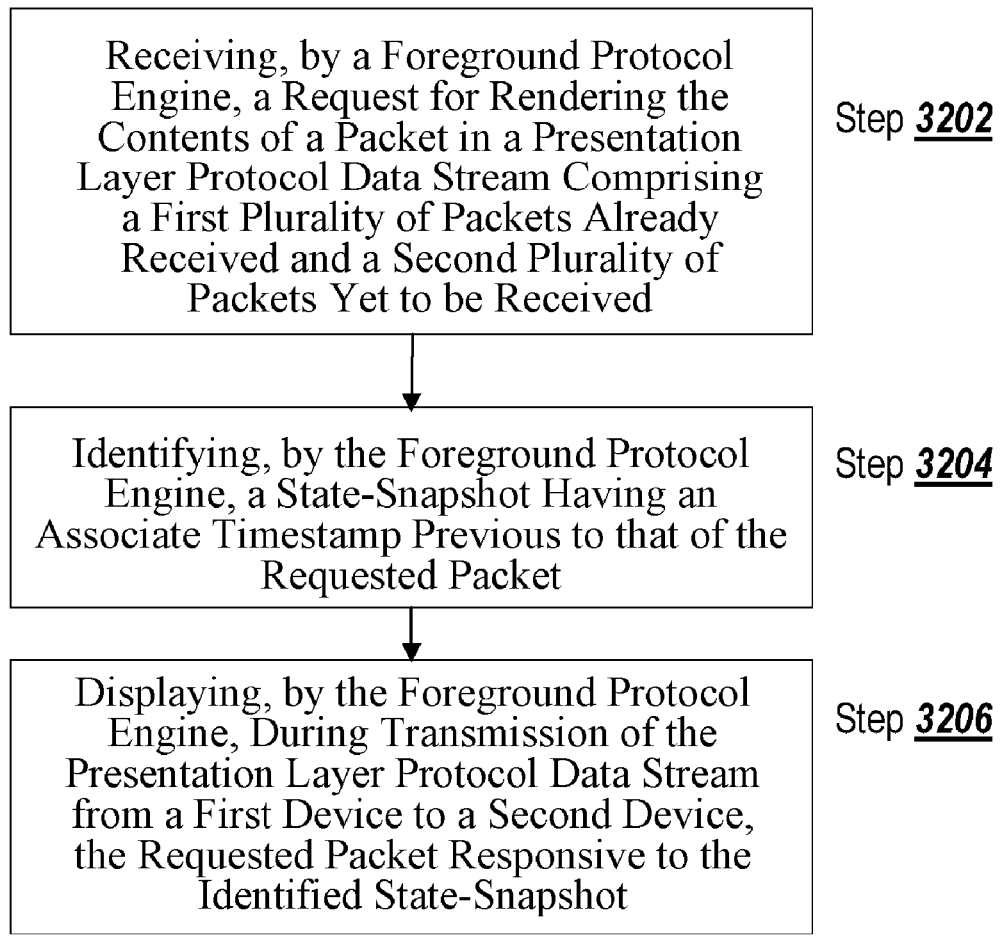
FIG. 32 is a flow diagram depicting one embodiment of the steps taken in a method for real-time seeking during real-time playback of remote presentation layer protocol data.

Referring now to FIG. 32, a flow diagram depicts one embodiment of the steps taken in a method for real-time seeking during real-time playback of remote presentation layer protocol data. In brief overview, a foreground protocol engine receives a request for rendering the contents of a packet in a presentation layer protocol data stream comprising a first plurality of packets already received and a second plurality of packets yet to be received (step 3202). The foreground protocol engine identifies a state-snapshot having an associate timestamp previous to that of the requested packet (step 3204). The foreground protocol engine displays, during transmission of the presentation layer protocol data stream from a first device to a second device, the requested packet responsive to the identified state-snapshot (step 3206).

In some embodiments, the received request results when the foreground protocol engine 1106 regenerates display data by rendering the contents of a packet in a first plurality of packets to a viewer using the display 1108 and the viewer wishes to seek for a particular display data. In other embodiments, the foreground protocol engine renders to a buffer the contents of an intermediate packet between the state-snapshot and the requested packet.

As described above in connection with FIG. 11, in some embodiments a recipient of rendered display data may seek for content in real-time. However, in some embodiments, as depicted by FIG. 32, the recipient of the rendered data may seek for content in real-time during the presentation of a packet from a presentation layer protocol data stream which has not been completely recorded. In one of these embodiments, the foreground protocol engine comprises a foreground protocol engine 1106 and provides real-time seeking functionality as described in connection with FIG. 11. In another of these embodiments, the foreground protocol engine 1106 also provides the above-described functionality for real-time seeking of portions of presentation layer protocol data streams, such as a first plurality of received packets, which comprise a subset of the presentation layer protocol data stream. In some embodiments, the foreground protocol engine 1106 generates, during transmission of the presentation layer protocol data stream from a first device to a second device, a real-time perceptible representation of a first plurality of packets received for presentation to a viewer using the display 1108. In other embodiments, the foreground protocol engine 1106 generates the real-time perceptible representation by rendering the contents of at least one packet in the protocol data stream 1110 or in the plurality of received packets. The perceptible representation may include, without limitation, separately or together, audio, visual, tactile, or olfactory presentations. In still other embodiments, the foreground protocol engine 1106 provides the functionality for real-time seeking amongst the first plurality of packets similar to the functionality for real-time seeking in a recorded protocol stream, as described above in connection with FIG. 9.

As described above in connection with FIG. 11, in some embodiments, state-snapshots enable regeneration of display data by storing a state of a protocol engine rendering presentation layer protocol data at a point in time when a recorder 206 copied at least one packet from the presentation layer protocol data stream 208. In one embodiment, the state-snapshot comprises a data structure describing a state of a screen at a point in time.

Figure 33:
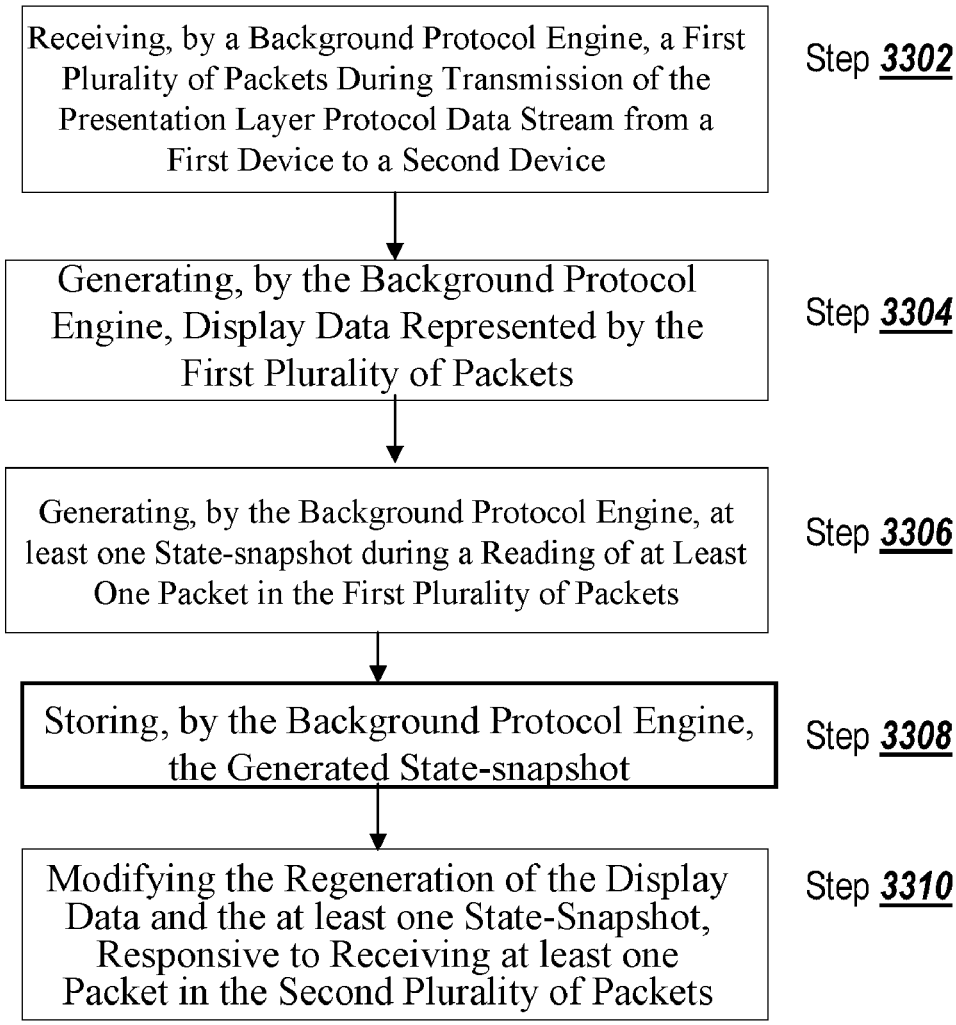
FIG. 33 is a flow diagram depicting one embodiment of the steps taken in a method for generating state-snapshots enabling real-time seeking during real-time playback of a presentation layer protocol data stream.

Referring now to FIG. 33, a flow diagram depicts one embodiment of the steps taken in a method for generating state-snapshots enabling real-time seeking during real-time playback of a presentation layer protocol data stream comprising a first plurality of packets already received by a background protocol engine and a second plurality of packets yet to be received by the background protocol engine. The background protocol engine receives a first plurality of packets during transmission of the presentation layer protocol data stream from a first device to a second device (step 3302). The background protocol engine regenerates display data represented by the first plurality of packet (step 3304). The background protocol engine generates at least one state-snapshot during a reading of at least one packet in the first plurality of packets (step 3306). The background protocol engine stores the generated state-snapshot (step 3308). The regeneration of the display data and the at least one state-snapshot are modified responsive to receiving at least one packet in the second plurality of packets (step 3310).

The background protocol engine receives a first plurality of packets during transmission of the presentation layer protocol data stream from a first device to a second device (step 3302). The background protocol engine generates a representation of the first plurality of packets. In one embodiment, the background protocol engine 1102 generates a representation of the first plurality of packets by rendering the contents of the first plurality of packets to a buffer. In some embodiments, the buffer is an off-screen buffer.

The background protocol engine generates display data represented by the first plurality of packets (step 3304). In one embodiment, the background protocol generates display data by rendering the contents of the first plurality of packets to a buffer. In some embodiments, the buffer is an off-screen buffer.

In some embodiments, the foreground protocol engine generates the display data. In one of these embodiments, the foreground protocol engine 1106 generates a human-perceptible representation of the first plurality of packets by rendering the contents of the first plurality of packets substantially simultaneously with the background protocol engine 1102 generating at least one state-snapshot during its reading of the first plurality of packets.

The background protocol engine generates at least one state-snapshot during a reading of at least one packet in the first plurality of packets (step 3306). In one embodiment, the generation of the at least one state-snapshot occurs substantially simultaneously with a presentation of the first plurality of packets. In another embodiment, the generation of the at least one state-snapshot occurs during a sequential reading of the first plurality of packets by the background protocol engine.

The background protocol engine stores the generated state-snapshot (step 3308). In embodiments where the background protocol engine 1102 generates multiple state-snapshots periodically, the state-snapshots may act as markers throughout the first plurality of packets, assisting in the location of a particular point in time in the first plurality of packets and of the packets that come before or after the state-snapshot 1104.

The generation of the display data and the at least one state-snapshot are modified, responsive to receiving at least one packet in the second plurality of packets (step 3310). In some embodiments, the background protocol engine receives a packet from the second plurality of packets—a previously un-received packet—and stores the packet from the second plurality of packets in the first plurality of packets. In one of these embodiments, the background protocol engine stores newly-received packets in a buffer with previously-received packets. In another of these embodiments, the modification to the first plurality of packets results in a modification or regeneration of the generated display data, or in the regeneration of additional display data. In still another of these embodiments, the addition of the packet from the second plurality of packets to the first plurality of packets results in a modification of a state-snapshot, or in the generation of additional state-snapshots.

In some embodiments, the background protocol engine generates the state-snapshots for the first plurality of packets using methods for generating state-snapshots for recorded protocol data streams described above. In other embodiments, the foreground protocol engine regenerates display data represented by the first plurality of packets using methods for regenerating display data represented by packets in recorded protocol data streams as described above.

Referring again to FIG. 11, system for real-time seeking during real-time playback of a presentation layer protocol data stream comprising a first plurality of packets already received by a background protocol engine and a second plurality of packets yet to be received by the background protocol engine includes a background protocol engine 1102, a state-snapshot 1104, a foreground protocol engine 1106, and a protocol data stream 1110.

The background protocol engine receives the first plurality of packets during transmission of the presentation layer protocol data stream from a first device to a second device. The state-snapshot, generated by the background protocol engine, comprises a state of a protocol engine rendering the presentation layer protocol data stream at a point in time when a recorder, such as the recorder 3010, copied a packet from the presentation layer protocol data stream into the first plurality of packets. The foreground protocol engine receives the first plurality of packets, renders the contents of the first plurality of packets, receives a request to seek display data represented by a content in a packet in the first plurality of packets, and renders the content representing the requested display data using the state-snapshot. In one embodiment, the foreground protocol engine renders the requested display data during transmission of the presentation layer protocol data stream from a first device, such as a server 106, to a second device, such as a client 102. The background protocol engine updates the state-snapshot responsive to receiving at least one packet in the second plurality of packets.

Although described in connection with FIG. 11 as a completely recorded protocol data stream, protocol data stream 1110, in some embodiments, comprises a portion of a second protocol data stream. In one of these embodiments, the protocol data stream 1110 is a first plurality of packets representing display data and with which metadata has been associated and into which additional information has been embedded. In another of these embodiments, as additional packets are received from the recorder 206, or the distributor 3020, the background protocol engine adds those packets to the protocol data stream 1110. In still another of these embodiments, the system described in FIG. 11 provides functionality for real-time seeking during real-time playback by using a portion of a protocol data stream, such as the first plurality of packets, in a substantially similar manner to the ways in which the system provides functionality for real-time seeking during playback of a completely recorded protocol data stream.

Figure 34:
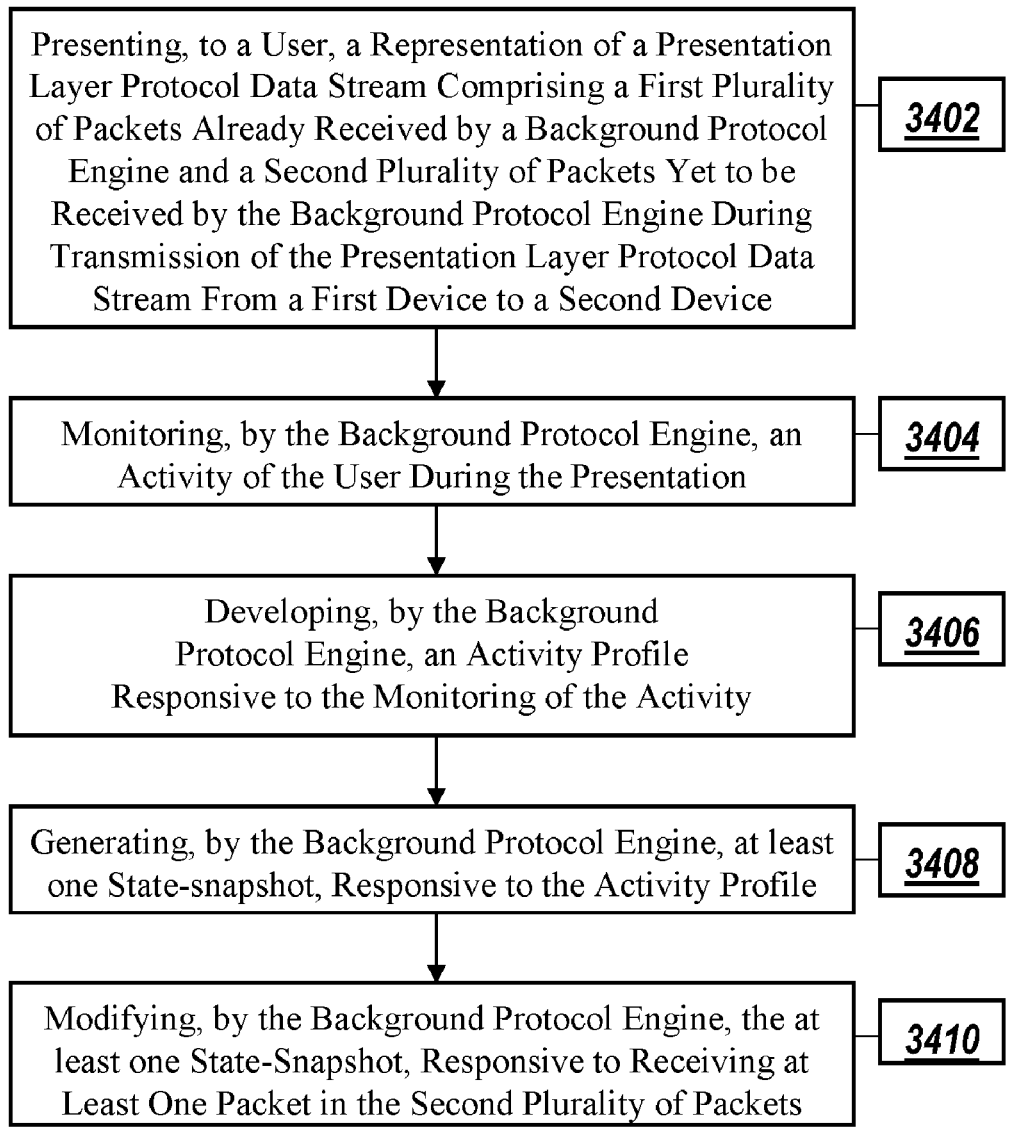
FIG. 34 is a flow diagram depicting one embodiment of the steps taken in a method for adaptive generation of state-snapshots.

Referring now to FIG. 34, a flow diagram depicts one embodiment of the steps taken in a method for adaptive generation of state-snapshots. A user is presented with a representation of a presentation layer protocol data stream comprising a first plurality of packets already received by a background protocol engine and a second plurality of packets yet to be received by the background protocol engine during transmission of the presentation layer protocol data stream from a first device to a second device (step 3402). The background protocol engine monitors an activity of the user during the presentation (step 3404). The background protocol engine develops an activity profile, responsive to the monitoring of the activity (step 3406). The background protocol engine generates at least one state-snapshot, responsive to the activity profile (step 3408). The background protocol engine modifies the at least one state-snapshot, responsive to receiving at least one packet in the second plurality of packets (step 3410).

In some embodiments, the steps taken for adaptive generation of state-snapshots described above in connection with FIGS. 12 through 15 are used with a portion of a protocol data, such as the first plurality of packets.

A user is presented with a representation of a presentation layer protocol data stream comprising a first plurality of packets already received by a background protocol engine and a second plurality of packets yet to be received by the background protocol engine during transmission of the presentation layer protocol data stream from a first device to a second device (step 3402). In one embodiment, as the background protocol engine receives packets from the second plurality of packets, the background protocol engine stores the newly-received packets in the first plurality of packets. In another embodiment, the background protocol engine continues to receive packets from the second plurality of packets until a server ceases transmission of a presentation layer protocol data stream to a client.

The background protocol engine monitors an activity of the user during the presentation (step 3404). In one embodiment, the foreground protocol engine 1106 generates the representation of the first plurality of packets and presents it to the user with the display 1108. In other embodiments, the background protocol engine 1102 generates the representation. In still other embodiments, a third device generates the representation. In one embodiment, the background protocol engine monitors an activity of a user during presentation of a portion of a session, such as during the presentation of regenerated display data represented by a first plurality of packets.

The background protocol engine develops an activity profile, responsive to the monitoring of the activity (step 3406). In some embodiments, the background protocol engine 1102 identifies a level of activity of the user. In some embodiments, the background protocol engine 1102 identifies a period of inactivity. In other embodiments, the background protocol engine 1102 identifies an area of interest to the user in the display data. The activity profile may reflect these identifications.

The background protocol engine generates at least one state-snapshot, responsive to the activity profile (step 3408). In some embodiments, the background protocol engine 1102 determines to extend an interval between one or more state-snapshots. In other embodiments, the background protocol engine 1102 determines to reduce an interval between one or more state-snapshots. In still other embodiments, the background protocol engine 1102 determines to remove the at least one state-snapshot, responsive to the activity profile. In still other embodiments, the background protocol engine 1102 determines to add at least one state-snapshot, responsive to the activity profile.

The background protocol engine modifies the at least one state-snapshot, responsive to receiving at least one packet in the second plurality of packets (step 3410). In some embodiments, the background protocol engine revises an identification of an activity level responsive to receiving at least one packet in the second plurality of packets. In one of these embodiments, a viewer of a first portion of a presentation layer protocol data stream modifies his or her activity level when watching a different portion of the presentation layer protocol data stream. In another of these embodiments, the background protocol engine observes modifications in activity levels or and modifies, or regenerates, state-snapshots accordingly.

As described above, FIG. 16 summarizes one embodiment of the method discussed above used in a system for adaptive generation of state-snapshots, including a background protocol engine 1602, a foreground protocol engine 1608, a protocol data stream 1612, an activity profile 1604, and a state-snapshot 1606. In another embodiment, the system described above also provides adaptive generation of state-snapshots during real-time playback of a presentation layer protocol data stream.

The foreground protocol engine, presents, to a user, a representation of a presentation layer protocol data stream comprising a first plurality of packets already received by a background protocol engine and a second plurality of packets yet to be received by the background protocol engine during transmission of the presentation layer protocol data stream from a first device to a second device. The background protocol engine monitors an activity of the user during the presentation and generates a state-snapshot. The background protocol engine determines an activity profile. The background protocol engine modifies the state-snapshot and the activity profile responsive to receiving at least one packet in the second plurality of packets In one embodiment, the background protocol engine determines the activity profile responsive to the monitoring. In another embodiment, the background protocol engine maintains the state-snapshot responsive to the activity profile. In still another embodiment, the background protocol engine updates a state-snapshot responsive to an observed change in an activity profile.

In some embodiments, the background protocol engine observes a modification to an activity profile. In one of these embodiments, an activity profile varies between the viewing of a first portion of a presentation layer protocol data stream and the viewing of a second portion of the presentation layer protocol data stream. In another of these embodiments, the background protocol engine maintains an updated activity profile and generates new state-snapshots, or modifies existing state-snapshots accordingly.

As described above in connection with FIGS. 17 and 18, in some embodiments, playback data structures may be used in playback of recorded protocol data streams. Additionally, in other embodiments, playback data structures may be used in real-time playback of presentation layer protocol data streams. A method for generating playback instructions for playback of a presentation layer protocol data stream comprising a first plurality of packets already received by a protocol engine and a second plurality of packets yet to be received by the protocol engine during transmission of a presentation layer protocol data stream includes the step of receiving, by the protocol engine executing on a playback device, the first plurality of packets representing display data generated by an application program executed on a server. The protocol engine determines, for a packet in the first plurality of packets, to render the contents of the packet in a human-perceptible manner. The protocol engine stores the determination in a playback data structure.

In some embodiments, the protocol engine determines to display a packet in the first plurality of packets responsive to the contents of the packet. In one of these embodiments, the protocol engine makes the determination responsive to an indication of an application program having input focus. In another of these embodiments, the protocol engine makes the determination responsive to an evaluation of a type of user input stored in the packet. In some of these embodiments, the protocol engine makes the determination responsive to an evaluation of a type of graphics update stored by the packet. In others of these embodiments, the protocol engine makes the determination responsive to an evaluation of a type of interaction sequence stored by the packet.

In some embodiments, a playback data structure describes how to regenerate the display data contained within the first plurality of packets. In one embodiment, the instructions stored within the playback data structure control the process of rendering display data. In one embodiment, the playback data structure comprises a time for rendering the contents of a packet in the first plurality of packets. In this embodiment, the time contained in the playback data structure is used for rendering the contents of the packet and not a time of rendering associated with the packet in the first plurality of packets, if any. In one embodiment, the playback data structure accepts user input in changing the time of rendering.

In other embodiments, the playback data structure comprises metadata that describes how to perform one or more playbacks of a first plurality of packets. In one embodiment, the playback data structure consists of a record for each packet in the first plurality of packets, indicating at what relative point in time the contents of that packet should be rendered during playback. In some embodiments, the metadata also contains the offset within the file of the start of the packet.

In some embodiments, as the background protocol engine receives additional packets in the presentation layer protocol data stream, the background protocol engine generates additional playback data structures or modifies existing playback data structures.

In one embodiment, the background protocol engine executes on a playback device and generates a playback data structure in response to receiving a first plurality of packets, said first plurality of packets representing display data generated by an application program executed on a server. The foreground protocol engine receives the first plurality of packets and renders the first plurality of packets responsive to the playback data structure generated by the background protocol engine substantially concurrently with the background protocol engine receiving at least one packet in the second plurality of packets and generating a playback data structure in response to the received at least one packet in the second plurality of packets. In another aspect, the foreground protocol engine receives the first plurality of packets and renders the first plurality of packets responsive to the playback data structure generated by the background protocol engine substantially concurrently with the background protocol engine receiving a second in the first plurality of packets and generating a playback data structure in response to the received second packet in the first plurality of packets.

In one embodiment, the background protocol engine and the foreground protocol engine each receive the first plurality of packets. In another embodiment, the background protocol engine generates the playback data structure substantially simultaneously with the foreground protocol engine rendering the first plurality of packets.

In one embodiment, the background protocol engine stores in the playback data structure at least one instruction for rendering at least one packet in the first plurality of packets. In another embodiment, the background protocol engine stores metadata in the playback data structure. In still another embodiment, the background protocol engine stores in the playback data structure a record indicating a time to render at least one packet in the first plurality of packets.

The foreground protocol engine renders at least one packet in the first plurality of packets responsive to the playback data structure. In one embodiment, the foreground protocol engine renders at least one packet in the first plurality of packets in a human-perceptible manner and to a buffer. In another embodiment, the foreground protocol engine renders at least one packet in the first plurality of packets to a buffer.

In one embodiment, a background protocol engine receives a first plurality of packets representing display data generated by an application program executing on a server, during transmission, by the server, of the presentation layer protocol data stream to a client. The background protocol engine determines for at least one packet in the first plurality of packets, to render the packet in a human-perceptible manner. The background protocol engine stores the determination in a playback data structure. A foreground protocol engine retrieves at least one packet from the first plurality of packets, access the playback data structure, and renders the at least one packet responsive to the playback data structure. These steps repeat until the server completes transmission of the presentation layer protocol data stream. In one embodiment, the steps server stops transmission of the presentation layer protocol data stream prior to the complete transmission of the presentation layer protocol data stream. In another embodiment, a first plurality of packets in the presentation layer protocol data stream are intercepted and real-time playback of the first plurality of packets occurs while a second plurality of packets in the presentation layer protocol data stream is generated and transmitted by the server.

In some embodiments, the background protocol engine determines to display a packet in a first plurality of packets and generates a corresponding playback data structure as described above in connection with FIG. 19. In other embodiments, the foreground protocol engine renders the contents of a packet in the first plurality of packets responsive to the playback data structure as described above in connection with FIG. 19.

Referring back to FIG. 21, presentation layer protocol data streams may be rendered without perceptible intervals of time containing no activity. In some embodiments, as described above in connection with FIG. 21, a completed recording of a presentation layer protocol data stream is rendered. In other embodiments, however, the methods described above may be used to render portions of incompletely recorded presentation layer protocol data streams.

A method of eliminating a period of inactivity in rendering a presentation layer protocol data stream comprising a first plurality of packets already received and a second plurality of packets yet to be received includes the step of identifying a first packet in the first plurality of packets, said first plurality of packets representing display data. A second packet in the first plurality of packets is identified, said second packet immediately preceding the first packet. A first time interval between the first packet and the second packet is determined. It is determined that the first time interval exceeds a threshold. During transmission of the protocol data stream from a server to a client, the contents of the first plurality of packets with a second time interval between the first packet and the second packet are rendered, said second time interval comprising a shorter time interval than the first time interval. At least one packet in the second plurality of packets is received.

In one embodiment, the at least one packet in the second plurality of packets is added to the first plurality of packets upon receipt. The steps of identifying the first packet and a second packet preceding the first packet and determining whether a time interval between the two exceeds a threshold are repeated for the received at least one packet in the second plurality of packets. In another embodiment, the steps of identifying the first packet and a second packet preceding the first packet and determining whether a time interval between the two exceeds a threshold are repeated for a second packet in the first plurality of packets. In some embodiments, the methods described above in connection with FIG. 21 are used to eliminate perceptible intervals of time with no activity from portions of presentation layer protocol data streams, such as the first plurality of packets.

A method of generating playback instructions for rendering a presentation layer protocol data stream comprising a first plurality of packets already received and a second plurality of packets yet to be received includes the step of identifying a type of input stored by a packet in the first plurality of packets representing display data generated by an application program. The packet is marked responsive to the type of input. A playback data structure stores a destination for rendering the contents of the packet responsive to the marking. At least one packet in the second plurality of packets is received. In one embodiment, the at least one packet in the second plurality of packets is added to the first plurality of packets upon receipt. A second packet in the first plurality of packets is received. The steps of identifying a type of input stored by a packet, marking the packet responsive to the type of input, storing the rendering destination in the playback data structure, and receiving additional packets repeat as new packets are received until a server completes transmission of the presentation layer protocol data stream.

In one embodiment, the type of input stored by a packet determines whether or not the packet will be rendered. In one embodiment, the packet contains no content. In some embodiments, at least one packet contains no content. In these embodiments, an interval of time comprised of at least one packet containing no content is identified. In some of these embodiments, the interval of time will not be rendered. In one of these embodiments, an empty packet type as described above in connection with FIGS. 30A-D and 31 is received and identified as a packet containing no data.

In some embodiments, the type of input refers to input from certain types of input devices, including, without limitation, a keyboard, a mouse, a microphone, or a camera. In one embodiment the step of identifying the type of input further comprises identifying the type of input as input from an input device. In another embodiment, the step of identifying the type of input further comprises identifying the type of input as keyboard input. In other embodiments, the type of input is not related to the input device. In one of these embodiments, the type of input is identified as a command.

In one embodiment, the method eliminates perceptible intervals of time containing no meaningful activity. In this embodiment, a policy identifies a particular type of input as meaningful or as insignificant. The policy may be hard coded into a protocol engine, in some embodiments. In other embodiments, an administrator configures the policy.

In some embodiments, a protocol engine identifies a packet as insignificant if the packet contains no content. In some of those embodiments, the packet represents an interval of time in which the no user activity occurred to be recorded into a packet in the first plurality of packets. In one of these embodiments, the protocol engine stores in a playback data structure a destination for rendering each of the plurality of packets in the first plurality of packets in such a way that any insignificant packet does not render in a perceptible manner. In another of these embodiments, the protocol engine may generate an indication that time has passed without activity. For example, a timeline of the presentation layer protocol data stream presented to a viewer may be updated to reflect that time has passed although no display data has changed. In still another of these embodiments, the protocol engine uses the empty packet type described above to identify a packet as insignificant.

In some embodiments, methods described above for eliminating periods of time containing no meaningful activity in recorded presentation layer protocol data streams are also used to eliminate periods of time containing no meaningful activity in portions of the presentation layer protocol data stream, such as the first plurality of packets. As in FIG. 22, which depicts one embodiment of a regenerated recorded stream whose contents are rendered responsive to a playback data structure, rendering portions of protocol data streams responsive to the playback data structure, in this embodiment, allows elimination of intervals of time containing no meaningful activity (depicted by the white and striped blocks in FIG. 22), which includes intervals of time containing no activity at all. This rendering provides a more meaningful regeneration of the first plurality of packets in the presentation layer protocol data stream to a user.

A method of eliminating a period containing no meaningful activity in rendering a presentation layer protocol data stream comprising a first plurality of packets already received and a second plurality of packets yet to be received includes the step of determining a first time interval between a marked packet and a nearest previous marked packet in the first plurality of packets, said first plurality of packets representing display data. A determination is made that the first time interval exceeds a threshold. During transmission of the protocol data stream from a server to a client, the contents of the first plurality of packets are rendered with a second time interval between the marked packet and the nearest previous marked packet, said second time interval comprising a shorter time interval than the first time interval. At least one packet in the second plurality of packets may be received. A second packet in the first plurality of packets may be received. The newly received packets may be added to the first plurality of packets. The steps of determining that the first time interval exceeds a threshold and rendering the contents of the first plurality of packets with the second time interval is repeated until the server completes transmission of the presentation layer protocol data stream.

In one embodiment, the contents of the first plurality of packets are rendered with a second time interval between the marked packet and a previous packet said second time interval comprising a shorter time interval than the first time interval. In another embodiment, the contents of the first plurality of packets are rendered with a second time interval between the marked packet and a packet following the marked packet, said second time interval comprising a shorter time interval than the first time interval. In some embodiments, the contents of the first plurality of packets are rendered using the methods described above in connection with FIG. 28.

Methods for eliminating graphics updates in rendering recorded sessions, as described above in connection with FIG. 24, also eliminate graphics updates in rendering portions of sessions, for example, by removing graphics updates in a first plurality of packets comprising a subset of a presentation layer protocol data stream. As described in connection with FIG. 25, cyclic updates may be identified and a determination may be made not to render a cyclic update in a human-perceptible manner. Similarly, these methods may identify cyclic updates within portions of presentation layer protocol data streams.

A method of eliminating graphics updates in rendering a presentation layer protocol data stream comprising a first plurality of packets already received and a second plurality of packets yet to be received includes the step of identifying a packet in the first plurality of packets, the first plurality of packets representing display data generated by an application program, the packet containing a first graphics update. A screen region affected by the first graphics update is determined. An indication of the state of the screen region after the first graphics update and the location of the screen region is stored. A second graphics update affecting the screen region within a time interval is identified. A playback data structure indicates a destination for rendering a second packet in the first plurality of packets containing the second graphic update affecting the screen region, responsive to whether the state of the screen region after the second graphics update varies from the state of the screen region after the first graphics update. A playback data structure indicates a time interval to render associated with the second packet in the first plurality of packets containing the second graphic update affecting the screen region, responsive to whether the state of the screen region after the second graphics update varies from the state of the screen region after the first graphics update.

In one embodiment a graphics update contained within a plurality of packets is identified. In another embodiment, the screen region affected responsive to the graphics update stored by each packet in the identified plurality of packets is determined. In still another embodiment, a copy of the screen region affected by the graphics update is stored. In yet another embodiment, a time interval is defined to approximate an upper limit of a human scale cyclic period. In a further embodiment, a playback data structure indicates that the contents of the packet render in a perceptible manner and to a buffer. In even still another embodiment, a playback data structure indicates that the contents of the packet render to a buffer. In some embodiments, the background protocol engine stores these indications in the playback data structure.

Another method for eliminating graphics updates in rendering a presentation layer protocol data stream comprising a first plurality of packets already received and a second plurality of packets yet to be received includes the step of identifying a packet in the first plurality of packets, the first plurality of packets representing display data generated by an application program, the packet containing a first graphics update. A screen region affected by the first graphics update is determined. An indication of the state of the screen region after the first graphics update and the location of the screen region is stored. A second graphics update affecting the screen region within a time interval is identified. A playback data structure indicates a destination for rendering a packet in the second plurality of packets containing the second graphic update affecting the screen region, responsive to whether the state of the screen region after the second graphics update varies from the state of the screen region after the first graphics update. A playback data structure indicates a time interval to render associated with the packet in the second plurality of packets containing the second graphic update affecting the screen region, responsive to whether the state of the screen region after the second graphics update varies from the state of the screen region after the first graphics update.

In one embodiment a graphics update contained within a plurality of packets is identified. In another embodiment, the screen region affected responsive to the graphics update stored by each packet in the identified plurality of packets is determined. In still another embodiment, a copy of the screen region affected by the graphics update is stored. In yet another embodiment, a time interval is defined to approximate an upper limit of a human scale cyclic period. In a further embodiment, a playback data structure indicates that the contents of the packet render in a perceptible manner and to a buffer. In even still another embodiment, a playback data structure indicates that the contents of the packet render to a buffer. In some embodiments, the background protocol engine stores these indications in the playback data structure.

As described in FIG. 26, methods for eliminating interaction sequences may be used with presentation layer protocol data streams. In some embodiments, described above, the methods are used with completed records of presentation layer protocol data streams. In other embodiments, however, the methods are used with portions of presentation layer protocol data streams, such as a first plurality of packets comprising a subset of packets in a presentation layer protocol data stream.

A method of eliminating interaction sequences in rendering presentation layer protocol data stream comprising a first plurality of packets already received and a second plurality of packets yet to be received includes the step of identifying, responsive to a policy, a start of an interaction sequence represented by at least one packet in the first plurality of packets. A playback data structure indicates that the interaction sequence should render to a buffer. A termination of an interaction sequence is identified. A first time interval between a packet preceding the identified start of the interaction sequence and a packet following the identified termination of the interaction sequence is identified. A playback data structure indicates a second time interval to render shorter than the first time interval.

Another method of eliminating interaction sequences in rendering presentation layer protocol data stream comprising a first plurality of packets already received and a second plurality of packets yet to be received includes the step of identifying, responsive to a policy, a start of an interaction sequence represented by at least one packet in the first plurality of packets. A playback data structure indicates that the interaction sequence should render to a buffer. A packet in the second plurality of packets is received. A termination of an interaction sequence represented by the received packet in the second plurality of packets is identified. A first time interval between a packet preceding the identified start of the interaction sequence and a packet following the identified termination of the interaction sequence is identified. A playback data structure indicates a second time interval to render shorter than the first time interval.

In one embodiment, the start of the interaction sequence is identified by identifying a visual marker. In one embodiment, a visual marker comprises a credentials window, displayed in the same way for all sessions. In another embodiment, a visual marker comprises a replacement of a credentials window by a blank screen and then by a desktop background. In one embodiment, a visual marker comprises the display of recognizable icons.

In some embodiments, a start of an interaction sequence is identified by determining a start time of an interaction sequence. In one of these embodiments, a component detects the start time of an event in an interaction sequence. In another of these embodiments, the component detects the start time of a logon sequence. In still others of these embodiments, the component detects the start time of a logoff sequence. In one embodiment, the identification of the start of the interaction sequence is responsive to identifying a window with an input focus.

In one embodiment, where an identified interaction sequence should not render perceptibly, the interaction sequence is rendered to a buffer. Rendering the interaction sequence to a buffer results in the interaction sequence being imperceptible to a user of the rendering. For embodiments where a policy or user categorized the interaction sequence as insignificant, this rendering results in the elimination of an insignificant interaction sequence.

In some embodiments, the termination of the interaction sequence is identified by identifying a visual marker. In other embodiments, a termination of an interaction sequence is identified by determining a termination time of the interaction sequence. In one of these embodiments, a component detects the termination time of an event in an interaction sequence. In another of these embodiments, the component detects the termination time of a logon sequence. In still others of these embodiments, the component detects the termination time of a logoff sequence. In another embodiment, identifying the termination of the interaction sequence is responsive to identifying a window with an input focus.

In some embodiments, an interaction sequence comprises use of an application. In one of these embodiments, a policy identifies interaction sequences comprising use of an application that should not render in a perceptible manner. In one embodiment, such applications include, without limitation, word processing documents.

In one of these embodiments, a start of an interaction sequence is identified by identifying an application having input focus. When the contents of a packet represent a window having focus, a determination is made as to the application responsible for the process that created the window. In one embodiment, the contents of the packet representing a window having focus include window notification messages indicating a change in input focus. If the responsible application identifies a start of an interaction sequence which should not render perceptibly, an indication is stored in a playback data structure to render the interaction sequence to a buffer. A termination of an interaction sequence is identified by identifying the acquisition of focus by a window owned by a process not associated with the application of the interaction sequence.

In one embodiment, a first time interval is associated with the interaction sequence. Perceptibly rendering the time interval associated with the interaction sequence in an embodiment where the interaction sequence itself does not render results in a period of time perceptible to a user of the rendering in which no display data renders and the user waits through the time interval before a rendering of the contents of a packet after the interaction sequence. One embodiment eliminates the time interval associated with the interaction sequence by rendering a shorter time interval in place of the original time interval.

In some embodiments, a protocol engine renders the contents of at least one packet in a first plurality of packets, providing to a user a regeneration of the first plurality of packets. In some of these embodiments, the protocol engine automatically varies the time intervals between rendering the contents of at least one packet, resulting in context-sensitive time-warped playback. In these embodiments, rendering approximates the ability of the user to comprehend the display data presented to the user. In one embodiment, the time intervals between rendering contents of packets increase when the protocol engine determines the display data represented by the contents of the packets to have an increased level of complexity or importance, as defined by a policy. In another embodiment, the time intervals between rendering contents of packets decrease when the protocol engine determines the display data represented by the contents of the packets to have a decreased level of complexity or importance, as defined by a policy. In these embodiments, the protocol engine approximates the ability of the user to comprehend the display data and renders the contents either more slowly to give the user time to comprehend the rendering or renders the contents faster when a user requires less comprehension time.

In some embodiments, described above in connection with FIG. 27, methods for rendering recorded computer sessions provide automatic time-warped playback. These methods may also provide automatic time-warped playback during rendering of real-time presentation layer protocol data streams, in which the recording of the session represented by the data stream is incomplete.

A method of automatic time-warped playback in real-time rendering a presentation layer protocol data stream comprising a first plurality of packets already received by a background protocol engine and a second plurality of packets yet to be received by the background protocol engine includes the step of receiving, by the background protocol engine, the first plurality of packets representing display data. The background protocol engine determines a measure of complexity represented by at least some of the packets in the first plurality of packets. The background protocol engine identifies an interval of time between the at least some of the packets in the first plurality of packets. The background protocol engine modifies the interval of time responsive to the measure of complexity represented by the at least some of the packets in the first plurality of packets in the recorded session. The background protocol engine stores, in a playback structure, the modified interval of time. A foreground protocol engine renders, during transmission of the presentation layer protocol stream from a first device to a second device, the first plurality of packets responsive to the playback data structure.

In some embodiments, the steps taken in the methods described in FIG. 27 are also taken to render, during transmission of the presentation layer protocol stream from a first device to a second device, the first plurality of packets, responsive to the playback data structure.

In some of these embodiments, the protocol engine determines the measure of complexity by identifying likely sequences of typing in keyboard input. In one embodiment, the protocol engine inspects at least one type of key involved to identify likely sequences of typing in keyboard input. In another embodiment, the protocol engine inspects a sequence of at least one glyph rendered to complete a heuristic approximation of likely sequences of typing in keyboard input.

In some of these embodiments, the protocol engine stores classifications of keys determined by characteristics of the key. Key characteristics include, without limitation printable or non-printable characters, white space, navigation keys, or function keys, and include combinations of characteristics. In one embodiment, a protocol engine determines that sections of input comprising printable characters and occasional navigation keys constitute normal typing, while sections with mostly non-visible keys do not constitute normal typing. In one embodiment, the protocol engine determines a measure of complexity responsive to the amount of white space identified. In this embodiment, the protocol engine comprises a definition of word processing indicating that a white space key appears on average approximately every 5-8 characters in typical typing patterns.

In one embodiment, the protocol engine uses the appearance of non-printable characters to determine the measure of complexity. In another embodiment, the protocol engine accesses the keystroke sequences to identify sequences of non-white space printable characters appearing close together in time. In this embodiment, the protocol engine comprises the capacity to compare the keystroke sequences to a dictionary to identify valid words and determine a measure of complexity relating to an ability of a user to comprehend valid words versus invalid words.

In another embodiment, the protocol engine determines that the contents of the packet contain commands to render glyphs. In this embodiment, the protocol engine uses the glyphs to determine whether the display data represents a user activity of typing. In this embodiment, if a glyph rendering rate approximates the keyboard input rate with a small delay, it is likely that keystrokes are directly resulting in glyphs, thus making it quite likely the user is typing. In one embodiment, the protocol engine correlates the keys entered with the glyphs produced. In another embodiment, the protocol engine determines the spatial sequence (left-to-right, right-to-left, etc.) of the rendered glyphs to determine that a user is typing. In one embodiment, the protocol engine makes the determination of the measure of complexity responsive to the result of analyzing the contents of the plurality of packets and identifying patterns and activities represented by the contents.

In other embodiments, the protocol engine makes the determination of the measure of complexity responsive to an identification of a type of mouse input. In one embodiment, the protocol engine determines that a mouse input representing a click of the mouse causes actions that may need a slower rendering rate to comprehend, especially if the clicks follow a sequence of typing. In another embodiment, the protocol engine determines that mouse input that does not represent a clicking of a mouse does not affect the ability of a user to comprehend display data, and thus does not affect the measure of complexity.

In other embodiments, the protocol engine makes the determination of the measure of complexity responsive to identifying a heuristic approximation of complexity of a graphics update. In one embodiment, the protocol engine identifies a heuristic approximation of complexity of a graphics update based upon, without limitation, the size of region (s) being updated, the size of the area of the region changed by the graphics commands, a historical frequency of updates to individual regions, cyclic graphics commands, number of graphics commands, frequency of graphics commands, time interval between adjacent packets whose contents contain graphics command, or the type of graphics update. In an embodiment where the protocol engine identifies a low measure of complexity for the graphics update, the protocol engine determines a low measure of complexity represented by the packets containing the graphics updates. In an embodiment where the protocol engine identifies a high measure of complexity for the graphics update, the protocol engine determines a high measure of complexity represented by the packets containing the graphics updates.

In an embodiment where at least some of the plurality of packets have content representing display data associated with a high measure of complexity, the protocol engine increases the interval of time between the packets to allow the user of the rendering increased time to comprehend the rendered display data. In another embodiment where at least some of the plurality of packets have content representing display data associated with a low measure of complexity, the protocol engine decreases the interval of time between the packets to reflect decreased amount of time the user requires to comprehend the rendered display data. In one embodiment, a user requires a different amount of time between the rendered contents of packets than the amount rendered by the protocol engine. In this embodiment, the user modifies the interval of time to reflect the amount of time the user requires to comprehend the rendered display data. In some embodiments, the protocol engine also identifies a time interval between the at least some of the plurality of packets and other packets in the plurality of packets, modifying the interval of time identified between those sets of packets.

In some embodiments, the protocol engine identifies a first marker associated with a packet in the first plurality of packets. In one embodiment, the packet comprises the marker. In another embodiment, the recorded session comprises the marker.

In one embodiment, a user of the rendering of the display data defines the marker. In another embodiment, the protocol engine defines the marker. In embodiments where the protocol engine identifies a marker, the protocol engine modifies the interval of time responsive to the first marker. In one embodiment, the protocol engine increases the interval of time providing the user of the rendering of the display data additional time for comprehending the contents of the packet associated with the first marker. In other embodiments, the protocol engine identifies a second marker in a second packet. In this embodiment, the protocol engine modifies the interval of time responsive to the distance between the first marker and the second marker. In this embodiment, the protocol engine provides increased time for comprehension of display data represented by contents of packets marked and decreased time for comprehension of data represented by contents of unmarked packets. In one embodiment, a user defines markers for display data of interest to the user and the protocol engine renders additional time for the display data of interest to the user and decreases time of rendering for display data not of interest to the user, as determined by the markers.

In one embodiment, the protocol engine identifies a first marker in the at least some of the plurality of packets, said marker indicating an initial packet in the at least some of the plurality of packets. The protocol engine modifies the interval of time responsive to the first marker. The protocol engine identifies a second marker in a second packet in the at least some of the plurality of packets, said second marker indicating a final packet in the at least some of the plurality of packets and modifying the interval of time responsive to the interval of time between the first marker and the second marker.

In one embodiment, the protocol engine also renders the plurality of packets responsive to the playback data structure instructions regarding modified time intervals. In another embodiment, a separate foreground protocol engine renders the plurality of packets.

In some embodiments, a determination is made that recorded interaction with an application requires increased time for rendering, to provide a user of the rendering increased time for comprehension of the rendered display data. In some of these embodiments, the determination is made that the application requiring increased time comprises a more important application than an application not requiring the increased time. In one of these embodiments, the user makes the determination. In another of these embodiments, a policy makes the determination. In still another of these embodiments, the protocol engine comprises a definition of applications that require increased time.

As described in connection with FIG. 28, a method may provide automatic time-warped playback responsive to an identified application in rendering a recorded computer session. Similarly, the method provide automatic time-warped playback responsive to an identified application in rendering a portion of an incompletely recorded presentation layer protocol data session, or of a presentation layer protocol data session in the process of being recorded.

A method of automatic time-warped playback in real-time rendering of a presentation layer protocol data stream comprising a first plurality of packets already received and a second plurality of packets yet to be received includes the steps of receiving the first plurality of packets representing display data. A first packet in the first plurality of packets having a content representing a window having focus is identified, said window indicating an application. A time interval between a second packet in the first plurality of packets whose contents render prior to the rendering of the content of the first packet and a third packet in the first plurality of packets whose contents render after the rendering of the content of the first packet is identified. The identified time interval is modified responsive to the indicated application. During transmission of the presentation layer protocol stream from a first device to a second device, at least one packet in the first plurality of packets is rendered responsive to the modification.

In one embodiment, the modification to the identified time interval includes an increase in the identified time interval. In another embodiment, the modification to the identified time interval includes a decrease to the identified time interval. In still another embodiment, the at least one packet in the first plurality of packets is rendered to a buffer. In yet another embodiment, the at least one packet in the first plurality of packets is rendered both to a buffer and in a perceptible manner.

As described above in connection with FIG. 29, systems may provide automatic time-warped playback in rendering recorded computer sessions. These systems may also provide automatic time-warped playback in rendering presentation layer protocol data streams comprising a first plurality of packets already received by a protocol engine and a second plurality of packets yet to be received by the protocol engine. A protocol engine, generating a playback data structure in response to receiving the first plurality of packets rendering, during transmission of the presentation layer protocol stream from a first device to a second device, at least one packet in the first plurality of packets responsive to the generated playback data structure.

In one embodiment, the protocol engine stores in the playback data structure at least one instruction for rendering the first plurality of packets. In another embodiment, the protocol engine stores metadata in the playback data structure. In still another embodiment, the protocol engine renders the at least one packet in the first plurality of packets in a perceptible manner and to a buffer. In yet another embodiment, the protocol engine renders the at least one packet in the first plurality of packets to a buffer. In a further embodiment, a second protocol engine renders the at least one packet in the first plurality of packets responsive to the generated playback data structure.

In some embodiments, a presentation refers to a server providing presentation layer protocol data to a client or to another server. In one of these embodiments, the server executes an application and provides generated application-output data to a client or another server. In another of these embodiments, the server provides access to presentation layer protocol data associated with, or created by, a resource, such as a plurality of applications, a desktop environment, or other computing environment. In still another of these embodiments, the server provides presentation layer protocol data for a session (such as an execution of a resource), the session executing within a virtual machine executing in a hypervisor executing in a terminal services session executing on the server. In still another of these embodiments, a server executing a virtual machine providing access to a session transmits presentation layer protocol data to a second server executing a terminal services session and forwarding the received data to a client. In yet another of these embodiments, the server provides presentation layer protocol data for a session executing within a virtual machine to a second server hosting a presentation layer protocol stack and forwarding the data to a client.

The ability to watch a presentation layer protocol session recording while it is still being recorded enhances systems and methods for playback of previously recorded sessions. It strengthens the position of such systems and methods as a market-leading monitoring and surveillance solution, and provides a significant gateway into the support/helpdesk market.

The systems and methods described above may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

Having described certain embodiments of methods and systems for real-time seeking during real-time playback of presentation layer protocol data, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for adaptive generation of state-snapshots enabling real-time seeking during real-time playback of a presentation layer protocol data stream transmitted from an application server (i) executing an application for a client and (ii) streaming the output display generated by the application to the client, the method comprising:

(a) displaying, by a foreground protocol engine, a presentation layer protocol data stream comprising a first plurality of packets received by a background protocol engine and a second plurality of packets yet to be received by the background protocol engine during transmission of the presentation layer protocol data stream from a first device to a second device;

(b) monitoring, by the background protocol engine, an activity of the user during the presentation;

(c) developing, by the background protocol engine, an activity profile responsive to the monitoring of the activity;

(d) collecting and storing, by the background protocol engine, data related to the activity of the user;

(e) modifying, by the background protocol engine, the activity profile responsive to the collected data related to the activity of the user;

(f) generating, by the background protocol engine, at least one state-snapshot of the background protocol engine, responsive to the activity profile;

(g) modifying, by the background protocol engine, the at least one state-snapshot, responsive to receiving at least one packet in the second plurality of packets.

(h) identifying, by the foreground protocol engine, the at least one state-snapshot; and (i) displaying, by the foreground protocol engine, the presentation layer protocol data stream from the at least one state-snapshot while receiving the second plurality of packets by the background protocol engine during transmission of the presentation layer protocol data stream.

2. The method of claim 1, wherein step (b) further comprises identifying a period of inactivity by the user.

3. The method of claim 1, wherein step (c) further comprises developing an activity profile for a usage pattern of the user.

4. The method of claim 1, wherein step (d) further comprises determining to extend an interval between one or more state-snapshots.

5. The method of claim 1, wherein step (d) further comprises determining to reduce an interval between one or more state-snapshots.

6. The method of claim 1, further comprising the step of determining, by the background protocol engine, to remove the at least one state-snapshot, responsive to the activity profile.

7. The method of claim 1, further comprising the step of determining, by the background protocol engine, to add at least one state-snapshot, responsive to the activity profile.

8. The method of claim 1, wherein step (c) further comprises identifying a statistical distribution of seek probabilities.

9. The method of claim 8, wherein step (d) further comprises the step of generating the at least one state-snapshot responsive to the statistical distribution of seek probabilities.

10. A system for adaptive generation of state-snapshots enabling real-time seeking during real-time playback of a presentation layer protocol data stream transmitted from an application server (i) executing an application for a client and (ii) streaming the output display generated by the application to the client comprising:

a foreground protocol engine executing on a computing machine displaying a presentation layer protocol data stream comprising a first plurality of packets already received by a background protocol engine and a second plurality of packets yet to be received by the background protocol engine during transmission of the presentation layer protocol data stream from a first device to a second device identifying at least one state-snapshot; and displaying the presentation layer protocol data stream from the at least one state-snapshot while receiving the second plurality of packets by the background protocol engine during transmission of the presentation layer protocol data stream the background protocol engine executing on the computing machine monitoring an activity of the user during the presentation;

developing an activity profile responsive to the monitoring of the activity;

collecting and storing data related to the activity of the user;

generating the state-snapshot of the background protocol engine responsive to the activity profile; and modifying the activity profile responsive to the collected data related to the activity of the user; and the activity profile, developed by the background protocol engine, wherein the background protocol engine modifies the state-snapshot and the activity profile responsive to receiving at least one packet in the second plurality of packets.

11. The system of claim 10, wherein the background protocol engine determines the activity profile responsive to the monitoring.

12. The system of claim 10, wherein the background protocol engine maintains the state-snapshot responsive to the activity profile.

13. The system of claim 10, wherein the activity profile identifies a usage pattern.

14. The system of claim 10, wherein the state-snapshot further comprises a data structure describing a state of a screen at a point in time.

15. The system of claim 10, wherein the state-snapshot further comprises maintaining the state of a visible surface.

16. The system of claim 10, wherein the state-snapshot further comprises maintaining the state of an off-screen surface.

17. The system of claim 10, wherein the state-snapshot further comprises maintaining the state of a drawing object.

18. The system of claim 10, wherein the state-snapshot further comprises maintaining the state of a color palette.

19. The system of claim 10, wherein the state-snapshot further comprises maintaining the state of a cached object.

20. The system of claim 10, wherein the state-snapshot further comprises maintaining the state of a buffer.

21. The system of claim 10, wherein the foreground protocol engine further comprises generating a real-time perceptible representation of the first plurality of packets for presentation to a user.

22. The system of claim 10, wherein the foreground protocol engine further comprises generating a real-time visible representation of the first plurality of packets for presentation to a user.

23. The system of claim 10, wherein the foreground protocol engine further comprises generating a real-time audible representation of the first plurality of packets for presentation to a user.

24. An article of manufacture having embodied thereon computer-readable instructions stored in a non-transient manner for adaptive generation of state-snapshots enabling real-time seeking during real-time playback of a presentation layer protocol data stream transmitted from an application server (i) executing an application for a client and (ii) streaming the output display generated by the application to the client, the article of manufacture comprising:

computer-readable instructions causing a foreground protocol engine to display a presentation layer protocol data stream comprising a first plurality of packets received by a background protocol engine and a second plurality of packets yet to be received by the background protocol engine during transmission of the presentation layer protocol data stream from a first device to a second device;

computer-readable instructions causing the background protocol engine to monitor an activity of the user during the presentation;

computer-readable instructions causing the background protocol engine to develop an activity profile responsive to the monitoring of the activity;

computer-readable instructions causing the background protocol engine to collect and store data related to the activity of the user;

computer-readable instructions causing the background protocol engine to modify the activity profile responsive to the collected data related to the activity of the user;

computer-readable instructions causing the background protocol engine to generate at least one state-snapshot of the background protocol engine, responsive to the activity profile;

computer-readable instructions causing the background protocol engine to modify the at least one state-snapshot, responsive to receiving at least one packet in the second plurality of packets.

computer-readable instructions causing the foreground protocol engine to identify the at least one state-snapshot; and computer-readable instructions causing the foreground protocol engine to display the presentation layer protocol data stream from the at least one state-snapshot while receiving the second plurality of packets by the background protocol engine during transmission of the presentation layer protocol data stream.

\* \* \* \* \*